(12) United States Patent
Yoo et al.

(10) Patent No.: US 10,192,455 B2
(45) Date of Patent: Jan. 29, 2019

(54) USER DEVICE, SERVER, SYSTEM AND COMPUTER-READABLE RECORDING MEDIUM FOR PREPARING AND REPRODUCING CONTENTS FOR DIGITAL LESSON AND CONTROL METHOD THEREOF

(71) Applicant: SAMSUNG ELECTRONICS CO., LTD., Suwon-si (KR)

(72) Inventors: Eun-kyung Yoo, Seoul (KR); Bo-min Kim, Seongnam-si (KR); Joon-hwan Kim, Yongin-si (KR); Chan-hee Jung, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 529 days.

(21) Appl. No.: 14/327,758

(22) Filed: Jul. 10, 2014

(65) Prior Publication Data
US 2015/0017625 A1 Jan. 15, 2015

(30) Foreign Application Priority Data
Jul. 10, 2013 (KR) ......................... 10-2013-0080908

(51) Int. Cl.
*G09B 5/00* (2006.01)
*G09B 5/02* (2006.01)
*G09B 7/00* (2006.01)

(52) U.S. Cl.
CPC *G09B 5/02* (2013.01); *G09B 7/00* (2013.01)

(58) Field of Classification Search
CPC .. G09B 5/00; G09B 5/02; G06F 3/048; G06F 3/0481; G06F 3/0482; G06F 3/0486
See application file for complete search history.

(56) References Cited

U.S. PATENT DOCUMENTS

| 5,684,952 A | 11/1997 | Stein | |
|---|---|---|---|
| 6,091,930 A * | 7/2000 | Mortimer | G09B 5/14 434/118 |
| 2002/0188583 A1* | 12/2002 | Rukavina | G09B 7/00 706/45 |
| 2003/0163784 A1* | 8/2003 | Daniel | G06F 17/21 715/200 |
| 2004/0153509 A1* | 8/2004 | Alcorn | G06Q 30/06 709/205 |

(Continued)

FOREIGN PATENT DOCUMENTS

| KR | 10-2009-0049490 A | 5/2009 |
|---|---|---|
| KR | 10-2011-0070393 A | 6/2011 |

*Primary Examiner* — Peter Egloff
(74) *Attorney, Agent, or Firm* — Sughrue Mion, PLLC

(57) ABSTRACT

A method of controlling a user terminal is provided. The method includes displaying a graphic user interface (GUI) which includes items showing a plurality of class courses which are taught based on a lesson content, and items showing a plurality of activities or materials; selecting one of the displayed items corresponding to the plurality of activities or materials in accordance with a user's input; designating the item of the selected activity or material to one of the items corresponding to the plurality of class courses; and generating the lesson content by storing the class course and lesson plan configuration information corresponding to the activity or material designated to the class course.

25 Claims, 44 Drawing Sheets

(56) References Cited

U.S. PATENT DOCUMENTS

| | | | | |
|---|---|---|---|---|
| 2008/0241809 A1* | 10/2008 | Ashmore | ............... | G09B 5/00 |
| | | | | 434/307 R |
| 2008/0320412 A1* | 12/2008 | Wake | ................... | G06F 3/0486 |
| | | | | 715/781 |
| 2009/0035733 A1* | 2/2009 | Meitar | .................... | G09B 7/00 |
| | | | | 434/118 |

* cited by examiner

FIG. 25

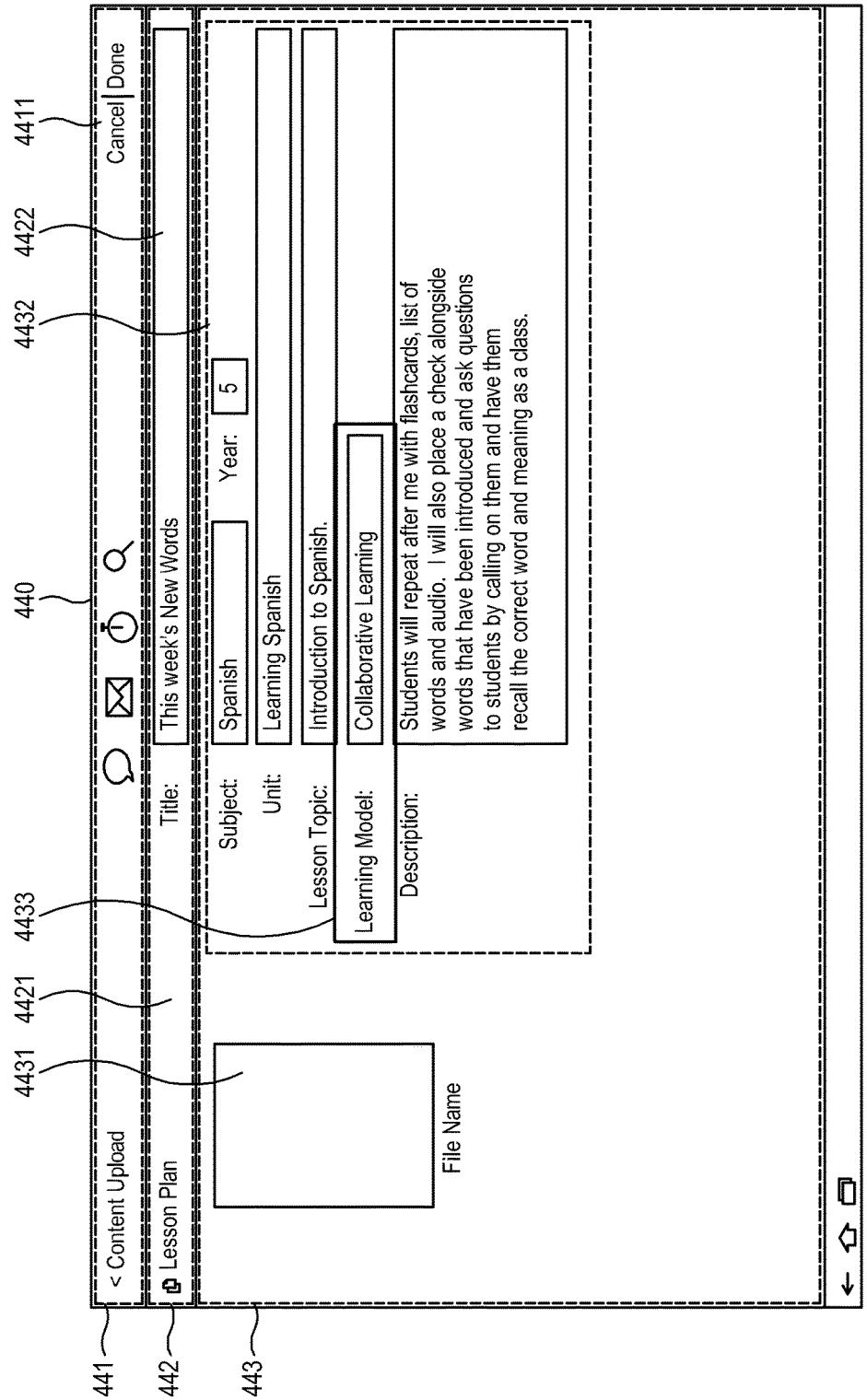

USER DEVICE, SERVER, SYSTEM AND COMPUTER-READABLE RECORDING MEDIUM FOR PREPARING AND REPRODUCING CONTENTS FOR DIGITAL LESSON AND CONTROL METHOD THEREOF

CROSS-REFERENCE TO RELATED APPLICATION

This application claims priority from Korean Patent Application No. 10-2013-0080908, filed on Jul. 10, 2013 in the Korean Intellectual Property Office, the disclosure of which is incorporated herein by reference in its entirety.

BACKGROUND

Field

Apparatuses and methods consistent with the exemplary embodiments relate to a user device, server, system and computer-readable recording medium for preparing and reproducing contents for a digital lesson, and a control method thereof.

Description of the Related Art

Recently, the conducting of a digital lesson using a smart education system based on digital learning contents has become widespread. However, there are limits to the achievement of efficient, smart education, since it takes an enormous amount of time and effort for a teacher and a student to select and use learning content in classes. To smoothly proceed with the lessons by utilizing the learning content and a user terminal in the class, it is very important for a teacher to prepare for his/her class in many ways. However, there are few basic preparation tools for teachers who have less skill than the student in learning and utilizing digital devices. Also, difficulty in controlling a classroom environment during the class has to be taken into account. Thus, a support tool is needed for teachers to come up with easy lesson content and lesson plans (hereinafter, referred to as a 'lesson content') utilizing the digital learning content and the user terminal and prepare in a timely manner to ensure that the lessons are conveyed to the students in an undisturbed manner.

In the related art, there has been proposed a technique that a plurality of contents designed in a class model is sequentially interworked with and reproduced in a plurality of displays, and the like. However, such techniques do not reflect various factors that have to be considered by a teacher when the lesson content is designed to prepare for a class based on the smart education system, and are insufficient to interwork with a social function of utilizing shared learning-related information or with other devices than the display in a classroom environment.

SUMMARY

One or more exemplary embodiments may provide a user device, server, system and non-transitory computer-readable recording medium, and a control method thereof, in which a lesson content for a digital lesson is more conveniently and effectively generated.

According to an exemplary embodiment, there is provided a method of controlling a user terminal, the method including: displaying a graphic user interface (GUI) which includes items showing a plurality of class courses arranged based on a lesson content, and items showing a plurality of activities or materials; selecting one of the displayed items corresponding to the plurality of activities or the materials in accordance with a user's input; designating the item of the selected activity or material to one of the items corresponding to the plurality of class courses; and generating the lesson content by storing the class course and lesson plan configuration information corresponding to the activity or material designated to the class course.

The item of the class course may correspond to a region on a table of the class course.

The designating the item may include moving the item of the activity or material to a region of a class course to be designated on the table.

The method may further include: selecting a topic of a lesson content in accordance with a user's input; displaying items showing a plurality of templates related to the selected topic; and selecting one of the items corresponding to the plurality of templates in accordance with a user's input.

The method may further include receiving a template from at least one of a server and another user terminal.

The GUI may include items showing a plurality of settings related to peripheral devices or environments, selectable with regard to each class course, the method may further include selecting one of the items corresponding to the plurality of settings in accordance with a user's input.

The method may further include setting up the peripheral device or environment in accordance with the settings of the selected item.

The setting up the peripheral device or environment may include transmitting information corresponding to the selected setting to the peripheral device.

The method may further include transmitting the lesson plan configuration information to a server, and receiving a different user's lesson plan configuration information about the lesson content from the server; and informing contents generated or edited by the different user with regard to the lesson content based on the received lesson plan configuration information.

The displaying the GUI may include activating an item of the class course or activity for which a role is given to the user.

According to an aspect of another exemplary embodiment, there is also provided a user terminal including: a storage configured to store information about a lesson content for a digital lesson; a display configured to display a graphic user interface (GUI) which includes items showing a plurality of class courses arranged based on a lesson content, and items showing a plurality of activities or materials; an input receiver configured to receive a user's input; and a controller configured to select one of the displayed items corresponding to the plurality of activities or the materials in accordance with a user's input, designate the item of the selected activity or material to one of the items corresponding to the plurality of class courses, and generate the lesson content by storing the class course and lesson plan configuration information corresponding to the activity or material designated to the class course.

The item of the class course may correspond to a region on a table of the class course.

The controller may be configured to move the item of the activity or the material to a region of a class course to be designated on the table.

The controller may be configured to select a topic of a lesson content in accordance with a user's input, display items showing a plurality of templates related to the selected topic, and select one of the items corresponding to the plurality of templates in accordance with a user's input.

The user terminal may further include a communicator configured to communicate with at least one of a server and another user terminal and receive a template.

The GUI may include items showing a plurality of settings related to peripheral devices or environments, selectable with regard to each class course, and the controller may select one of the items corresponding to the plurality of settings in accordance with a user's input.

The controller may set up the peripheral device or environment in accordance with the settings of the selected item.

The controller may transmit information corresponding to the selected setting to the peripheral device.

According to an aspect of another exemplary embodiment, there is also provided a server including: a communicator configured to communicate with a plurality of user terminals; a storage configured to store information about a plurality of users and information about a lesson content shared among the plurality of users; and a controller configured to receive lesson plan configuration information corresponding to an activity or material designated to a class course of the lesson content from a user terminal of a first user among the plurality of users, and transmit the received lesson plan configuration information to a user terminal of a second user among the plurality of users.

The controller may be configured to transmit information about a role, given to the first user or the second user for a certain class course or activity, to the user terminal of the first or second user.

The controller may be configured to transmit information about a peripheral device or environment setting to the user terminal of the second user.

If the peripheral device or environment setting does not correspond to the user terminal of the second user, the controller may recommend a peripheral device or environment setting corresponding to the user terminal of the second user.

The controller may be configured to control a peripheral device or perform an environment setting in accordance with requests from the user terminal.

According to an aspect of another exemplary embodiment, there is also provided a system which provides a digital lesson service based on a lesson content, the system including: a server configured to store and manage information about a plurality of users, and information about a lesson content shared among the plurality of users; and user terminals for a plurality of users configured to communicate with the server and enable a user to generate the lesson content, wherein a user terminal of a first user among the plurality of users transmits lesson plan configuration information corresponding to an activity or material designated to a class course of a lesson content of the first user to the server, the server transmits the lesson plan configuration information received from the user terminal of the first user to a user terminal of a second user among a plurality of users, and the user terminal of the second user generates the lesson content of the second user based on the lesson plan configuration information of the first user received from the server.

The system may further include at least one peripheral device used in the digital lesson, the user terminal may request the server to control the peripheral device or perform an environment setting, and the server may control the peripheral device or performs the environment setting in accordance with requests from the user terminal.

The server may recommend a peripheral device or environment setting corresponding to the user terminal of the second user if the peripheral device or environment setting does not correspond to the user terminal of the second user.

According to an aspect of another exemplary embodiment, there is also provided a recording medium storing a code read and executable by a computer, the medium including: displaying a graphic user interface (GUI) which includes items showing a plurality of class courses arranged based on a lesson content, and items showing a plurality of activities or materials; selecting one of the displayed items corresponding to the plurality of activities or the materials in accordance with a user's input; designating the item of the selected activity or material to one of the items corresponding to the plurality of class courses; and generating the lesson content by storing the class course and lesson plan configuration information corresponding to the activity or material designated to the class course.

According to an aspect of another exemplary, there is provided A user terminal comprising: a display configured to display a graphic user interface (GUI) which comprises items showing a plurality of class courses which are taught based on a lesson content, and items showing a plurality of activities or a plurality of materials; an input receiver configured to receive a user's input; and a controller configured to select one of the displayed items corresponding to the plurality of activities or the plurality of materials in accordance with a first user input, designate the item of the selected activity or the selected material to one of the items corresponding to the plurality of class courses, and generate the lesson content by storing the one of the items corresponding to the plurality of class courses and lesson plan configuration information corresponding to the selected activity or the selected material designated to the class course.

According to another aspect of the exemplary embodiments, there is provided a server comprising: a communicator configured to communicate with a plurality of user terminals; and a controller configured to receive lesson plan configuration information corresponding to an activity or material designated to a class course of lesson content from a user terminal of a first user among a plurality of users, and transmit the received lesson plan configuration information to a user terminal of a second user among the plurality of users.

BRIEF DESCRIPTION OF THE DRAWINGS

The above and/or other aspects will become apparent and more readily appreciated from the following description of exemplary embodiments, taken in conjunction with the accompanying drawings, in which:

FIGS. 21 to 35 show examples of the GUI displayed by the user terminal according to an exemplary embodiment;

FIGS. 37 to 44 show other examples of the GUI displayed by the user terminal according to an exemplary embodiment.

DETAILED DESCRIPTION OF EXEMPLARY EMBODIMENTS

Below, exemplary embodiments will be described in detail. First, terms used in this specification are defined as follows.

A 'lesson content' refers to a content to be used by a user (e.g., a teacher and a student) in proceeding with a class.

An 'activity' refers to various types of activities designated corresponding to respective courses of the class (hereinafter, referred to as a 'class course'), in which a teacher or a student participates.

A 'material' refers to a content to be used in the activity designated to each class course. The lesson content may include a plurality of materials corresponding to the plurality of activities.

A 'lesson template' refers to a lesson content previously prepared and used for generating a new lesson content.

Figure 1:
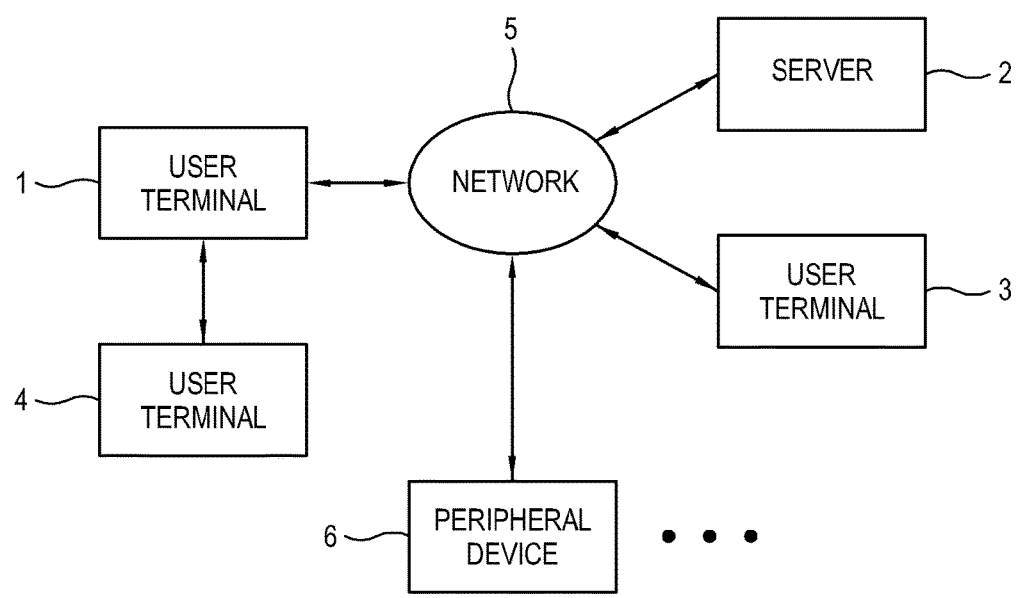
FIG. 1 shows an example of a user terminal according to an exemplary embodiment.

FIG. 1 shows an example of the whole system according to an exemplary embodiment. The system according to an exemplary embodiment uses the lesson content and proceeds with a digital lesson (hereinafter, referred to as a 'lesson'). The system according to an exemplary embodiment includes a server 2, user terminals 1, 3 and 4, and a peripheral device 6 (hereinafter, also simply referred to as 'device'). Although only three user terminals and one peripheral device are illustrated, the number of user terminals and peripheral devices is not limited thereto. The server 2, the user terminals 1, 3 and 4, and the peripheral device 6 are connected to one another through a network 5. The server 2, the user terminals 1, 3 and 4, and the peripheral device 6 are operated to proceed with a class using the lesson content while communicating with one another. The server 2 may be provided in a classroom where lessons take place, or may alternately be provided in places other than the classroom. The server 2 may for example be achieved in the form of a server for the Internet. The user terminal 1 may be achieved by a smart pad a smart pad, a tablet personal computer (PC), a notebook computer, a desktop computer, etc. The peripheral device 6 includes various devices applicable to a classroom environment. For instance, the peripheral device 6 may include a PC, a video device, a screen, an audio device, a lighting device, an air conditioning device, a light blocking device, etc. A user who prepares for the digital lesson, for example, a teacher may use the user terminal 1 to generate the lesson content (hereinafter, also referred to as a 'content') for his/her lesson. The user terminal 1 provides graphic user interfaces (GUIs) corresponding to various functions so that a teacher can more conveniently generate the lesson content. Also, students can use the user terminals 1, 3 or 5 during a classroom session to access the lesson content generated by a teacher. The user terminal 1 requests the server 2 to provide information needed in generating the lesson content, and receives the information from the server 2, thereby generating the lesson content.

Figure 18:
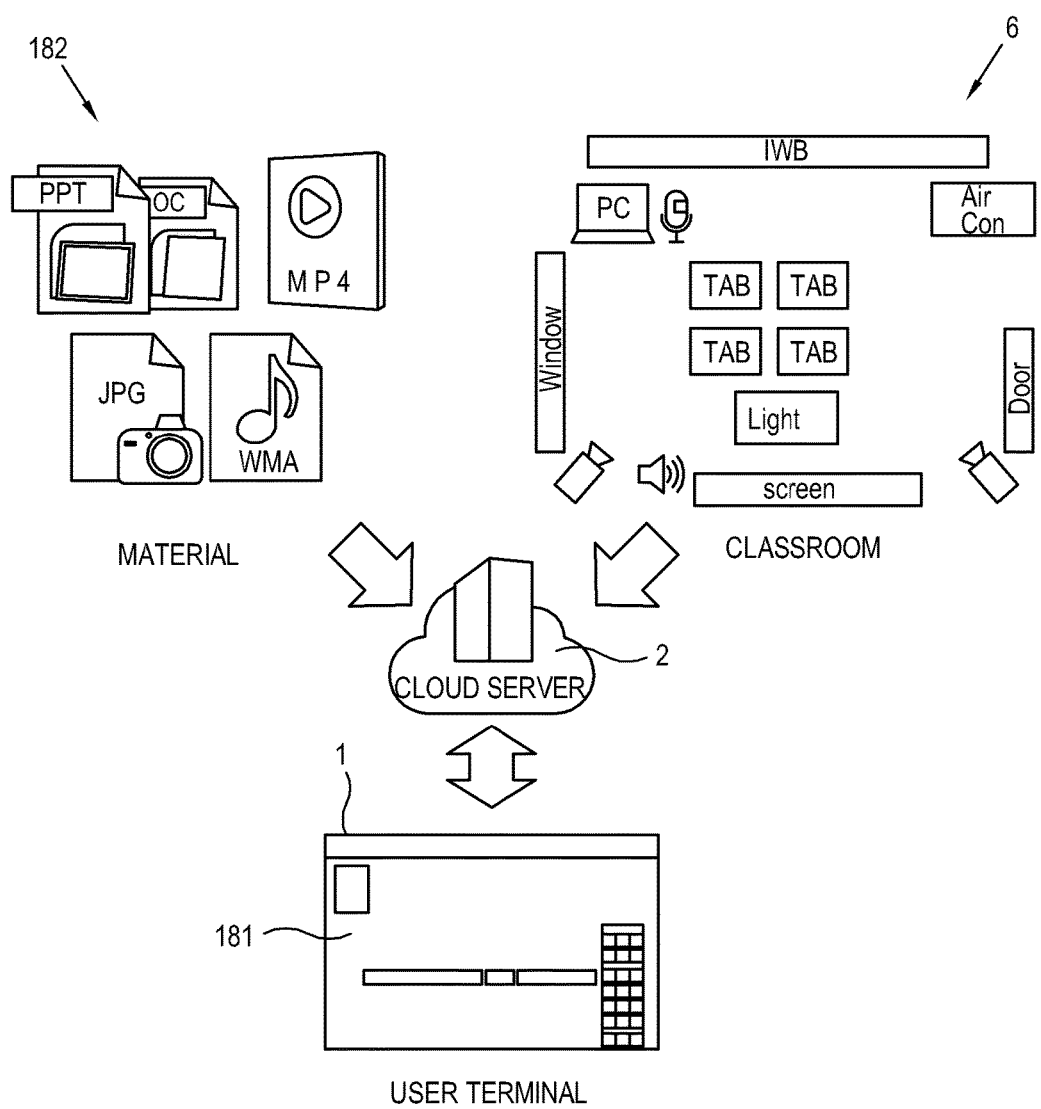
FIG. 18 shows an example of a system that controls a class environment through the user terminal according to an exemplary embodiment.

FIG. 18 shows another example of the whole system according to an exemplary embodiment. A teacher uses a GUI 181 provided by the user terminal 1 to proceed with a class, and performs control for the peripheral device 6 or the classroom environment in accordance with a setting during the class. The user terminal 1 may take a material 182 needed for proceeding with the class through the server 2, or may perform the setting for the peripheral device 6 or the classroom environment. A user may previously set up the material 182 and various peripheral devices 6 of the classroom to be used in order to proceed with a class, through a GUI 181, at a point of time when the class is planned. The server 2 stores not only the lesson content but also the material 182, and information about various peripheral devices 6 applicable under the classroom environment. The server 2 manages a user's account, and registers the peripheral devices 6 or the classroom environment set up by a user to the user's account. While communicating with the user terminal 1, the server 2 controls the peripheral device 6 in accordance with the contents generated by a user to be used during the teaching of the class.

Figure 15:
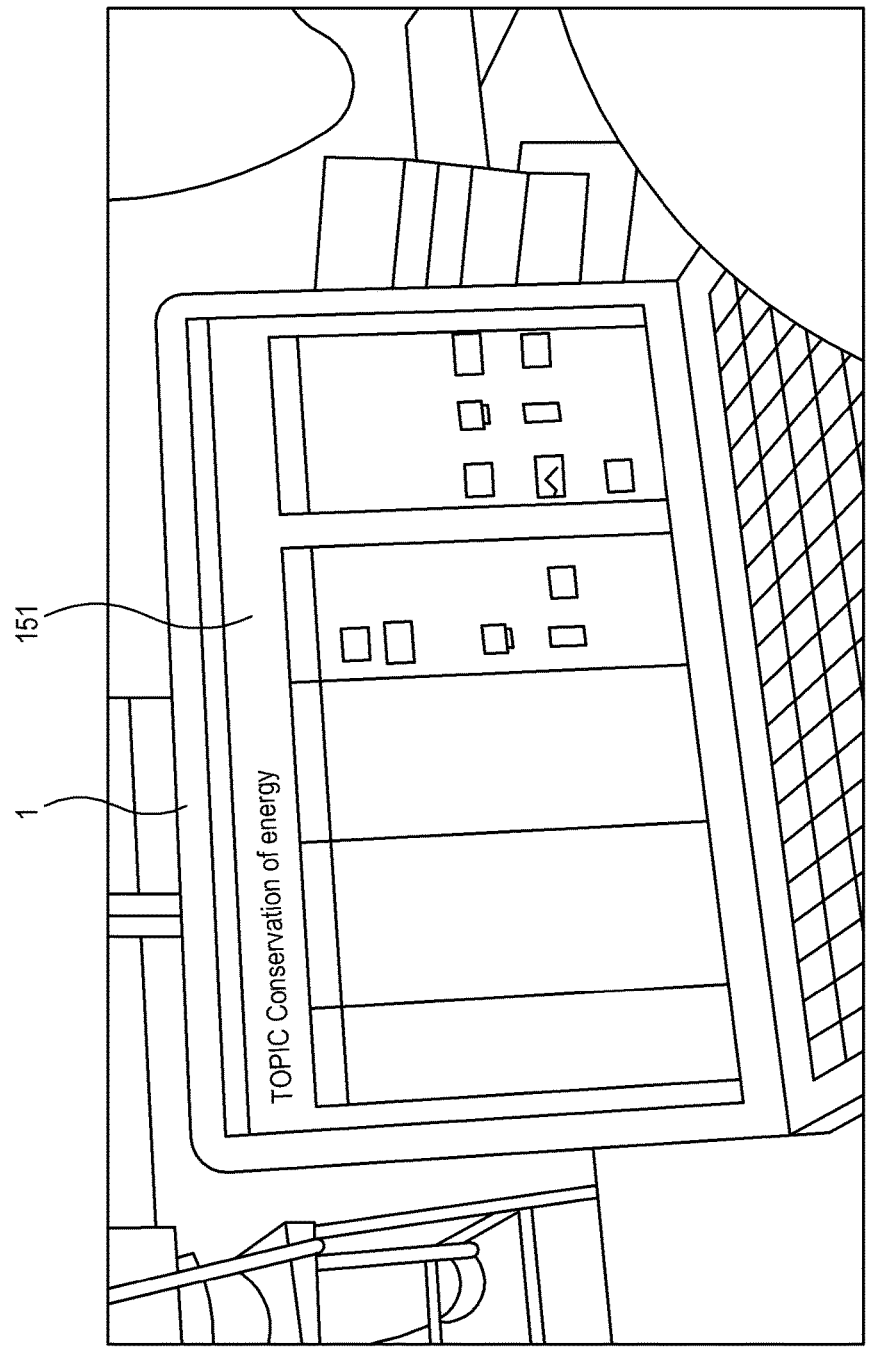
FIGS. 15 to 17 show examples of situations where the user terminal according to an exemplary embodiment is used.
Figure 16:
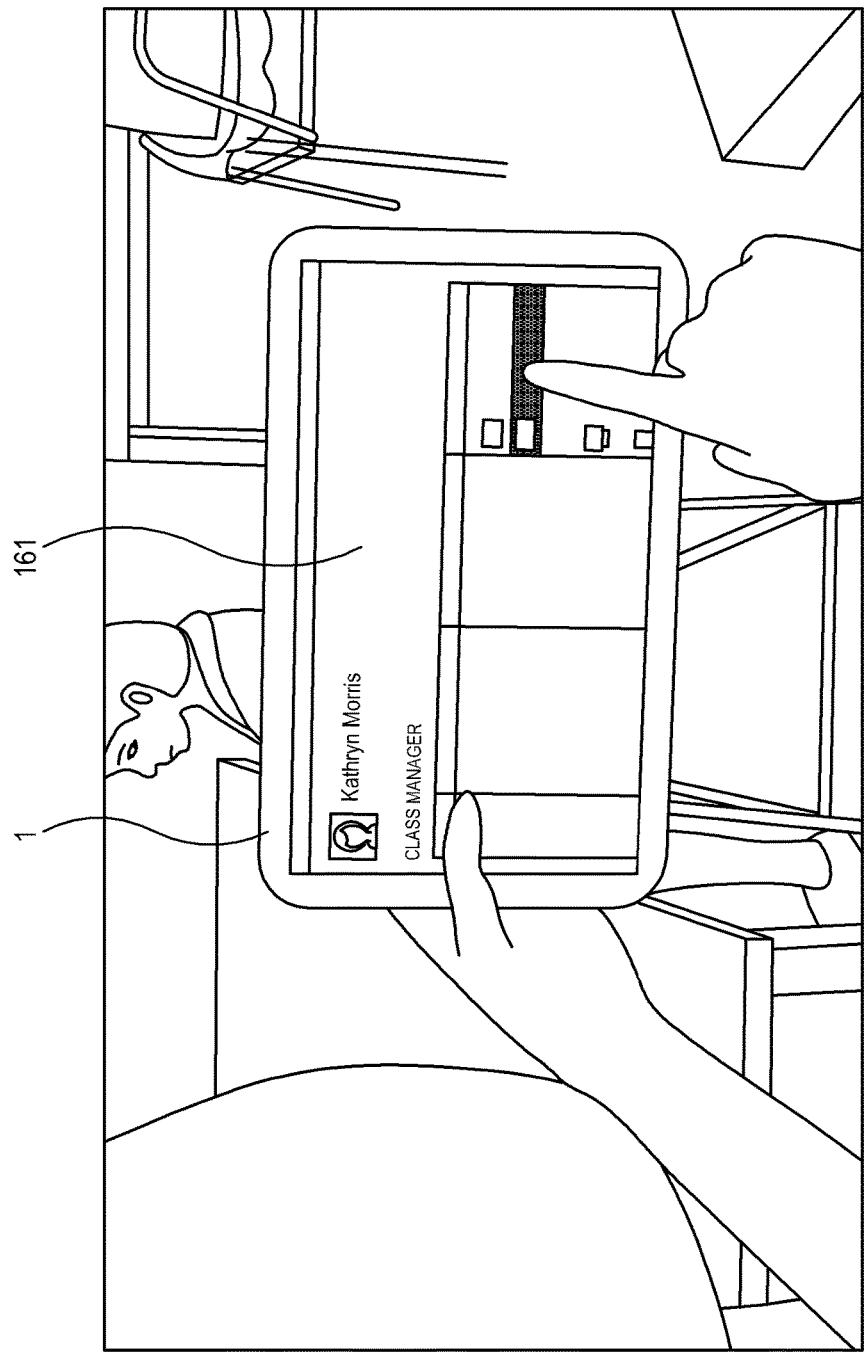
Figure 17:
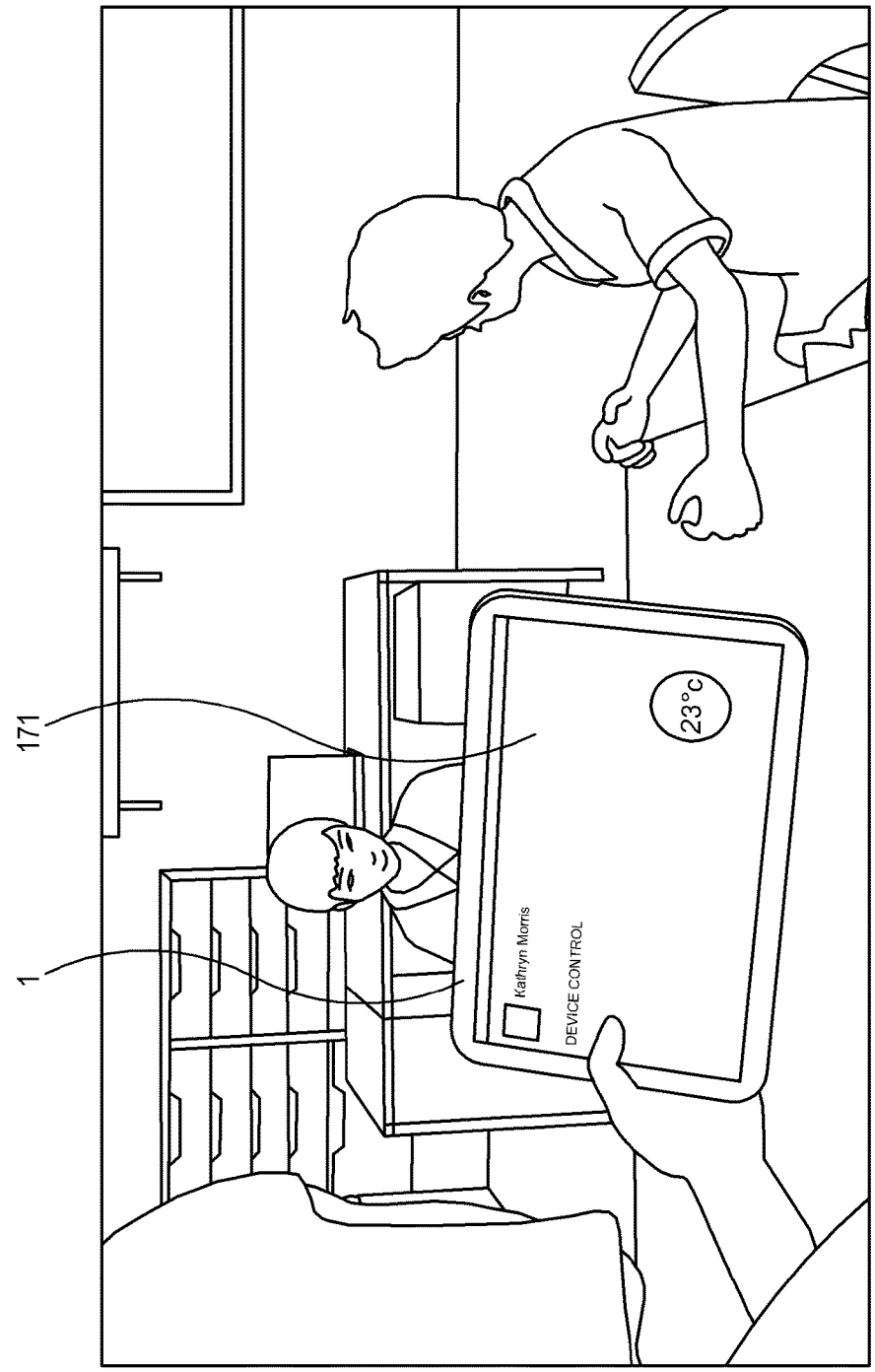

FIG. 15 shows an example of a situation where the user terminal 1 according to an exemplary embodiment is used. A user may previously generate a lesson content 151 through functions provided by the user terminal 1 in consideration of a lesson plan prior to conducting the lessons in the classroom. When generating the lesson content 151, a user may previously set up the peripheral device 6 or the classroom environment in accordance with a manner in which the lessons will be taught. FIG. 16 shows another situation of using the user terminal 1 according to an exemplary embodiment. In class, a user may proceed with the teaching of a current lesson while viewing a previously generated lesson content 161. At this time, the setting of the peripheral device 6 or the classroom environment previously set up in the lesson content 161 may be applied. FIG. 17 shows still another situation of using the user terminal 1 according to an exemplary embodiment. Even while proceeding with the current lesson, a user may directly control the peripheral device 6 or the classroom environment through a control GUI 171 provided by the user terminal 1. At this time, a user may use his/her own user terminal 1 or a different terminal to control the peripheral device 6 or the classroom environment.

The user terminal 1 provides various functions and information so that a user can more conveniently and effectively generate a desired lesson content 151. That is, the user terminal 1 allows a user to decide a topic of a lesson content for a class, provide a lesson template (hereinafter, referred to as a 'template') corresponding to the decided topic, designate various activities corresponding to respective class courses through the template, and assign a desired material to the activity designated to each class course, thereby generating the lesson content 151.

A user can not only generate the lesson content 151 based on the information provided from the user terminal 1, but may also, for example as shown in FIG. 1, receive related information from the server 2 or another user terminal 3 connected through the network 5 or from a different user terminal 6 connected to a periphery.

Specifically, a user who is a teacher may perform a login operation through the user terminal 1 and select a function for generating the lesson content 151. The user can browse contents (a lesson plan, an activity, a material, device setting, etc.) according to grades, courses and topics, shared with other teachers or students through the user terminal 1, and obtain a searching result of the corresponding content by conducting a keyword search. The user may mark the lesson plan or material that he or she is interested in among the searched results with a bookmark, and the marked lesson plan or material is stored as a personal class-related information (e.g., as a 'My Library'). A teacher may recommend his/her own lesson template or class-related content to other teachers through the user terminal 1. At this time, the user terminals 3 and 4 of other teachers may display information about the first teacher who recommends the lesson template while showing the corresponding lesson template.

Through the user terminal 1, a teacher may select a template appropriate for the class topic between a basically provided lesson plan template and the lesson template shared with fellow teachers. A user drags and arranges in order the activity and material stored in "My Library" in accordance with the templates selected through the function provided by the user terminal 1. Also, a user may set up the classroom environment or the peripheral device 6, which includes a display, so that a user of the peripheral device 6 would be able to interact with the activities or material being discussed during the class. The user terminal 1 is previously provided with the setting for the environment or the setting for the peripheral device 6, and is optimized according to the representative activity, so that a user can use the user terminal 1 directly or the user can set up a classroom where the lesson will take place. The user may also set up the peripheral device 6 within the classroom, and the environment of the classroom based on information about functions executable by the peripheral device 6, etc. through the user terminal 1. The completed lesson content 151 is stored in "My Library", so that the user terminal 1 can transmit the lesson content 151 to another device to be used by a user in the classroom.

Figure 2:
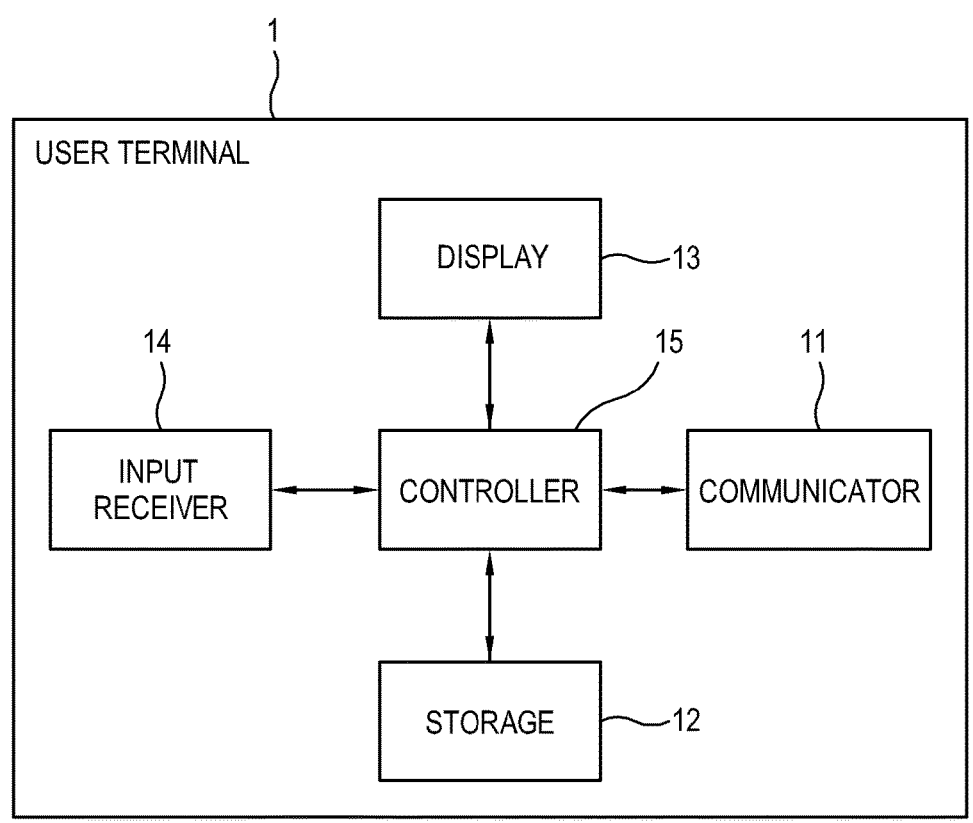
FIG. 2 is a block diagram showing the user terminal according to an exemplary embodiment.

FIG. 2 is a block diagram showing detailed configurations of the user terminal 1 according to an exemplary embodiment. As shown in FIG. 2, the user terminal 1 includes a communicator 11, a storage 12, a display 13, an input receiver 14 and a controller 15. The communicator 11 performs communication with an external device connected to the user terminal 1. For example, the communicator 11 may communicate with the server 2 or another user terminal 3 or peripheral device 6 through the network 5 such as the Internet as shown in FIG. 1. Also, the communicator 11 may communicate with another user terminal 4 which is directly connected to the user terminal 1 by universal serial bus (USB) or wirelessly connected by Wi-Fi, Bluetooth, etc. Under control of the controller 15, the communicator 11 may transmit and receive information about the lesson content to and from the server 2, other user terminals 3 and 4, or the peripheral device 6.

The storage 12 is a nonvolatile memory such as a flash memory, a hard disk, etc. and stores the information about the lesson content. The display 13 shows a GUI for generating the lesson content under control of the controller 15. The input receiver 14 receives a user's input. The input receiver 14 may receive information about text or the like as a user's input through a keyboard, and information about a position through a pointing device such as a mouse, or a user's touch input on the display 13. The controller 15 generally controls the user terminal 1. The controller 15 controls the elements so that a user can generate a lesson content for a digital class. The controller 15 may include a control program for performing such a control function, a memory such as a random access memory (RAM) in which at least a part of the control program is temporarily loaded, and a microprocessor for executing the control program loaded to the memory. The control program may be stored in a recording medium in the form of a code readable and executable by a computer.

Figure 3:
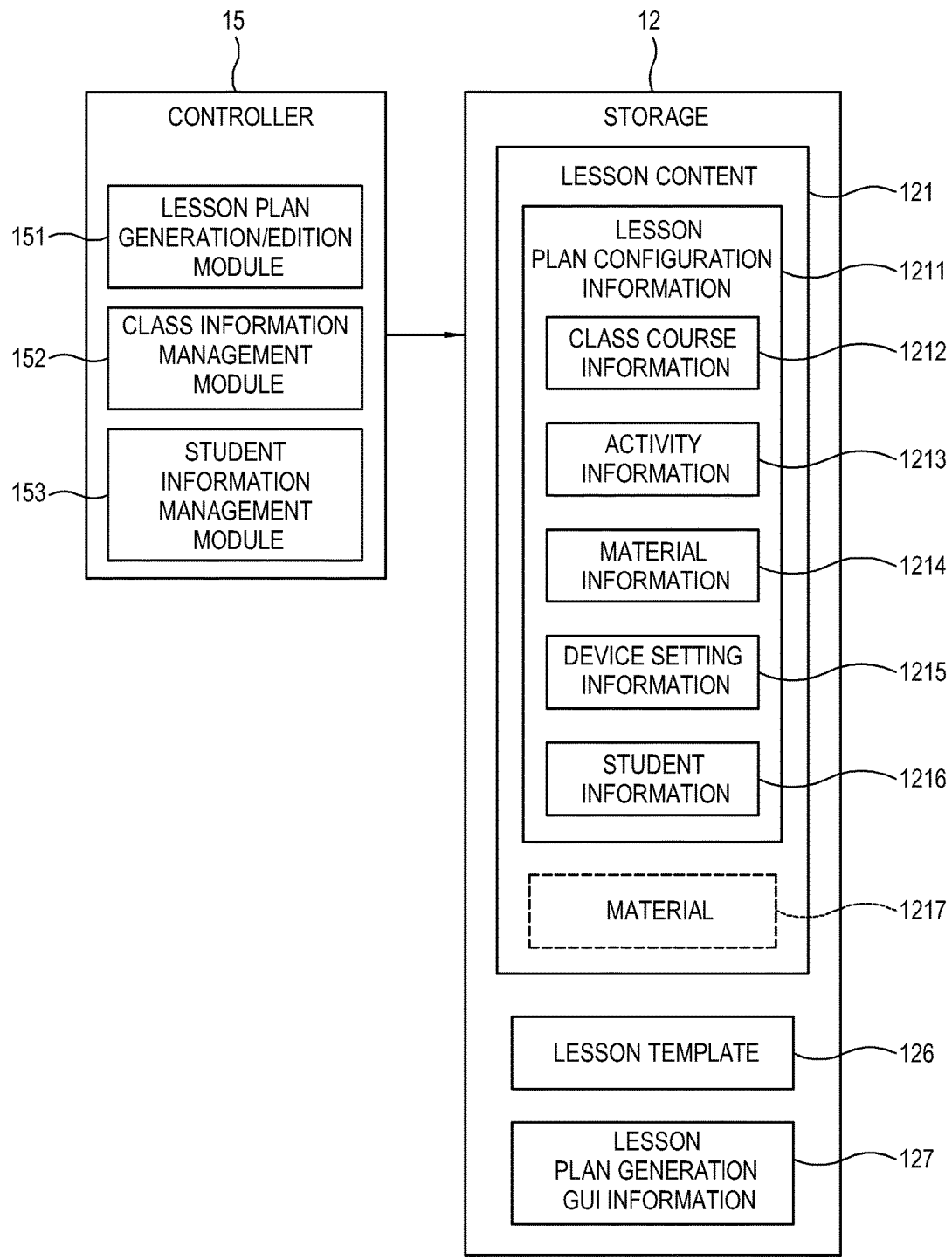
FIG. 3 shows a concrete example of elements in a controller and a storage according to an exemplary embodiment.

FIG. 3 shows a concrete example of elements in the controller 15 and the storage 12 according to an exemplary embodiment. As shown in FIG. 3, the controller 15 may include a lesson plan generation/edition module 151, a class information management module 152 and a student information management module 153. The storage 12 may store the lesson content 121 and the lesson template 126.

In response to a user's request, the lesson content 121 is generated and created through the lesson plan generation/edition module 151. According to an exemplary embodiment, the lesson content 121 may contain lesson plan configuration information 1211 about the class course and what activity, material, and device setting is designated to the class course, etc. The lesson plan configuration information 1211 may include class course information 1212, activity information 1213, material information 1214, device setting information 1215 and student information 1216. The lesson plan configuration information 1211 refers to information about a plurality of class courses sequentially performed as a class. The activity information 1213 refers to information about concrete activities that may be performed corresponding to the respective class courses. The material information 1214 refers to information about a material to be used in each class course. The device setting information 1215 refers to information for setting up the peripheral device 6 or the environment used at learning, and may for example involve a list of peripheral devices 6 used according to schools and classrooms, and information about executable functions according to schools and classrooms. The setting information 1215 may for example involve display setting information, audio setting information, lighting device setting information, air-conditioner setting information, security setting information, etc. so as to control the classroom environment or various peripheral devices 6 used in class. The student information 1216 may include basic information about a student to be instructed by a teacher, and information about a learning level, ability, history, etc. of a student.

The lesson template 126 may be a lesson content previously prepared for being basically provided to a user, or may be generated by other users and received from the server 2 or other user terminals 3 and 4. The lesson template 126 refers to lesson plan configuration information similar to the lesson content 121, and may include at least one among the class course information, the activity information, the material information, the device setting information and the student information. The user terminal 1 provides the lesson configuration information involved in the lesson template 126 to thereby allow a user to more conveniently generate the lesson content 121.

The lesson plan generation/edition module 151 may generally generate or edit the lesson content 121 in response to a user's request. The class information management module 152 manages the class course information 1212, the activity information 1213, the material information 1214 and device setting information 1215 while communicating with the lesson plan generation/edition module 151. For example, the class information management module 152 may provide a searching result requested by a user or propose a lesson plan recommended in a recommendation algorithm. Also, the class information management module 152 may add or delete each piece of information. The student information management module 153 manages the student information 125. The elements of the controller 15 and the storage 12 shown in FIG. 3 are an exemplary embodiment. Alternatively, the controller 15 and the storage 12 may have elements which are different from those shown in FIG. 3.

Figure 4:
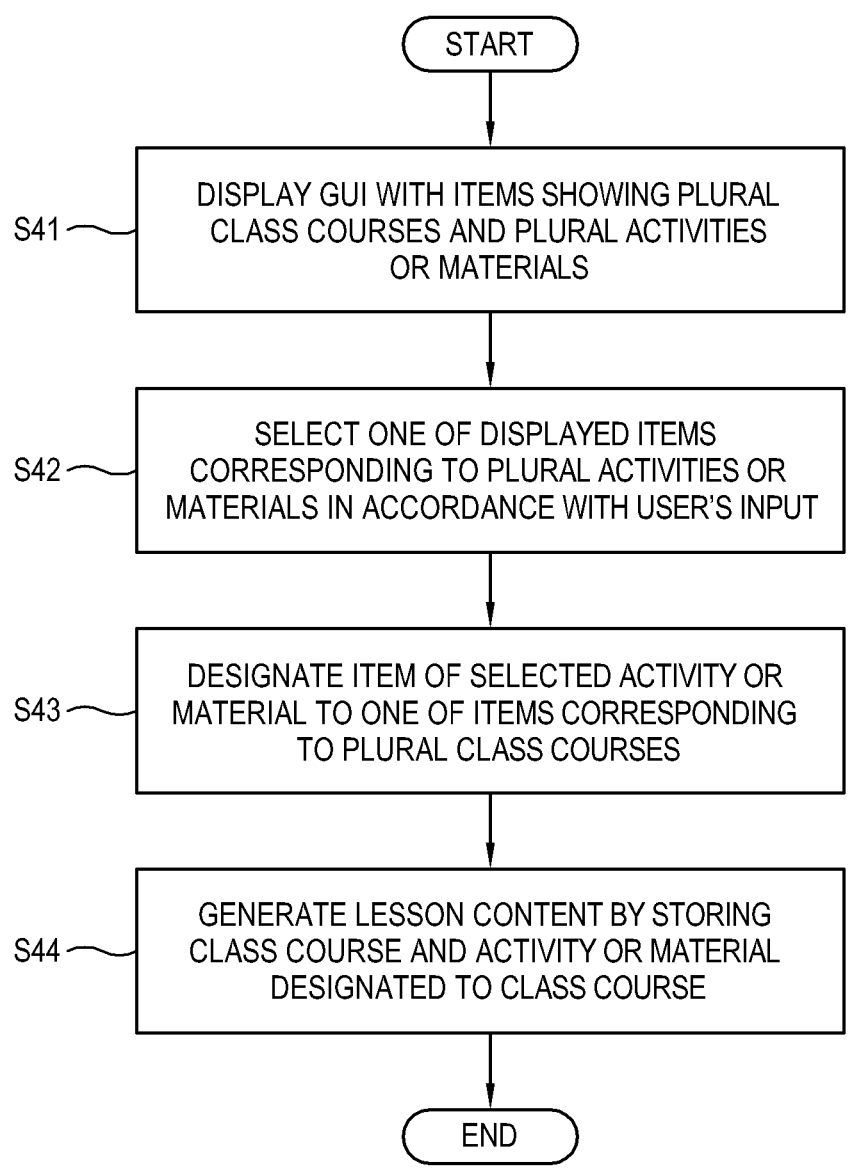
FIG. 4 is a flowchart showing operations of the user terminal according to an exemplary embodiment.

FIG. 4 is a flowchart showing operations of the user terminal 1 according to an exemplary embodiment. At operation S41, the user terminal 1 displays a GUI (refer to a reference numeral of 91 in FIG. 9, a reference numeral of 101 in FIG. 10, or a reference numeral of 240 in FIG. 24) that includes items for a plurality of class courses and items for a plurality of activities or materials when the lesson content is generated. Referring to FIG. 3, the storage 12 may further store lesson plan generation GUI information 127 for displaying the GUI 91, 101, 240. As an optional exemplary embodiment, the user terminal 1 may select the topic of the lesson content to be generated in accordance with a user's input before performing the operation S41. In this case, the user terminal 1 may provide a template corresponding to the selected topic, and may, for example, display the items for the plurality of activities or materials that can be designated in accordance with the respective class courses included in the lesson template 126 stored in the storage 12. Next, at operation S42, the user terminal 1 selects one among the items for the plurality of activities or materials displayed in response to a user's input. Next, at operation S43, the user terminal 1 designates the item for the activity or material selected by a user's input to one of items for the class course. The user terminal 1 may repeat the operations S42 and S43 with respect to each class course. Next, at operation S44, the user terminal 1 stores each class course and the lesson plan configuration information 1211 corresponding to the activity or material designated to the corresponding class course, thereby generating the lesson content.

Figure 19:
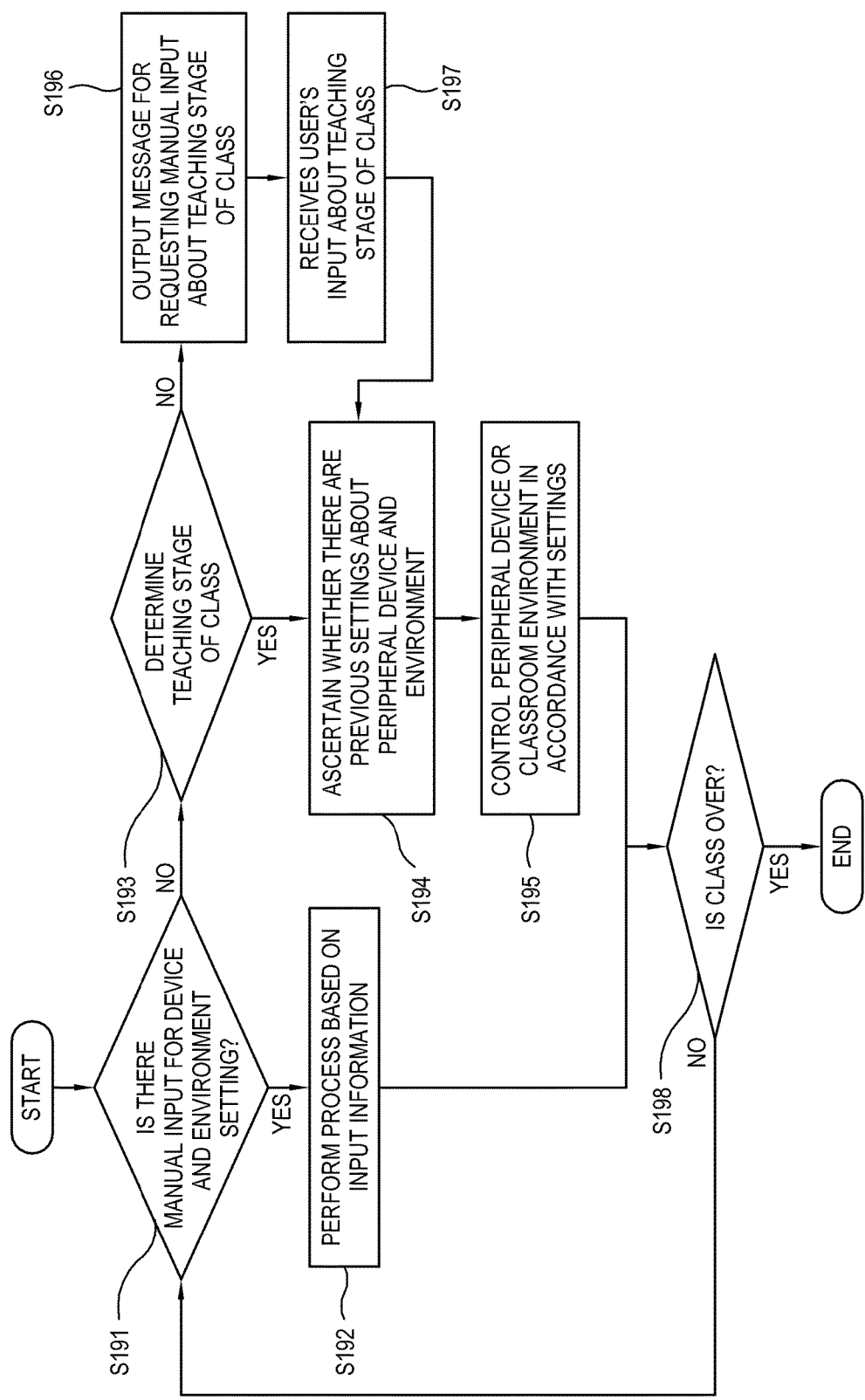
FIG. 19 is a flowchart showing operations of controlling the class environment through the user terminal according to an exemplary embodiment.

FIG. 19 shows an example of operations for controlling the peripheral device or the class environment through the user terminal 1 according to an exemplary embodiment. First, at operation S191, the user terminal 1 determines whether there is a user's manual input with regard to the peripheral device 6 and the environment setting. If there is a user's manual input at operation S191, at operation S192 the user terminal 1 processes the peripheral device 6 and the environment setting in accordance with the user's input. If there is no user's manual input in operation S191, at operation S193 the user terminal 1 determines a teaching stage of a class (i.e., the class course). If the class course is not determined in the operation S193, at operation S196 the user terminal 1 outputs a message requesting a user to manually input the teaching stage of the class. Next, at operation S197, the user terminal 1 receives a user's input about the teaching stage of the class. If the class course is determined in the operation or there is a user's input about the teaching stage of the class in the operation S197, at operation S194 the user terminal 1 ascertains whether the peripheral device 6 and the environment setting are previously set up with respect to the corresponding class course. Next, at operation S195, the user terminal 1 controls the peripheral device 6 or the classroom environment in accordance with the preset peripheral device 6 and the preset environment setting. Next, at operation S198 the user terminal 1 determines whether the class is over or not, and returns to the operation S191 when the class is not over and terminates the operation when the class is over.

The user terminal 1 may provide information shared with other teachers or students with respect to the topic of the lesson content that a user desires to generate, and may for example provide information about contents (e.g., the lesson plan, the activity, the material, the device setting, etc.) according to the grades, the courses, and detailed topics. The user terminal 1 may determine the topic of the lesson content based on a text or the like input by a user through the input receiver 14. The user terminal 1 displays a topic search box (not shown) on the display 13, and thus allows a user to input the text or the like through the topic search box. The user terminal 1 may perform a search with a keyword based on the text or the like input through the topic search box. The user terminal 1 may provide a user with a searched result of the topic corresponding to the input keyword based on the information stored in the storage 12 or based on the information received from the server 2 or a similar external device.

Figure 5:
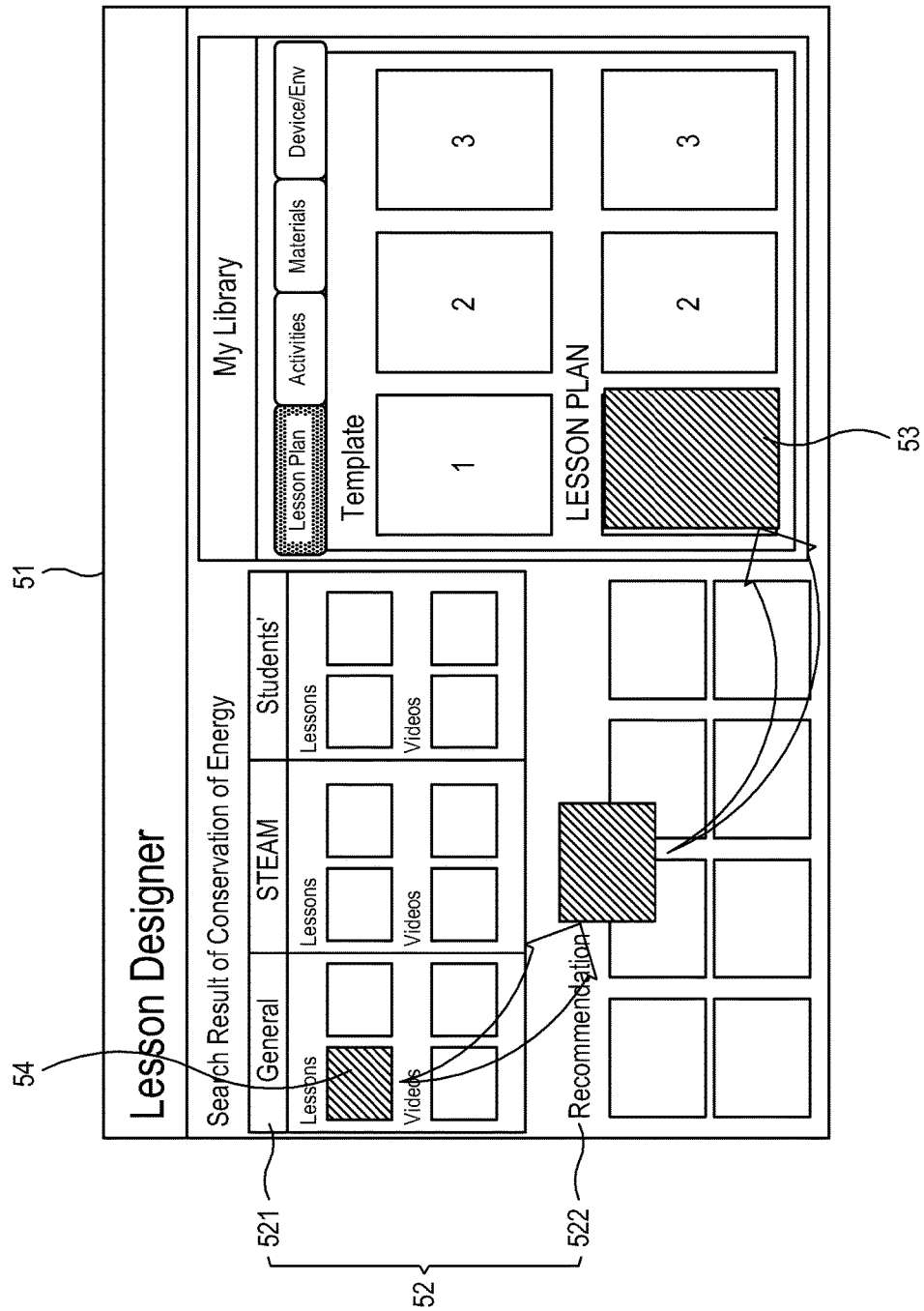
FIG. 5 shows an example of a graphic user interface (GUI) for generating a lesson content according to an exemplary embodiment.
Figure 37:
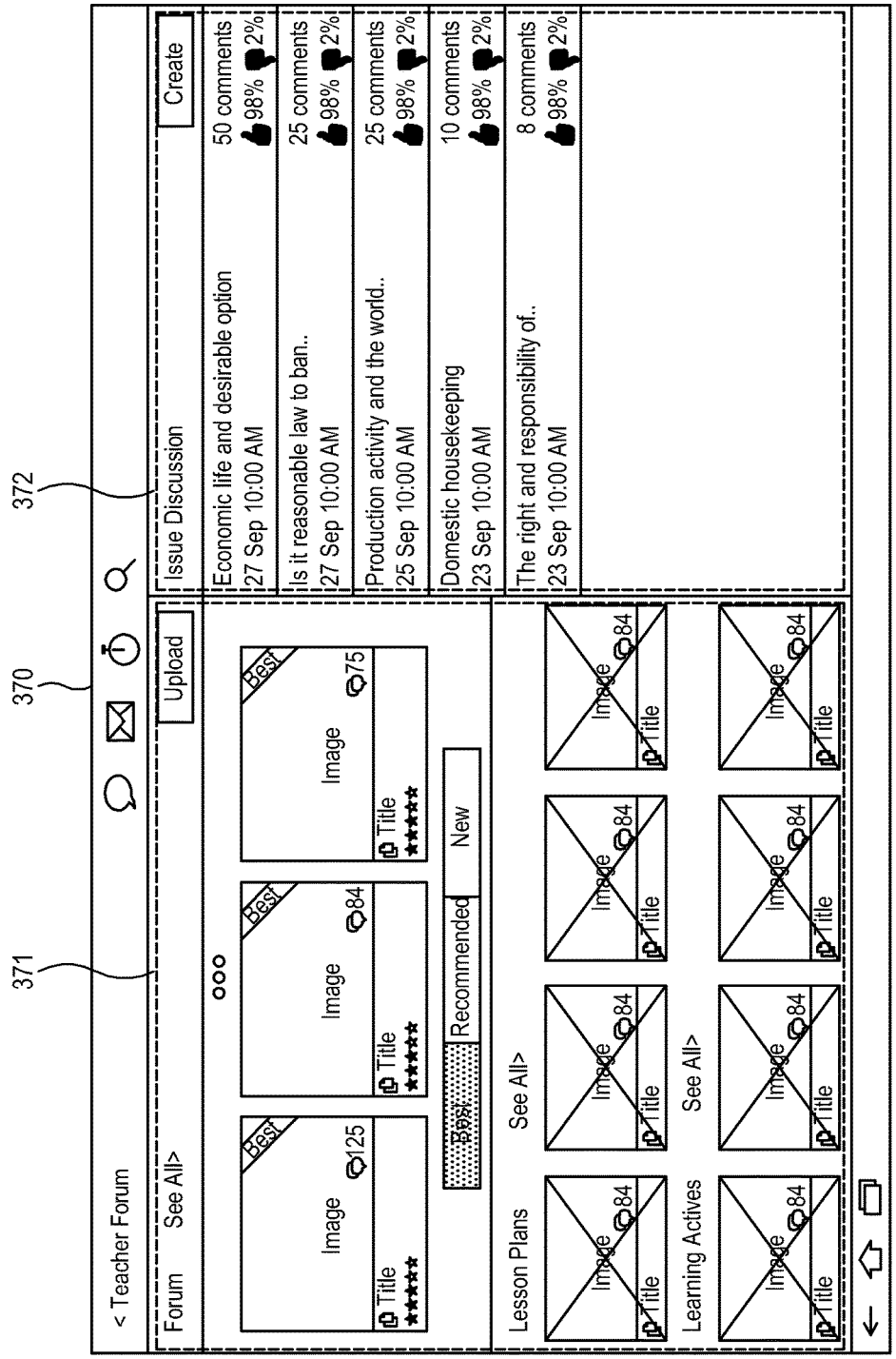
Figure 38:
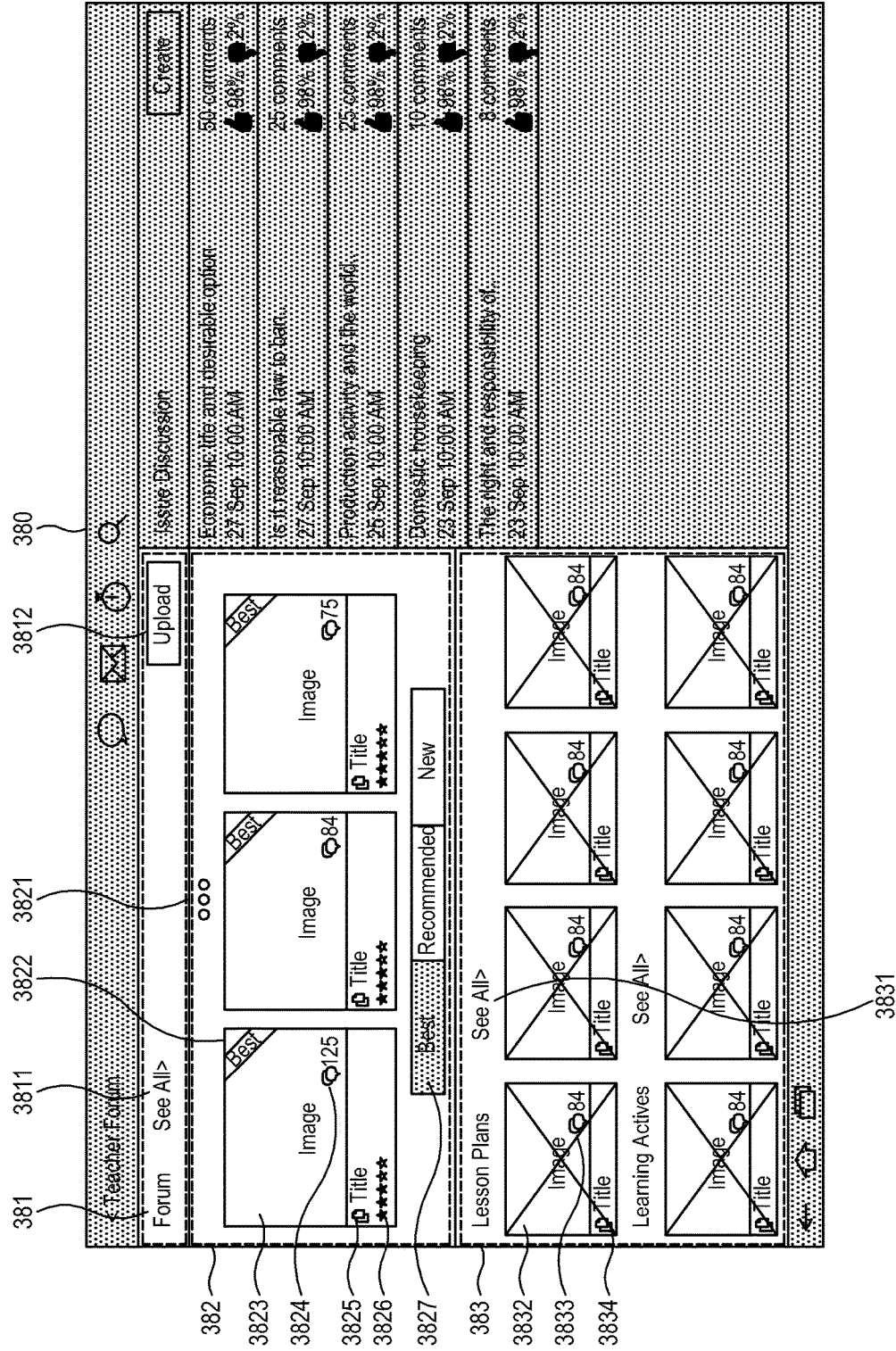
Figure 39:
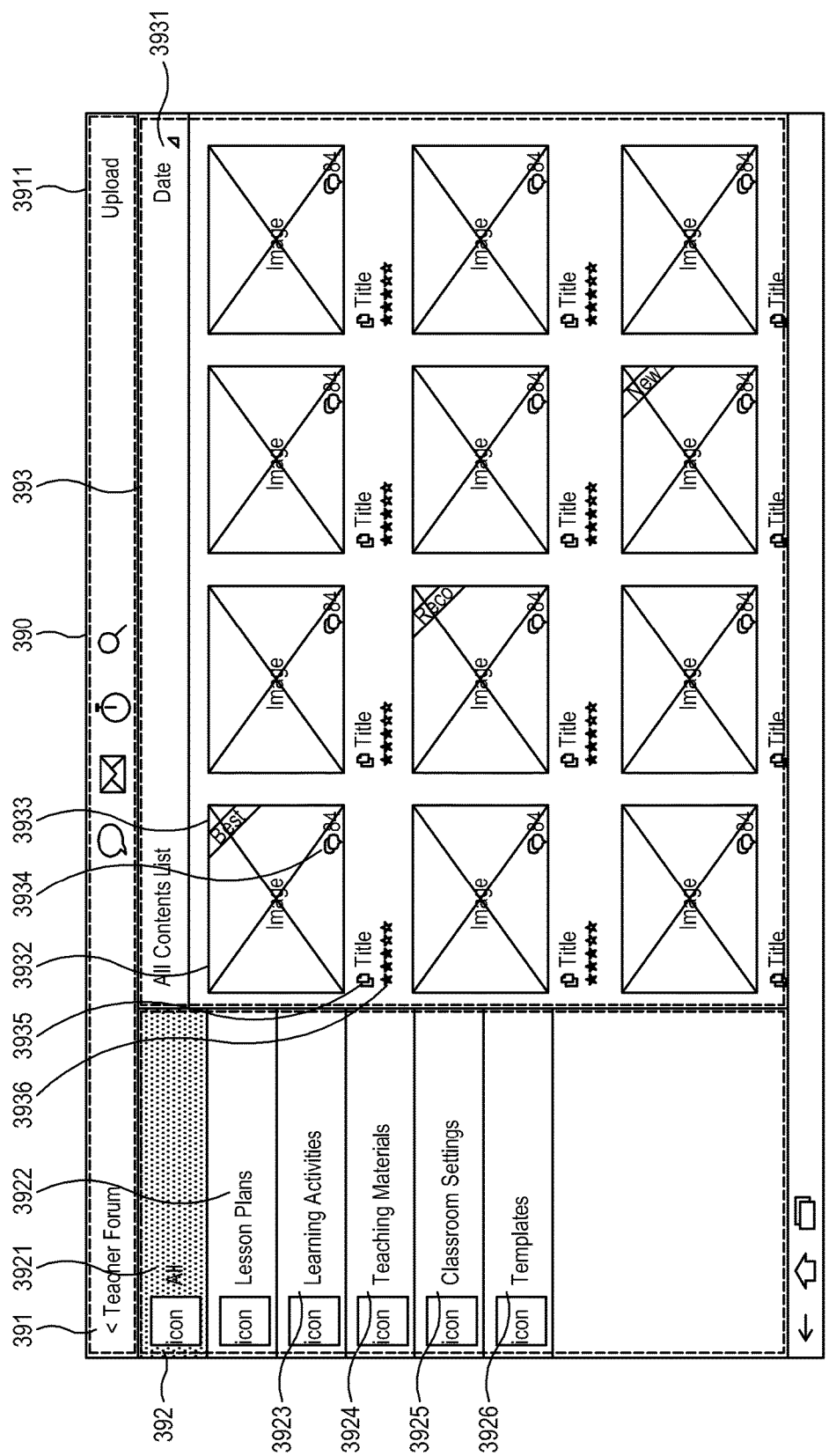

The user terminal 1 may display a GUI showing the results of the search for the topic. FIG. 5 shows an example of a GUI 51 for generating a lesson content, displayed by the user terminal 1 according to an exemplary embodiment. A user may generate the lesson content based on a searched result 52 of the topic shown in the GUI 51. For example, a searched topic for the lesson contents shown in FIG. 5 is 'Conservation of Energy', and the searched result 52 shows contents classified into 1) General, 2) Steam and 3) Students' as the lesson content or the material related to the topic of 'Conservation of Energy.' The lesson content shown in FIG. 5 is an example of the shared lesson content according to this exemplary embodiment. The shared content according to this exemplary embodiment is not limited to the foregoing example, and may be achieved in various manners. For example, as shown in FIGS. 37 to 39 to be described later, various types of contents may be displayed through the GUIs 370, 380 and 390.

The user terminal 1 may use a predetermined recommendation algorithm to recommend the lesson plan or material corresponding to the topic decided by a user through the GUI 51. For example, if the lesson content or material generated by a teacher is recommended by a fellow teacher, the user terminal 1 may display a user who recommends each content, a reason for recommending each content, and similar information with respect to the searched result 52.

The user terminal 1 may classify the searched result 52 into a content 521 shared with other teachers, and a recommended content 522 and display the results on the GUI 51. The user terminal 1 may display the searched result 52 according to the type of results or may display the contents of the material in the form of a thumbnail. The GUI 51 may include items 54 corresponding to the plurality of lesson contents or material. If a user selects an item 54 of the lesson content or material which he or she is interested in among the searched results 52 while browsing the searched result 52, the selected lesson content or the like may be stored in "My Library". That is, a user may utilize the searched result 52 as a material for his/her own lesson content. For example, a user selects the item 54 of the lesson content or material which he or she is interested in, and moves it to a lesson plan region 53 within "My Library" by a Drag & Drop operation. Thus, according to an exemplary embodiment, it is possible to generate a lesson content through an intuitive and convenient method.

Figure 6:
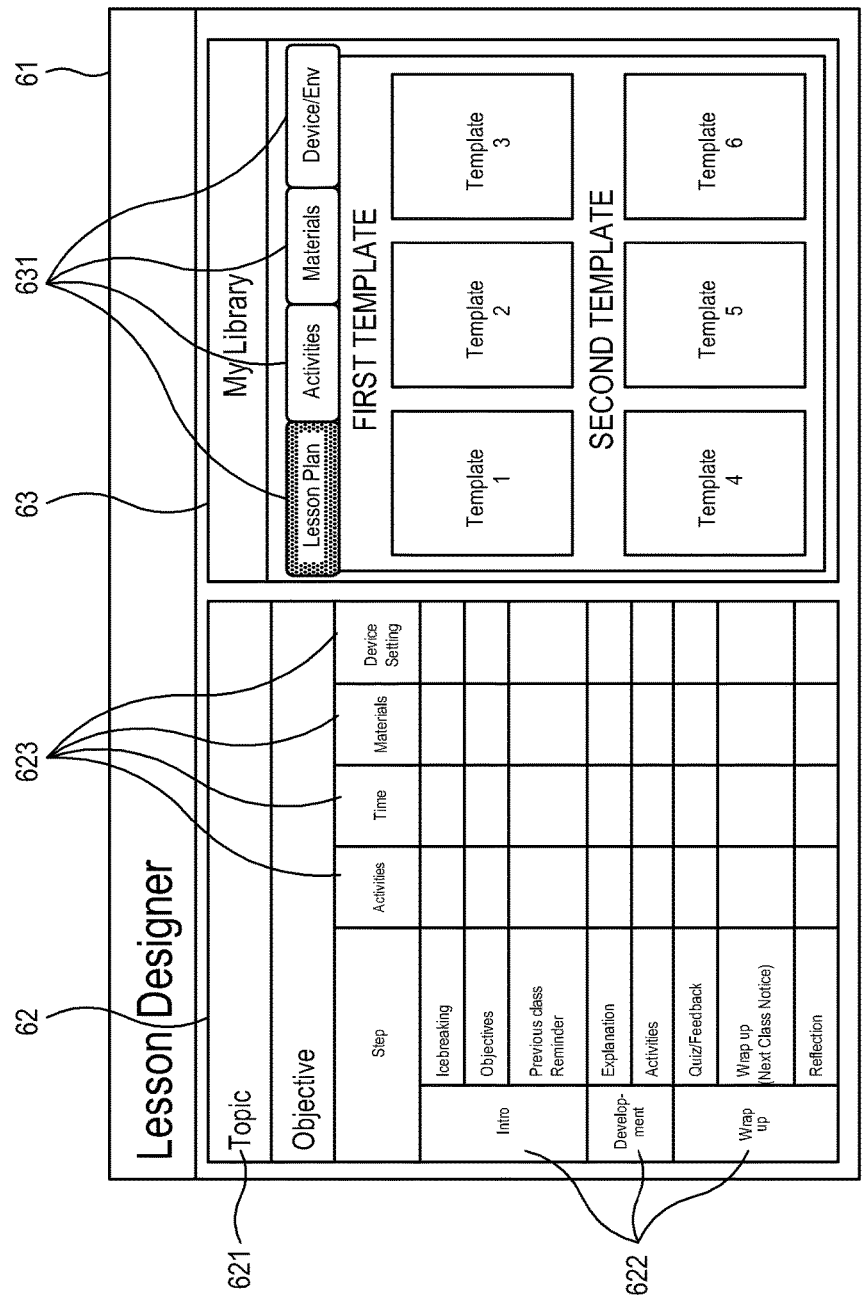
FIGS. 6 to 8 are examples of a GUI for showing a template according to an exemplary embodiment.
Figure 7:
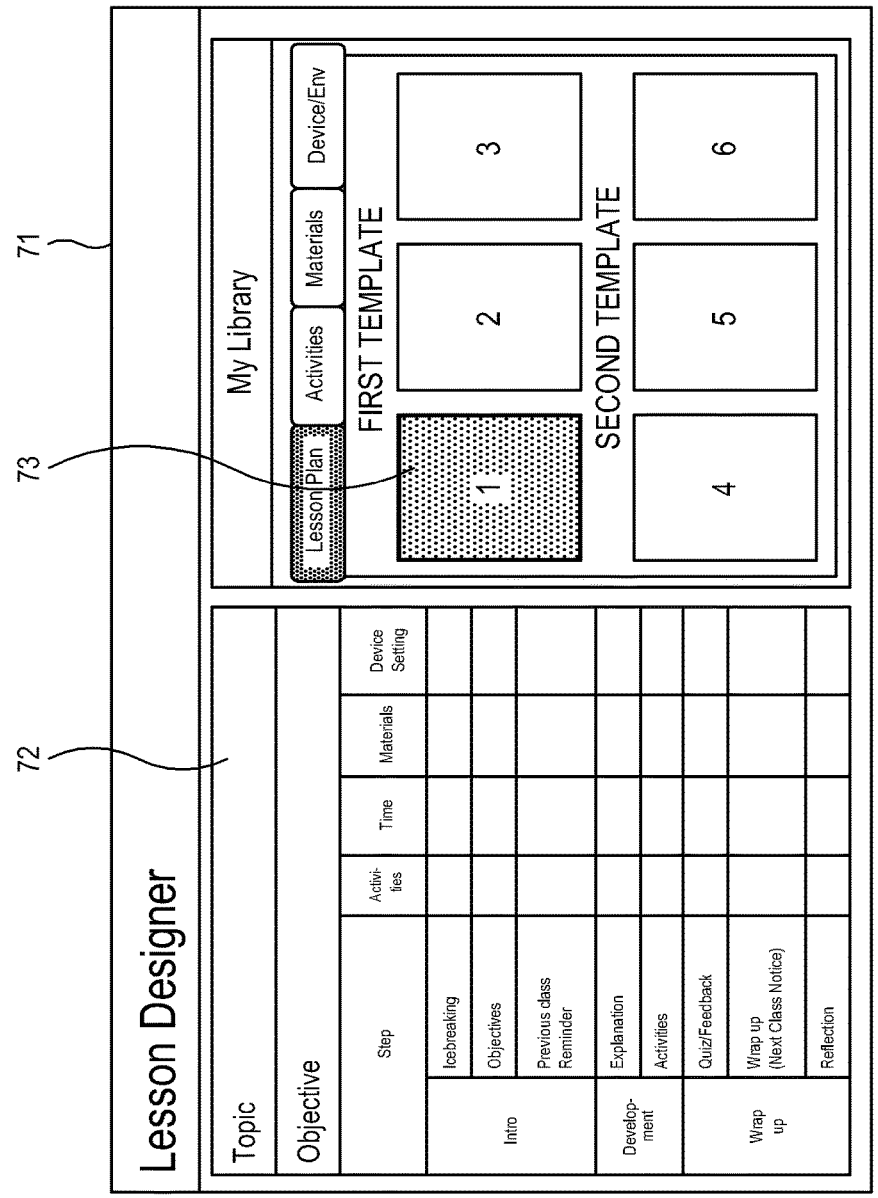
Figure 8:
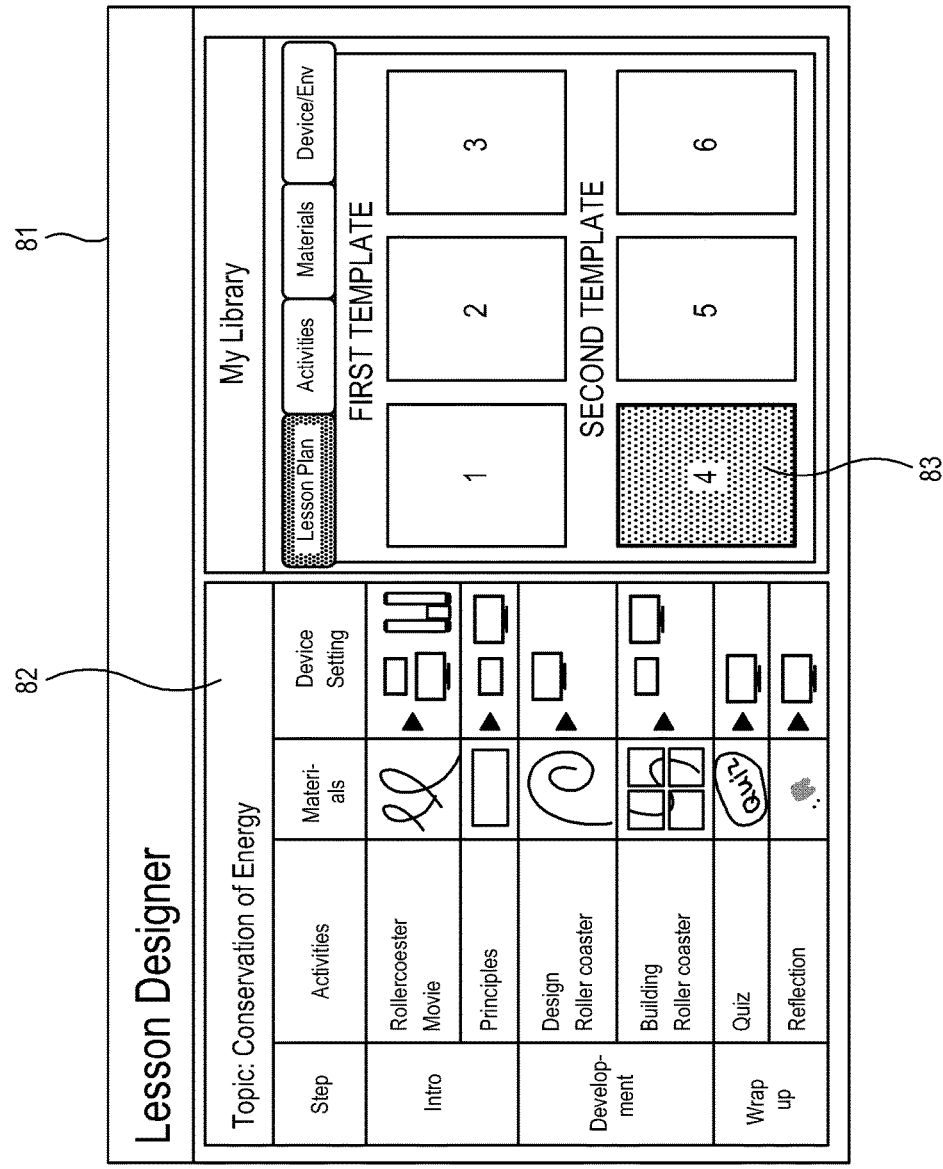

The user terminal 1 provides a template so that a user can easily generate the lesson content. FIGS. 6 to 8 show examples of a GUI 61, 71, 81 for generating a lesson content through a template according to an exemplary embodiment. As shown in FIG. 6, an item 62 corresponding to a class course may be arranged at a left side of the GUI 61, and an item 63 corresponding to the items in "My Library" may be arranged at a right side of the GUI. Referring to FIG. 6, the item 62 corresponding to the class course is provided in the form of a certain region of a table, and includes a topic 621 and fields 622 vertically arranged and related to the plurality of class courses. Also, the item 62 for the class course includes fields 623 related to activities, time, materials and device setting which are horizontally arranged. The item 63 for "My Library" includes a plurality of tabs 631. The plurality of tabs 631 may, for example, include taps corresponding to a lesson plan, activities, materials and device/environment setting. A user may design the lesson plan, the activity, the material and the device setting of the lesson content through the plurality of tabs 631.

A user selects the tab 631 corresponding to the lesson plan, and selects a desired template among the plurality of the templates. The template may include a first template where a concrete or similar activity is not designated to the item 72 of the class course but remains empty as shown in FIG. 7, and a second template where a concrete or similar activity has already been designated by a user himself/herself or by other users of the item 82 of the class course as shown in FIG. 8. These items 72 and 82 of the class course, respectively based on the first template and the second template, are shown when template selection items 73 and 83 are respectively selected within "My Library" at the right side. Taking a target lesson content into account, a user may generate the lesson content by filling the item 72 of the class course corresponding to the first template that is empty, or generate the lesson content by editing the item 82 of the class course corresponding to the second template that has already been completed.

Figure 9:
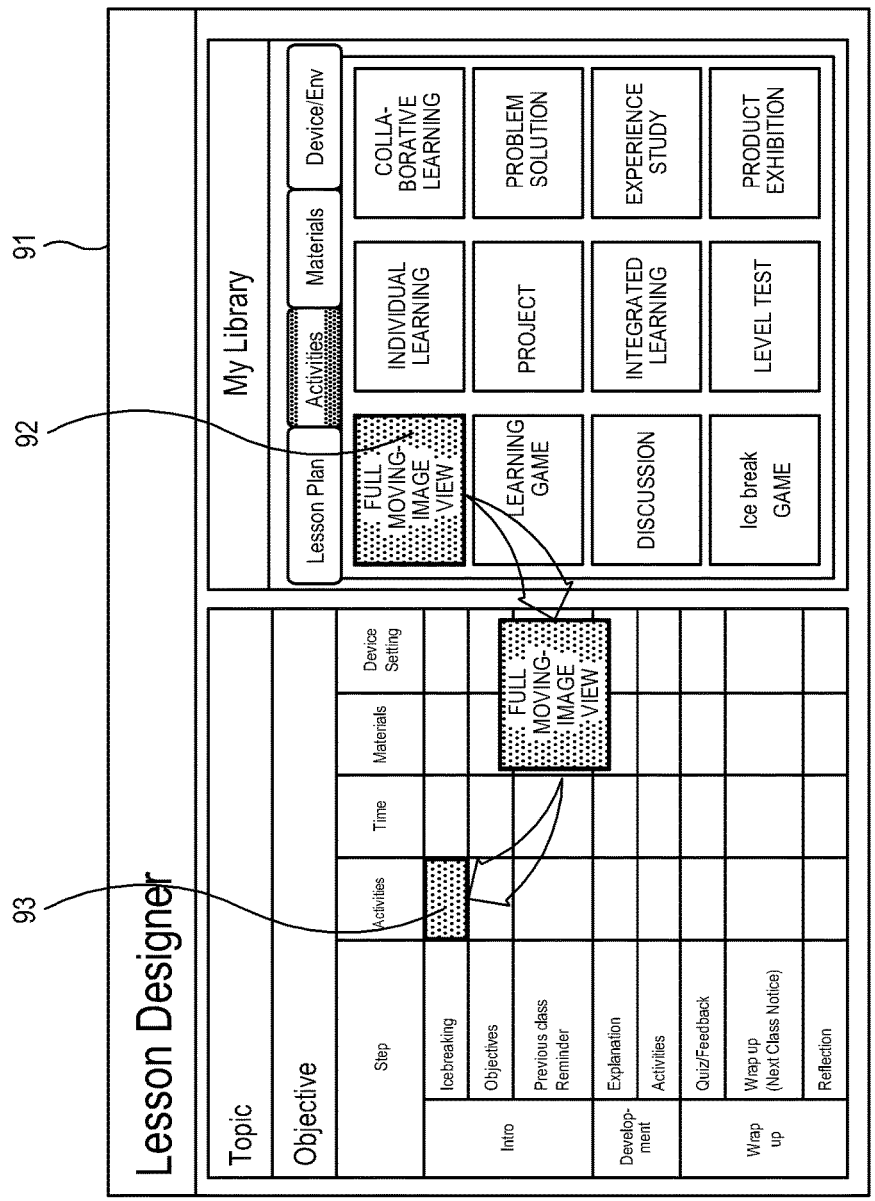
FIG. 9 shows an example of a GUI for designating an activity according to an exemplary embodiment.

When the template is selected, a user selects the tab 631 corresponding to the activities and designates the activity desired according to the respective class courses. FIG. 9 shows an example of a GUI 91 for designating the activities according to an exemplary embodiment. When the tab 631 corresponding to the activities is selected, the user terminal 1 displays an item 92 showing the activities to be designated according to the respective class courses based on information stored in the storage 12 as shown in FIG. 9. The activities may for example include full moving-image view, individual learning, collaborative learning, a learning game, etc. A user may select one item among items 92 corresponding to a plurality of activities provided within the right "My Library" folder, and designate the item 92 of the selected activity to a region among the plurality of class course regions 93 provided in the left table. For example, a user moves and designates the item 92 of the activity from the right side 92 to the region 93 of the desired class on the left table course on the left table by a Drag & Drop operation. Alternatively, a user may first select the region 93 of the activity corresponding to one class course from the left table, and then select the item 92 of the activity to be designated to the corresponding class course 93. If the activity is completely designated, the user terminal 1 may display information (e.g., a thumbnail) about the activity 92 designated onto the region 93 of the class course in the left table. A user may respectively designate the desired activities to not only the class courses 93 shown in FIG. 9 but also other class courses. The activity, the materials and the device/environment setting may be individually designated, or alternatively two or more among them may be designated at a time. In the latter case, information about an activity name, material and device setting may be involved in the activity. That is, when a user moves and designates the item 92 of the activity to the region 93 of the class course, the information about the activity name, material and device/environment setting involved in the corresponding activity may be also designated at a time. The designation of the activity or the like is not limited to the exemplary embodiment shown in FIG. 9, but may be achieved in various manners. For example, a GUI 240 shown in FIG. 24 may be used to designate the activity or the like.

Figure 10:
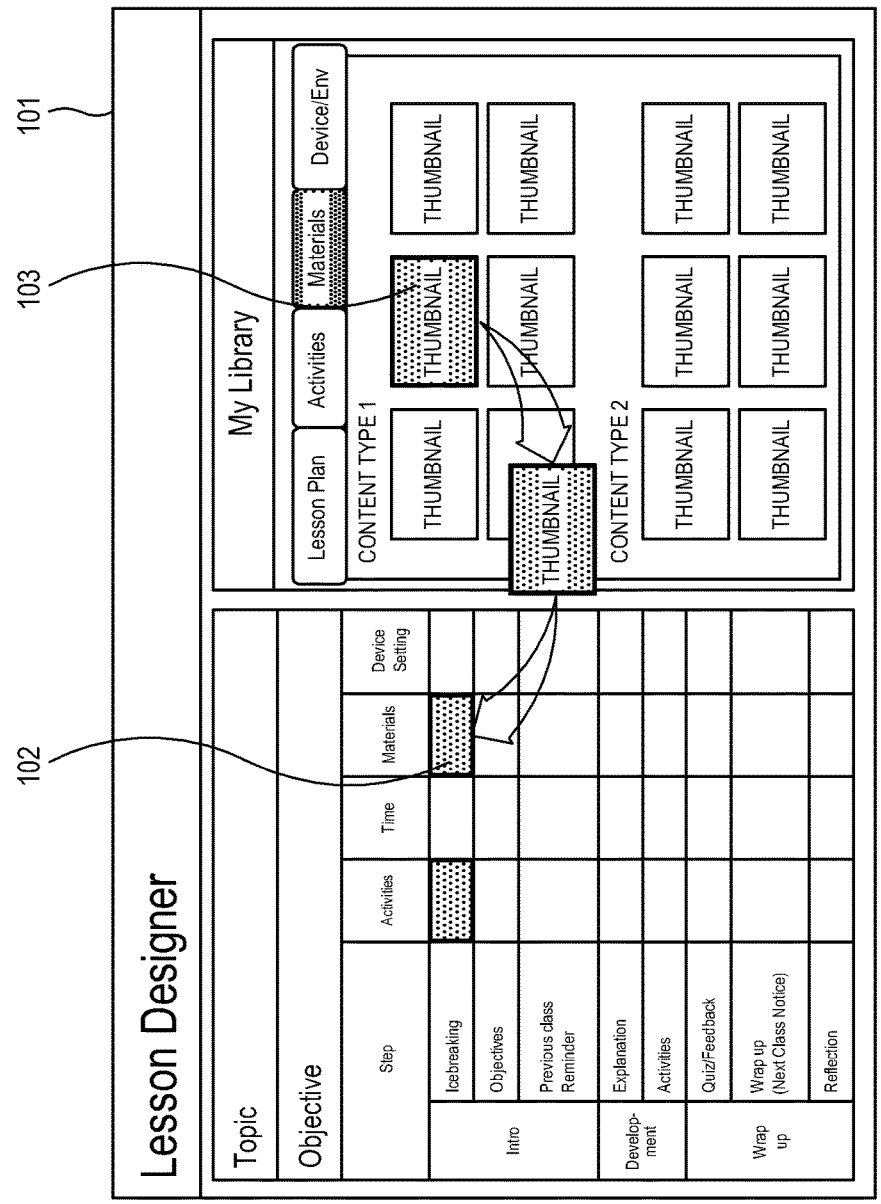
FIG. 10 shows an example of a GUI for designating a material according to an exemplary embodiment.

A user may select the tab 631 corresponding to Materials and thus designate the materials to be used in class with regard to the respective class courses. FIG. 10 shows an example of a GUI 10 for designating a material according to an exemplary embodiment. If the tab 631 corresponding to the material is selected, the user terminal 1 displays items 103 showing the materials to be designated according to the respective class courses and/or activities based on the information stored in the storage 12 as shown in FIG. 10. For example, the materials may be displayed as being classified according to the types of contents, in the form of a thumbnail (not shown for convenience). A user may select one item among the items 103 corresponding to the plurality of materials provided within the "My Library" folder at the right side, and designate the selected item 103 of the material to one region among the regions 102 corresponding to the plurality of class courses provided in the table at the left side. For example, a user may move and designate the item 103 of the material at the right side to the region 102 of the class course at the left side by a Drag & Drop operation. Alternatively, a user may first select the region 102 of one class course at the left table, and then select the item 103 of the material to be designated to the corresponding class course 102. A user may designate desired materials to not only the class course 102 shown in FIG. 10 but also the other class courses, respectively.

Figure 11:
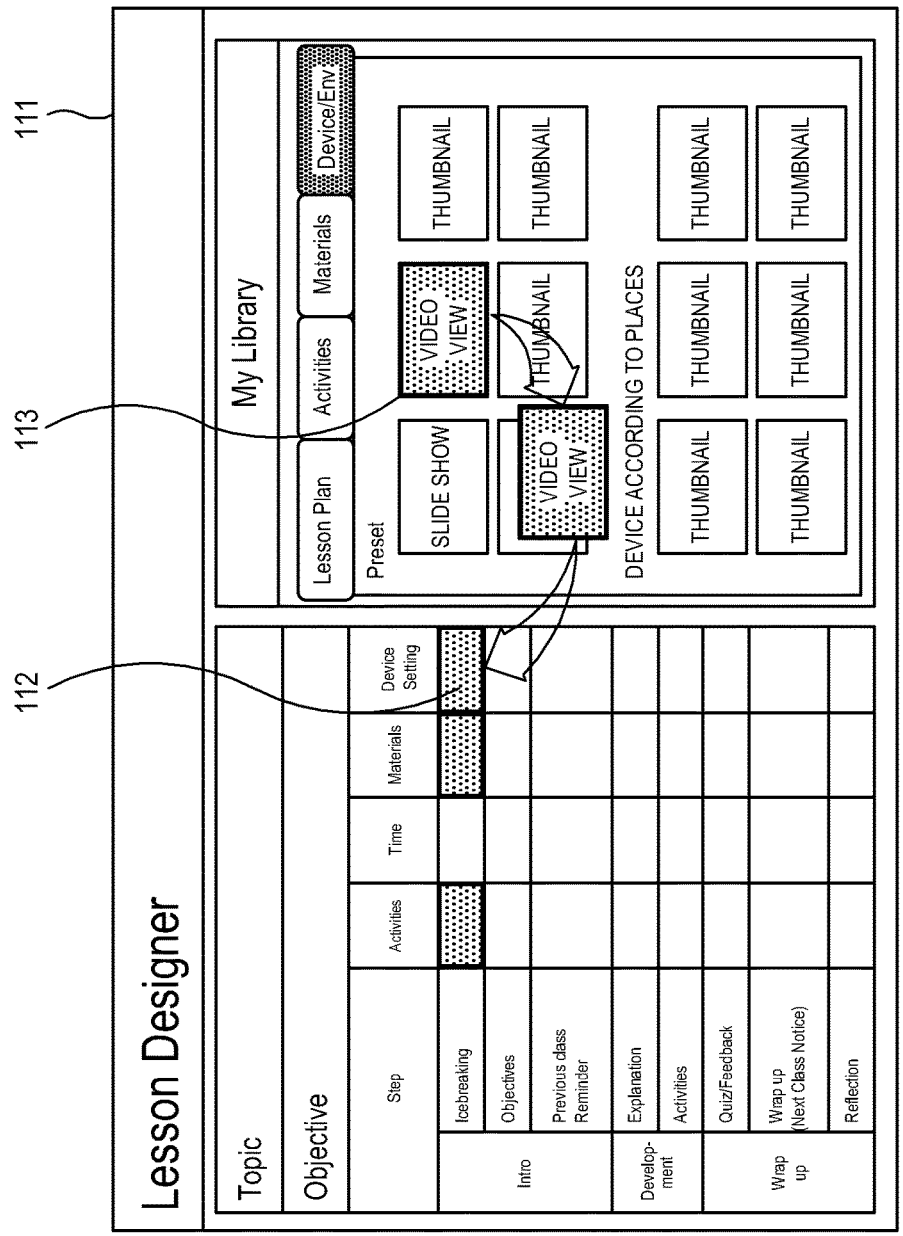
FIG. 11 shows an example of a GUI for device setting according to an exemplary embodiment.
Figure 12:
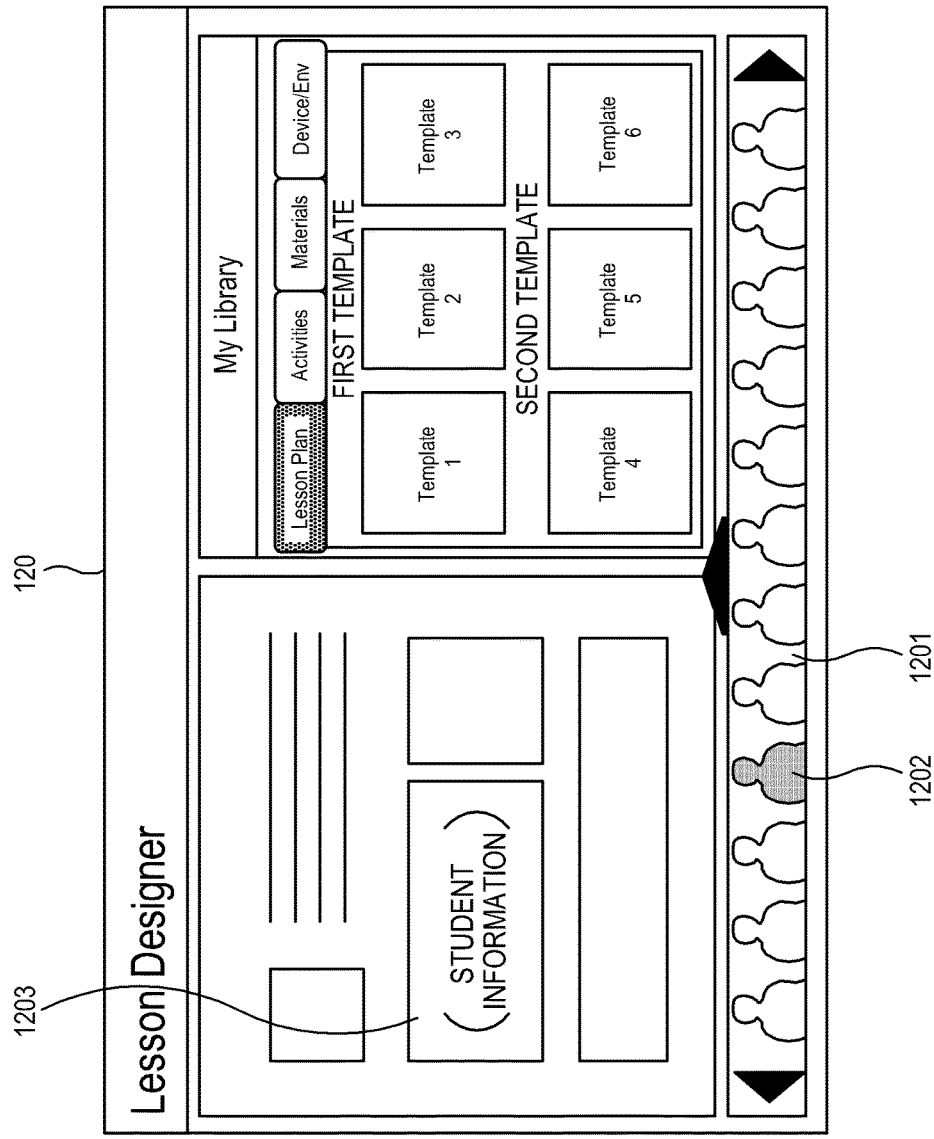
FIG. 12 shows an example of a GUI for designating lesson content corresponding to students according to an exemplary embodiment.

A user may select the tab 631 of the device/environment setting and then set up the peripheral device 6 or the environment to be used in the class with respect to each class course. FIG. 11 shows an example of a GUI 111 for the device/environment setting according to an exemplary embodiment. If the tab 631 of the device/environment setting is selected, the user terminal 1 displays the items 113 of the device/environment setting to be designated according the class course, the activity and/or the material based on the information stored in the storage 12 as shown in FIG. 11. For example, the device/environment setting may be displayed as being classified into previously prepared setting and location-based device setting. Specifically, the device/environment setting may refer to the peripheral device 6 and its environments are set up to be used suitably for cases such as 'slide show,' 'video view,' etc. A user selects one item among the items 113 corresponding to the plurality of device/environment settings provided in "My Library" at the right side, and designates the selected item 113 of the device/environment setting to one region among the plurality of regions 112 provided in the table at the left side. For example, a user may move and designate the item 113 of the device/environment setting to the region 112 of the class course in the table at the left side of the GUI 111 by a Drag & Drop operation. Alternatively, a user may first select the region 112 of one class course at the left table, and then select the item 113 of the device setting to be designated to the corresponding class course 112. A user may designate a desired device/environment setting to not only the class course 102 shown in FIG. 11 but also the other class courses, respectively. A user may set up the lesson content according to students who take the class. FIG. 12 shows an example of a GUI 120 for setting up the lesson content based on students according to an exemplary embodiment. When the lesson content is set up according to the students, as shown in FIG. 12, the user terminal 1 displays an item 1201 which depicts a plurality of students who can take the class based on the information stored in the storage 12. When an item 1202 corresponding to one student is selected, the user terminal 1 may display detailed information 1203 corresponding to the selected student. A user may set up the lesson content according to the students, based on the detailed information 1203 about the students.

A user may share the completed lesson content with other users. The user terminal 1 may transmit the completed lesson content or its relevant information to the server 2 or other user terminals 3 and 4 in response to a user's sharing request. Also, if another user searches a corresponding topic through the user terminal 3, 4, it is possible to check the information about the lesson content generated by a user of the user terminal 1, and receive the corresponding lesson content and its relevant information from the user terminal 1 through the user terminal 3, 4 if desired. Also, the user terminal 1 receives feedback information about the lesson content shared with the user terminal 3, 4 of another teacher or student and provides it to a user.

The generated lesson content is used in class. A user may proceed with the class using the lesson content 121 stored in the user terminal 1. Further, a user may use the lesson content 121 by transmitting it to another user terminal. The user terminal 1 may provide the activity and material corresponding to each class course with reference to the lesson plan configuration information 1211 involved in the lesson content 121. For example, as shown in FIG. 9, when the lesson content 121 is executed, the user terminal 1 informs a user that the activity of 'full moving-image view' is designated to the class course of 'Icebreaking' in 'Intro'. Also, referring to FIG. 10, the user terminal 1 informs that there is a material (e.g., a full moving-image file, etc.) usable in the activity of 'full moving-image view'. In response to a user's request, the user terminal 1 provides the corresponding material (e.g., plays a full moving-image) so that a user can use it. The lesson content 121 may include the corresponding material 1217, or the lesson plan configuration information 1211 may include the material information 1214 for taking the corresponding material (e.g., Internet site address of the server where the material is uploaded, connection information of other devices storing the material, etc.) In the latter case, the user terminal 1 may receive the corresponding material from the server with reference to the material information 1214, e.g., by accessing the server of the Internet site address, and provide it to a user.

The user terminal 1 may use the peripheral device 6 in providing the material. For example, the user terminal 1 may use a display device (a protector or the like) capable of displaying an image of a moving-image file to reproduce the moving-image file, and an amplifier or loudspeaker for outputting sound of the moving-image file. Further, the user terminal 1 may use a lighting device, a screen for the projector, a light-shielding device, etc. provided in the classroom where the lesson takes place. As described above with reference to FIG. 11, the user terminal 1 may control the peripheral device 6 to operate based on the setting in accordance with the device/environment setting information 124 previously set up and stored when the lesson content 121 is generated. The device/environment setting may for example include the brightness/color of the display, the volume of the loudspeaker, the brightness of ambient lighting, upward/downward movement of a projector screen, opening/closing of the light-shielding device, etc. The user terminal 1 may transmit the corresponding setting information to the connected peripheral device 6 in accordance with the stored device/environment setting, automatically when connecting with the peripheral device 6 used in class or when there is a request from a user.

Thus, according to an exemplary embodiment, a teacher may previously prepare for and set up the activity, the material, the class environment, etc. through the user terminal according to the class courses. Also, the preset content can be automatically performed with only a simple input to the user terminal during the class, so that a teacher and students can pay attention in the class. Further, the completed lesson content is easily shared with the user terminals of other teachers and students, thereby minimizing time and effort taken to download and install it.

According to another exemplary embodiment, the user terminal 1 may allow different users to collaboratively generate the lesson content. Specifically, generation roles according to the class courses or the activities may be shared between the different users. Alternatively, the generation may be primarily performed by one user and secondarily reviewed or modified by another user. The user terminal 1 communicates with the server 2 so that different users can collaboratively generate the lesson content. The user terminal 1 transmits the lesson plan configuration information about the lesson content, which is generated or edited by a first user through the user terminal 1, to the server 2. Also, the user terminal 1 receives the lesson plan configuration information about the same lesson content, which is generated or edited by a second user of a different user terminal 3, from the server 2. The user terminal 1 informs the first user of user terminal 1 of the lesson content generated or edited by the second user of the different user terminal 3, based on the lesson plan configuration information received from the server 2. If a generation role is assigned to the first user with regard to a certain class course or an activity, the user terminal 1 informs a user of this. In detail, referring to FIG. 9, the user terminal 1 activates only the item of the certain class course or activity for which the generation role is given to the first user on a GUI 91, thereby allowing the first user to generate the lesson contents with regard to only the corresponding class course or activity. The user terminal 1 may receive information about a certain class course or activity given to the first user from the server 2. Also, the user terminal 1 may assign the generation role for the certain class course or activity to the first user in response to a request from the first user. In this case, the user terminal 1 sends the server 2 the information that the generation role for the certain class course or activity is assigned to the first user. Thus, according to this exemplary embodiment, it is more convenient and effective to generate the lesson content since one lesson content can be collaboratively generated or edited by different users.

Figure 13:
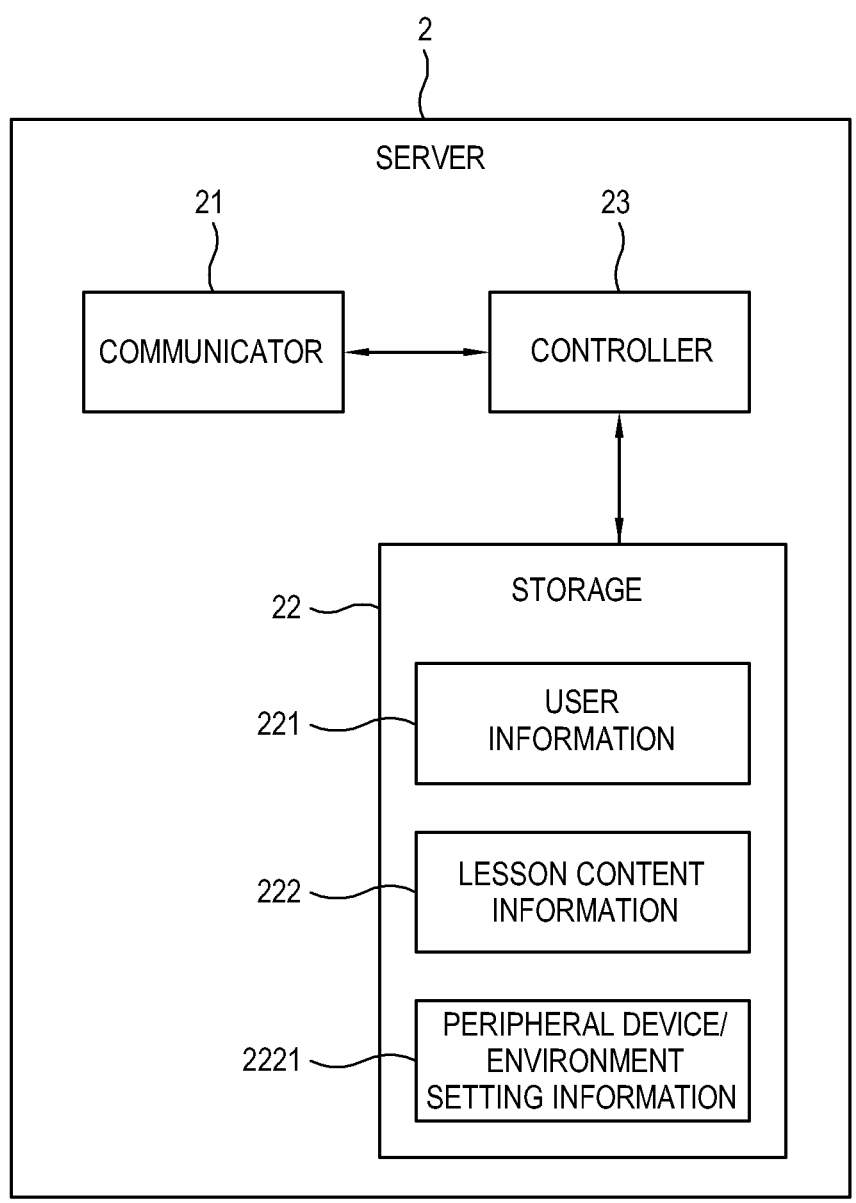
FIG. 13 shows elements of a server according to an exemplary embodiment.

FIG. 13 is a block diagram showing a configuration of the server 2 according to an exemplary embodiment. The server 2 provides a service related to the lesson content. The server 2 interworks with the user terminals 1, 3 and 4 and the peripheral device 6 in order to generate and manage the lesson content and control the manner in which the class is taught. The server 2 may provide services related to the lesson content, for example, information such as personal data of a teacher and a student, class process/attendance managed by a teacher, a teacher's work state related to homework, a teacher's work state related to assessment, a forum and issue discussion of teachers or students, etc.

The server 2 receives the request for information required for generating the lesson content from the user terminal 1, and transmits the required information to the user terminal 1 in response to the request. Also, the server 2 takes the material 182 needed for teaching the class in response to the request from the user terminal 1, and provides it to the user terminal 1. Also, the server 2 may set up the peripheral device 6 or the classroom environment in response to the request from the user terminal 1 while proceeding with class.

In light of providing a service related to the lesson content, the server 2 may manage an account of a teacher or student. If a teacher accesses and logs in to the server 2 with his/her own account through the user terminal 1, the server 2 determines whether the teacher who has logged into the user terminal is a previously registered teacher, and informs the user terminal 1 of this, thereby allowing the corresponding teacher to continue to generate the lesson content. In this case, the server 2 may provide the user terminal 1 with the previously generated lesson content of the corresponding teacher or information about a lesson content recommended to the corresponding teacher in response to the request from the user terminal 1 or automatically. To this end, the server 2 uploads and stores information about the lesson contents generated by a plurality of teachers from their user terminals 1, and provides the information about the stored lesson contents to other teacher's user terminals 1. The server 2 may manage sharing authority with respect to the lesson contents uploaded from the user terminals 1 of the plurality of teachers. That is, with regard to a certain uploaded lesson content, the server 2 may enable only a teacher having the sharing authority to access and download the corresponding lesson content.

The server 2 searches a certain topic of the lesson content in response to the request from the user terminal 1, and provides a searched result to the user terminal 1. The server 2 may retrieve the corresponding topic of the lesson content in the storage 22, or submits a request to search for the corresponding content through the Internet or other devices, and receive the searching result. To improve a searching efficiency, the server 2 may sort and store information about the lesson contents in the storage 22 in accordance with the topics or categories.

When the lesson content is generated, the server 2 may provide the user terminal 1 with information such as a class list according to courses to proceed in a corresponding semester of a corresponding teacher, basic information about the class being inquired, a unit plan list generated with respect to the inquiring class, a lesson plan list according to class courses generated with regard to the selected unit, an item of the most recently generated lesson content, etc. in response to the request from the user terminal 1 or automatically. When the lesson content is generated, the server 2 may provide the user terminal 1 with information about a teaching-learning method available in class, in response to the request from the user terminal 1 or automatically. For example, the server 2 may manage information about a plurality of kinds of teaching-learning method, and provides the user terminal 1 with information about at least one kind of teaching-learning method corresponding to the topic of the corresponding lesson contents. At this time, if one of the teaching-learning methods is selected in the user terminal 1, the server 2 may provide the user terminal 1 with information about the activity or material corresponding to the selected teaching-learning method. If a teacher selects one class course while the lesson content is generated through the user terminal 1, the server 2 may provide the user terminal 1 with the information about the activity or material corresponding to the selected class course. The server 2 may receive every result of generating the lesson contents from the user terminal 1 and store it in the storage 22. The server 2 may individually manage every result of generating the lesson content performed in the user terminal 1 according to corresponding teachers (i.e., corresponding to "My Library" of the user terminal 1).

The server 2 may provide the user terminal 1 with information about team organization in class, the class, etc. to the user terminal 1 when the lesson content is generated. For example, the server 2 manages information about a list of classes, the number of persons per class, a group for organizing a team, etc., and provides the user terminal 1 with information about a setting needed for the lesson plan according to the class courses.

When the lesson content is generated, the server 2 may provide the user terminal 1 with information about the peripheral device 6 or the environment setting in response to the request from the user terminal 1. While proceeding with the class, the server 2 may also perform control for the peripheral device 6 or the environment setting in response to the request from the user terminal 1 based on the setting of the lesson content. The server 2 may recommend a certain peripheral device or environment setting to the user terminal 1 based on the corresponding class course, the activity, etc. or an attribute of the user terminal 1. The server 2 may provide the user terminal 1 with information about the peripheral device 6 which may be rented for the corresponding class.

The server 2 may provide a teacher forum for the community of teachers among a plurality of teachers. In connection with the forum service, the server 2 may provide the user terminal 1 with information about a list of contents registered by a teacher, a list of discussions registered by a teacher, content recommendation information (best/recommended/new banner), the latest contents according to categories, etc. To provide the foregoing information, the server 2 may collect and manage information about reading, uploading, downloading, reviewing, quoting and recommending the lesson content from the user terminals 1 corresponding to a plurality of teachers. A GUI related to the forum service provided by the server 2 will be described with reference to FIG. 37.

The server 2 includes the communicator 21, the storage 22 and the controller 23. The communicator 21 communicates with the user terminals 1, 3 and the peripheral device 6 through the network 5. The storage 22 stores data and information for generating and managing the lesson content, and controlling the peripheral device/environment. The storage 22 may store user information 22 of personal data about a plurality of users, lesson content information 222 about the lesson content shared among the plurality of users, and peripheral device/environment setting information 2221 for controlling the peripheral device 6 and the classroom environment. The user information 22 may contain information about the name of each user, ID information, information about the shared lesson content, etc. The lesson content information 222 may contain the title of the lesson content shared among many users, ID, the lesson plan configuration information, information about sharing users, information about the generation role of each user in the case of collaborative generation, data about contents, etc. The controller 23 performs control for generating and managing the lesson content.

If the lesson content is completely generated by a first user in the user terminal 1, 3, the controller 23 receives information about a user and the generated lesson content from the user terminal 1, 3 in response to a sharing (uploading) request from a first user, and stores the received information in the storage 22. Also, the controller 23 transmits the shared information about the lesson content to the user terminal 1, 3 in response to a sharing (downloading) request from a second user. The controller 23 searches the stored lesson content information 222 with regard to a predetermined topic in response to a searching request of the second user, and transmits the searching result to the user terminal 1, 3.

Figure 14:
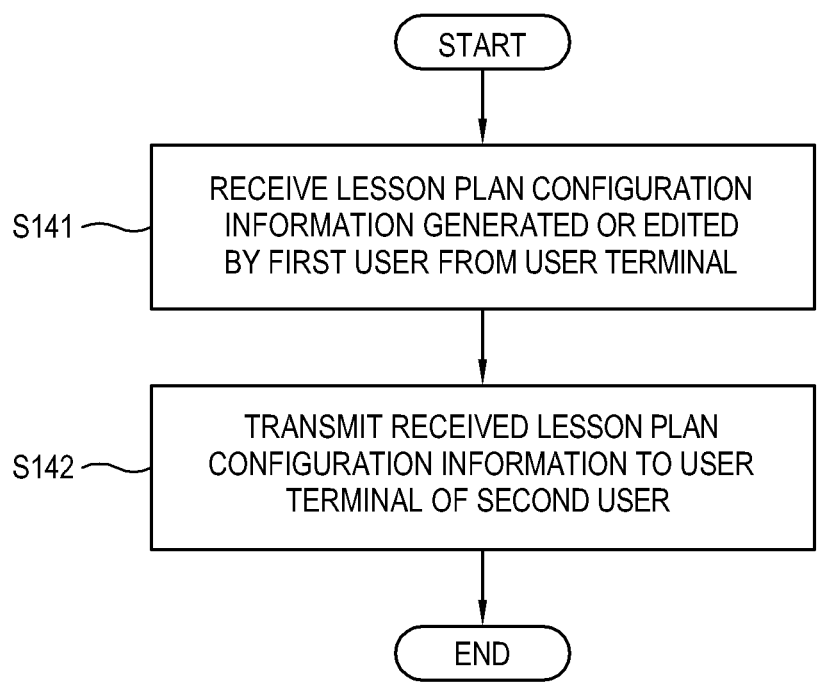
FIG. 14 is a flowchart showing operations of a server according to an exemplary embodiment.

FIG. 14 is a flowchart showing operations of the server 2 according to an exemplary embodiment the server 2. The controller 23 performs mediation if there is a request for collaborative generation from many users. Specifically, if the first user of the user terminal 1 and the second user of the user terminal 3 collaboratively generate the lesson content, the controller 23 receives the lesson plan configuration information generated or edited by the first user of the user terminal 1 from the user terminal 1 (operation S141), and transmit the received lesson plan configuration information to the user terminal 3 (operation S142). Further, the controller 23 receives the lesson plan configuration information generated or edited by the second user of the user terminal 3 from the user terminal 3 and transmits it to the user terminal 1. Also, with reference to the lesson content information 222, the controller 23 respectively transmits information about the generation roles given to the first and second user to the user terminals 1 and 3 if the generation roles about a certain class course or activity are assigned to the first and second users.

Figure 20:
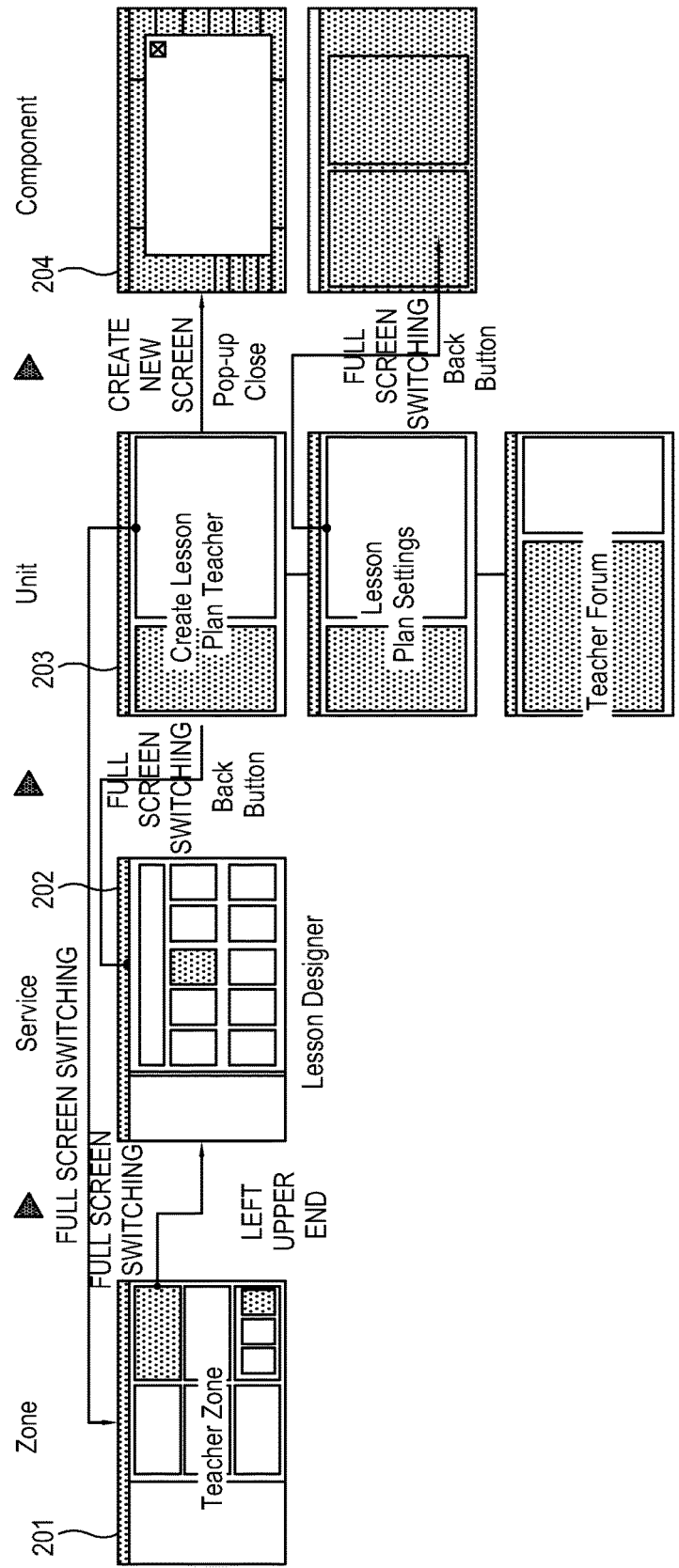
FIG. 20 shows an example showing a switch between GUIs displayed on the user terminal according to an exemplary embodiment.

FIG. 20 illustrates an example showing a switch between GUIs displayed on the user terminal 1 according to an exemplary embodiment. As shown in FIG. 20, the user terminal 1 may stepwise display the GUIs 201 to 204. For example, the user terminal 1 may display the GUIs 201 to 204 in four stages of 'Zone', 'Service', 'Unit' and 'Component'. The user terminal 1 may switch between the GUIs 201 to 203 of the respective stages or create or eliminate the GUI 204 of the 'Component' stage in response to a user's input. The switch, creation or elimination of the GUIs 201 to 204 of the respective stages may be switched when a user selects a certain item included in the GUIs 201 to 204, or where there is a preset key input. Specifically, if a certain zone is selected in the GUI 201 of the 'Zone' stage, the GUI 202 is displayed corresponding to a service of a corresponding zone. If a certain unit in the GUI 202 is selected, a corresponding GUI 203 is displayed. If a certain item is selected on the GUI 203, the GUI 204 corresponding to the 'Component' stage is popped up and displayed. For example, the GUI 201 of 'Teacher Zone' may be switched into the GUI 202 of 'Lesson Designer,' and the GUI 202 of 'Lesson Designer' may be switched into the GUI 203 of 'Create Lesson Plan_Teacher', 'Lesson Plan Settings' or 'Teacher Forum,' and vice versa.

Figure 21:
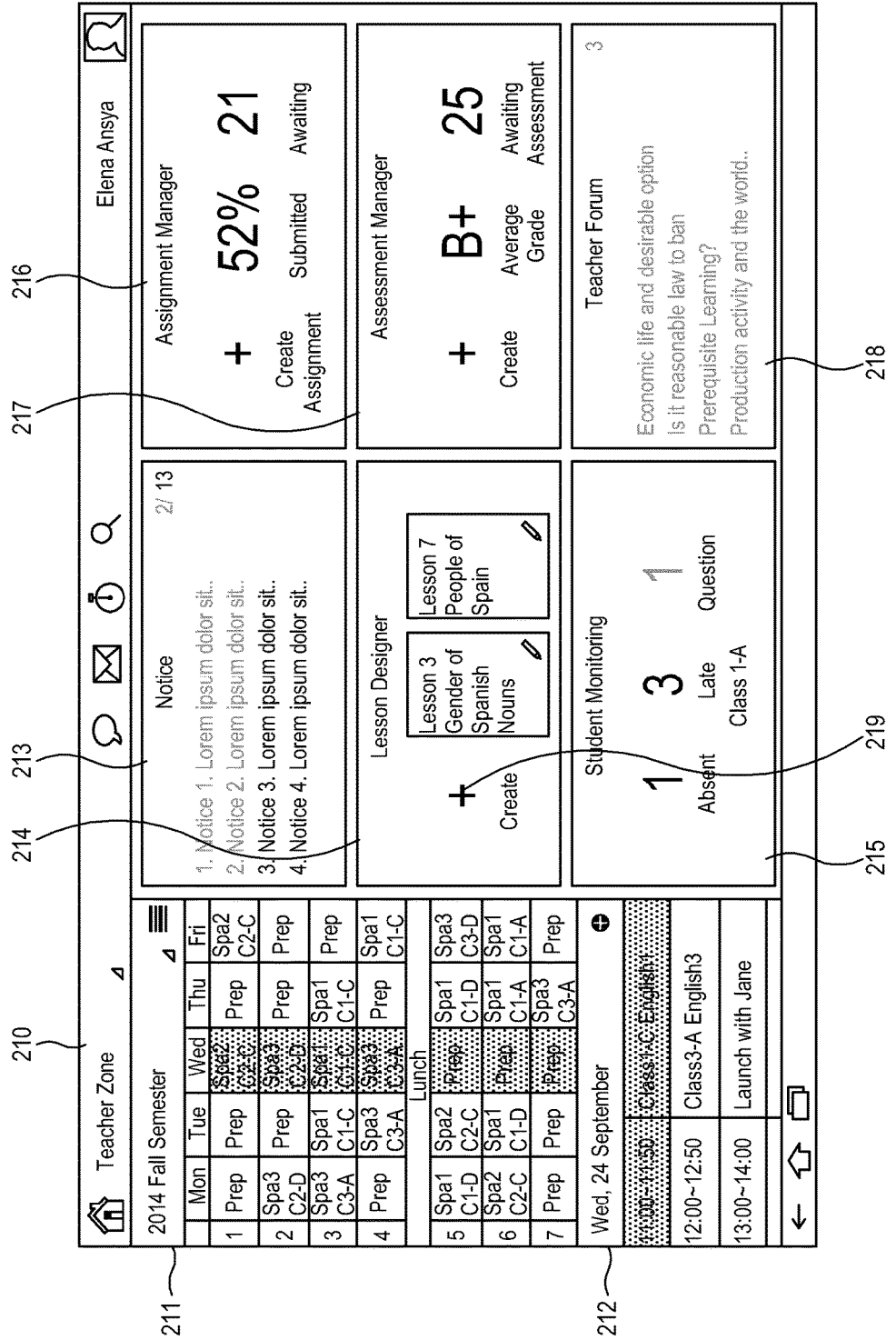

FIG. 21 shows an example of the GUI of the 'Zone stage' displayed by the user terminal according to an exemplary embodiment. A GUI 210 shows a main screen for 'Teacher Zone'. The GUI 210 shows information of services that constitute the respective zones 211 to 218. The services of the respective zones 211 to 218 may include Time Table 211 showing a class schedule planed by a teacher according to semesters; Schedule List 212 providing schedules of the corresponding date; Notice 213 providing the latest notice related to 'Teacher Zone'; Lesson Designer 214 providing a new lesson plan for generation or the lesson plan being generated; Student Monitoring 215 providing attendance, question information, etc. of the class being managed by a teacher; Assignment Manager 216 proving information and shortcut about a teacher's work state related to homework; Assessment Manager 217 providing a teacher's work state related to assessment; and Teacher Forum 218 providing a forum, issue discussion or similar latest information. In the service of 'Lesson Designer' 214, is shown an initial screen when a teacher executes a service application or performs a logon operation with his/her own account, which may be provided in such a way of entering the function of generating the lesson plan. A user may select the item 219 and newly generate the lesson content.

Figure 22:
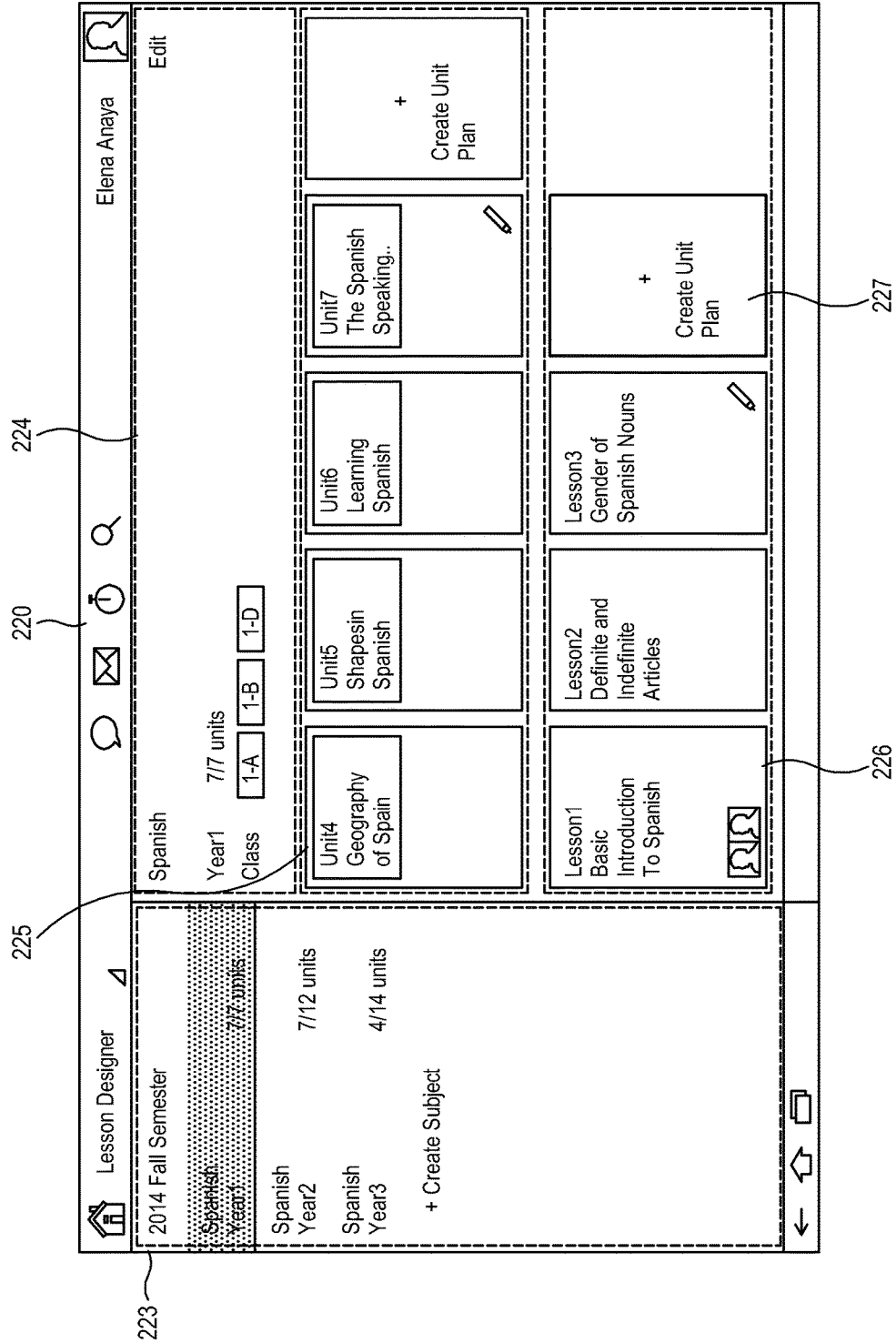

FIG. 22 shows an example of a GUI of the 'Service stage' displayed by the user terminal 1 according to an exemplary embodiment. The GUI 220 shows the initial screen of 'Lesson Designer' service for a teacher. The GUI 220 shows information about Units 223 to 226 that constitute the corresponding service of 'Lesson Designer.' The service of 'Lesson Designer' may include Semester List 223 showing a class list according to courses to be taught by a teacher in the corresponding semester; Subject Basic Information 224 providing basic information about the class being inquired; Unit Plan List 225 providing a unit plan list generated with respect to the inquiring class; and a Lesson Plan List 226 according to class courses generated with regard to the selected unit. The Unit Plan List 225 and Lesson Plan List 226 are focused on the most recently generated item, and scrollable from side to side. A user may select the item 227 and generate a new lesson plan.

Figure 23:
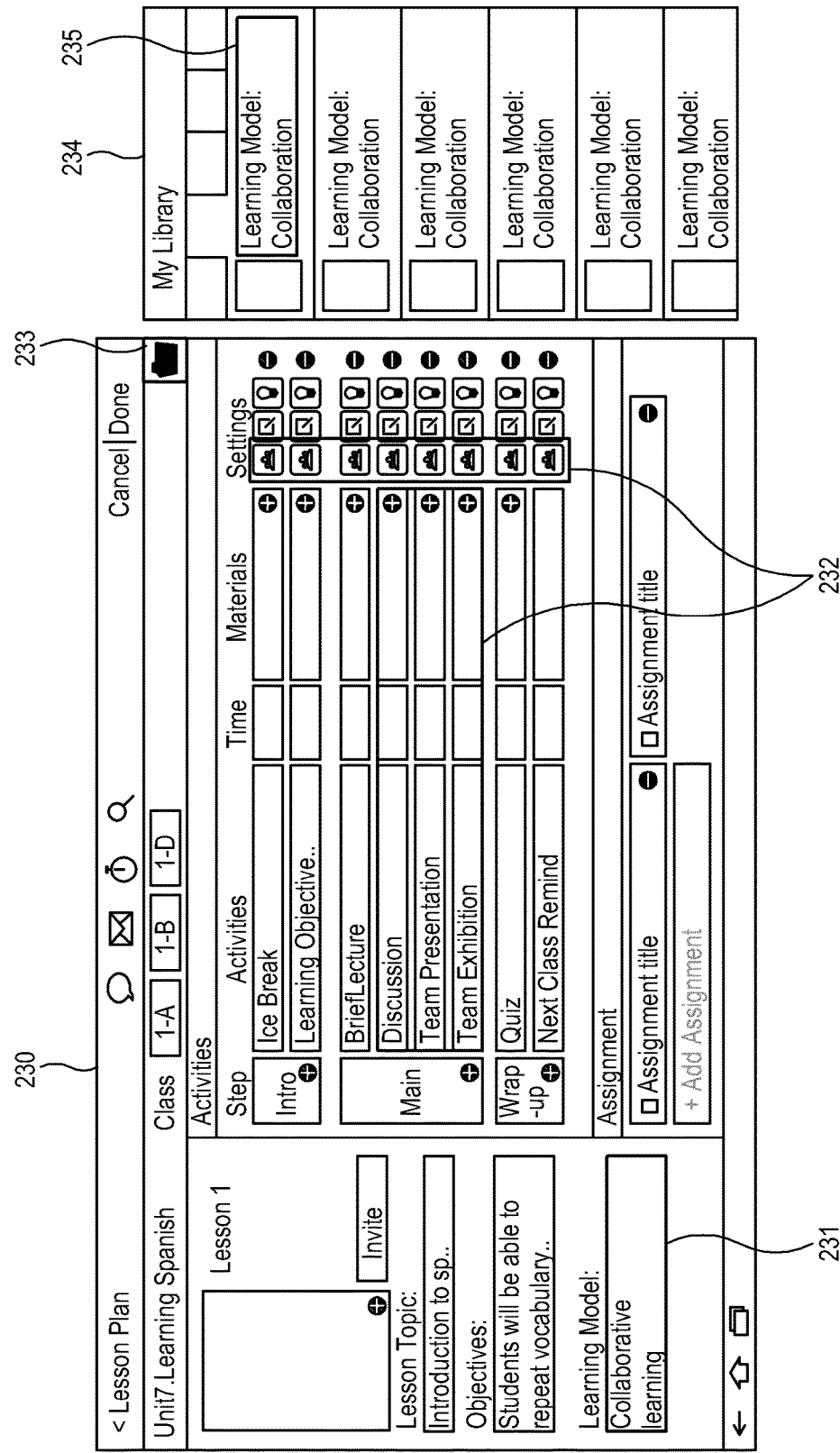

FIG. 23 shows an example of a GUI showing an initial screen for generating the lesson content, displayed on the user terminal 1 according to an exemplary embodiment. The GUI 230 corresponds to an empty template before generating the lesson content. A user may use the item 231 to select a desired teaching-learning method. The GUI 230 may show different configurations of the template according to the selected teaching-learning method. The GUI 230 shows information 232 about the activity and material related to the corresponding teaching-learning method. For example, if the item of 'Collaborative learning' is selected, a representative collaborative activity is added, and Default Template including setting for organizing a team may be provided. Meanwhile, if a user selects the item 233, a "My Library" list 234 may be popped up and displayed. The "My Library" list 234 is a GUI corresponding to the 'Component' stage. In the "My Library" list 234, contents 235 of the corresponding teaching-learning method may be sorted and displayed. If a lesson content, an activity or similar contents of another user are uploaded to 'Teacher Forum' (to be described later), information about the uploaded contents may be displayed on the GUI 230.

Figure 24:
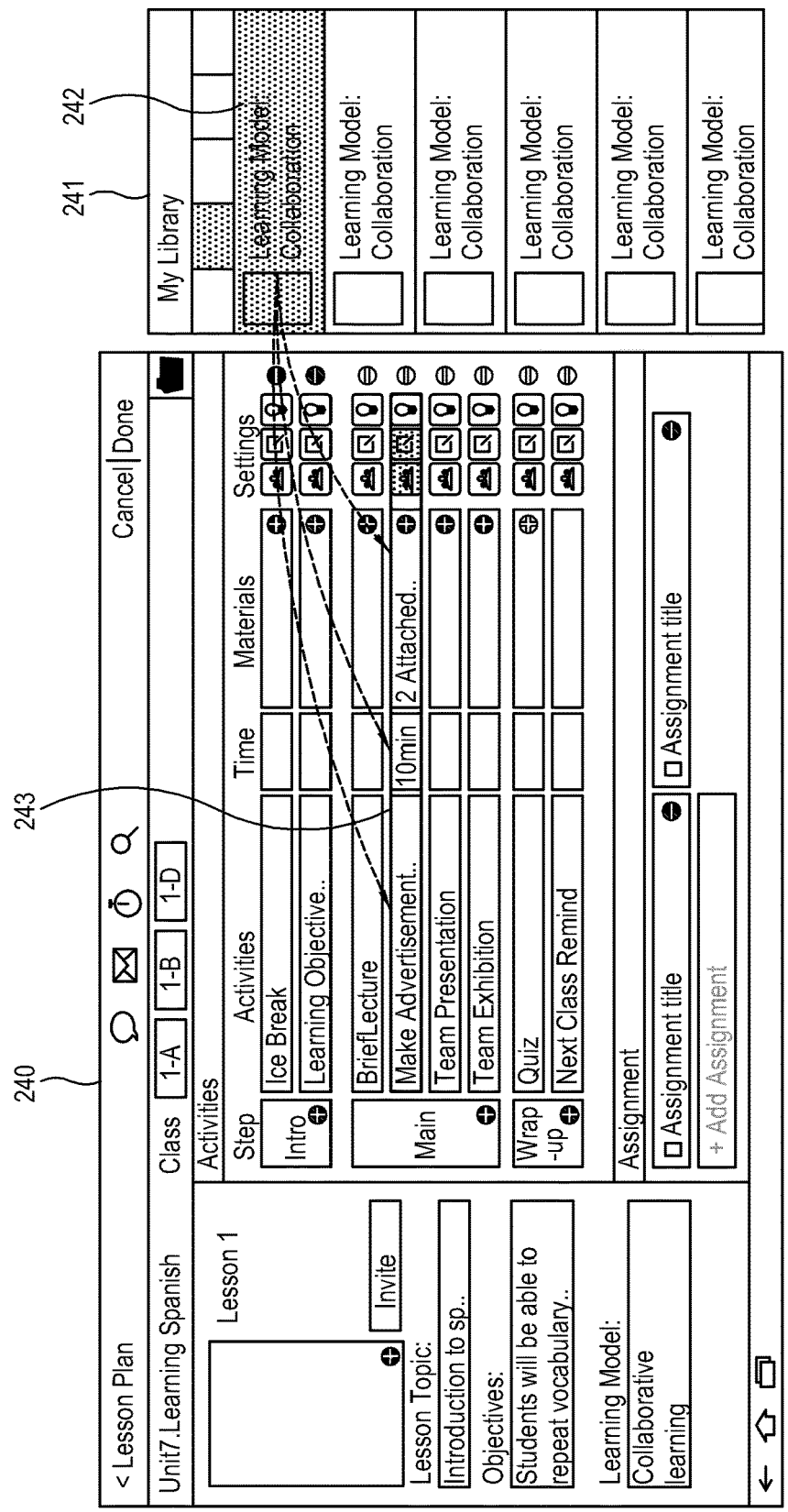

FIG. 24 illustrates an example of a GUI showing a screen for generating the lesson content, displayed on the user terminal 1 according to an exemplary embodiment. If a user drags a content 242 of the activity on a tab of Activities in "My Library" 241 and drops it to a desired region among the regions 243 corresponding to the activities provided in the GUI 240, the user terminal 1 fills the corresponding region 243 with corresponding information, e.g., with the activity name, time, material, setting, etc. with reference to the activity information 1213 stored in the storage 12.

Figure 25:
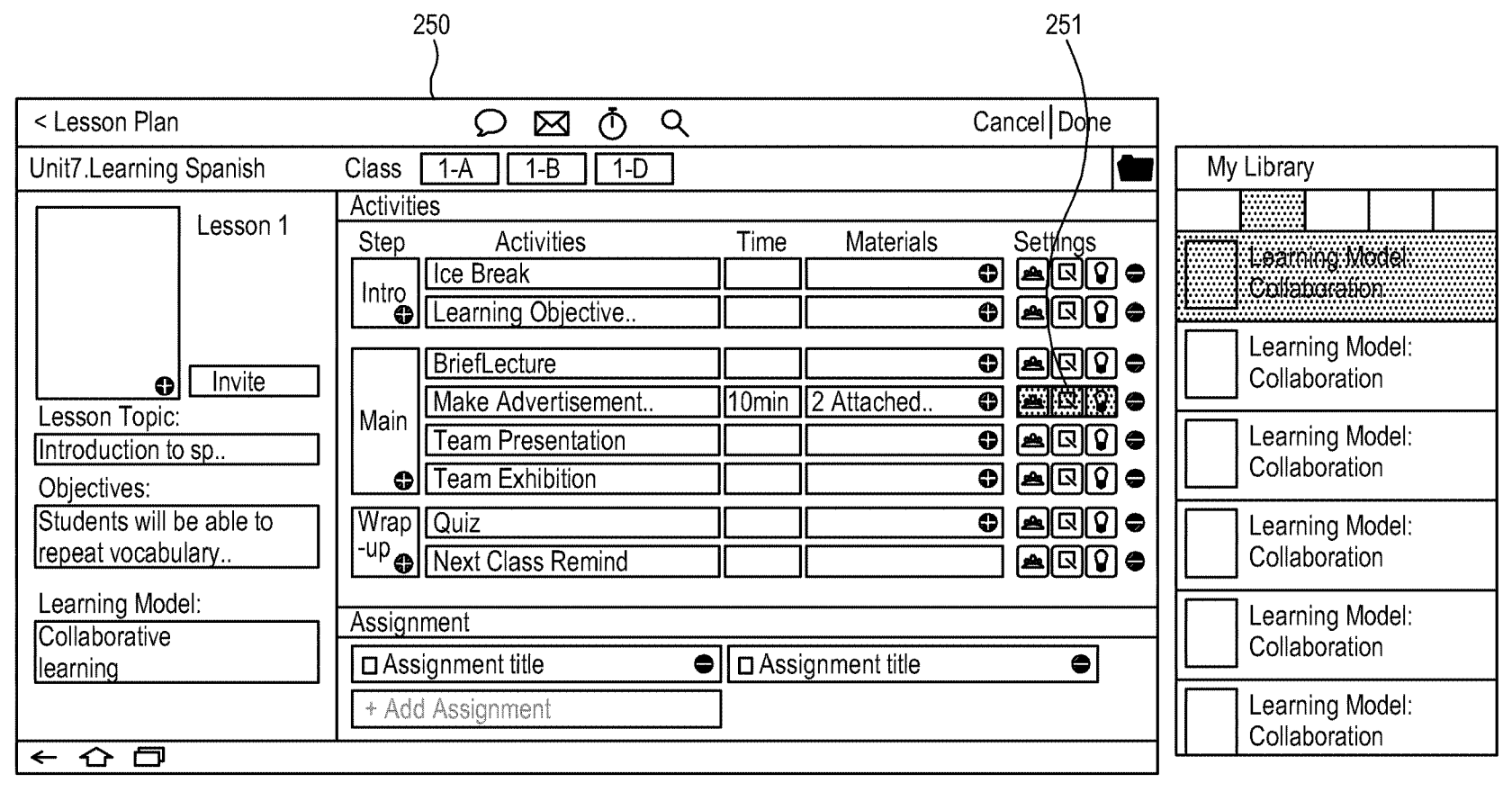

FIG. 25 shows another example of the GUI showing the screen of generating the lesson content, displayed on the user terminal 1 according to an exemplary embodiment. The GUI 250 includes an item 251 for the device setting. If a user selects the item 251, a relevant setting screen may be displayed (details of the setting screen will be described later). The setting for the device setting may be changed differently from the setting designated in the activity information 1213. In this case, the settings may be reset by the following methods. First, if a team member is varied, it may be reset in 'Auto/Manual' of 'Team Making' provided in 'Lesson Plan Settings' (to be described later). Second, if the device setting is performed again because a lesson place is different from a place set up in the activity information 1213, it may be recommended and displayed as 'device the same as or similar to the kind of setting device' on the screen of Environment Setting screen of Device Settings (to be described later).

Figure 26:
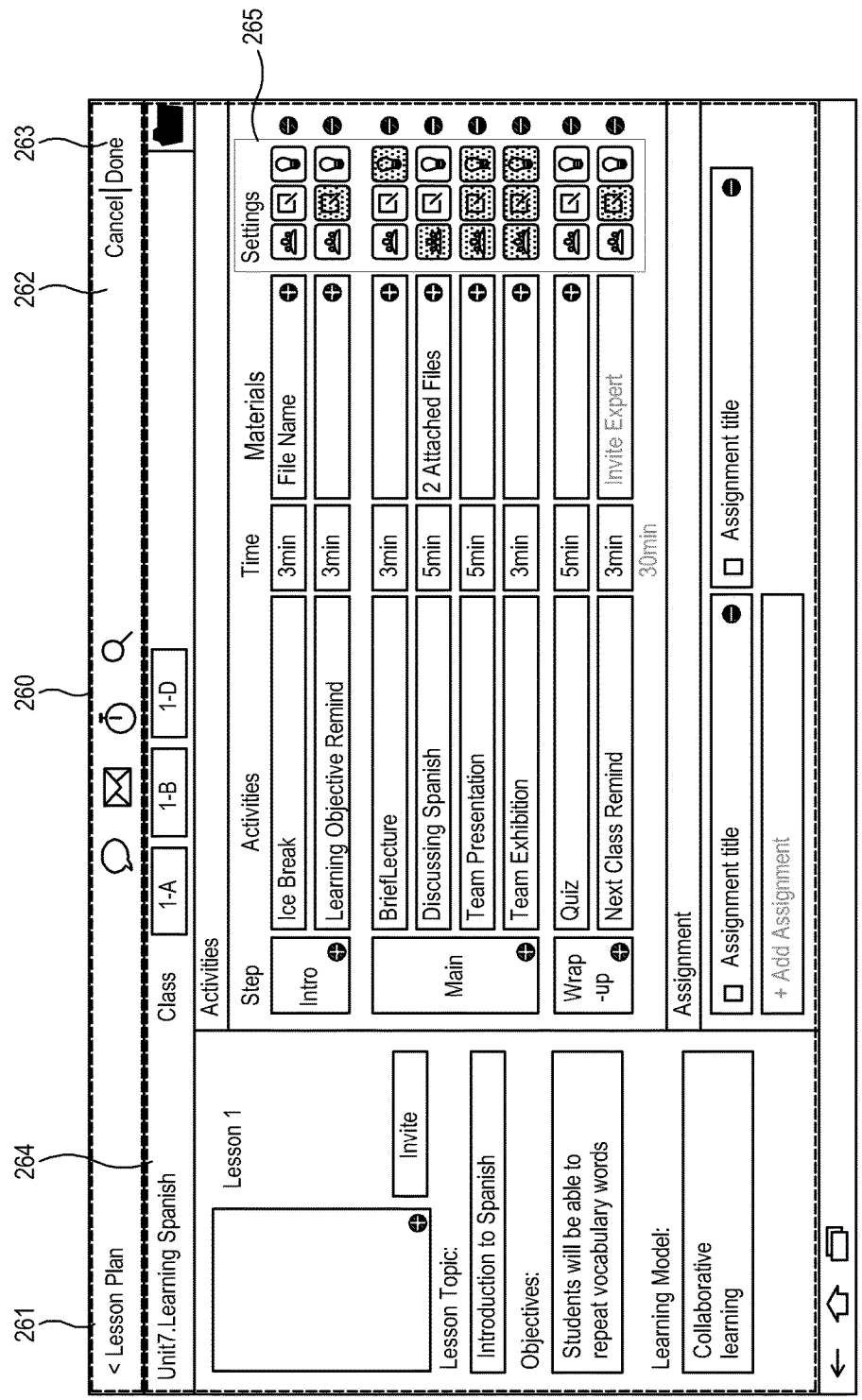

FIG. 26 shows an example of the GUI displayed by the user terminal 1 according to an exemplary embodiment. A GUI 260 shows a screen where a teacher generates a lesson plan according to class courses before the start of the class. The GUI 260 includes Title Bar 261. If a user selects an item 262 of 'Cancel' in the Title Bar 261, the GUI returns to a previous screen without storing contents that are input and modified by a user after entering this screen. On the other hand, if a user selects an item 263 of 'Done' in the Title Bar 261, the modification is stored and then a screen moves to the previous screen. The GUI 260 includes a region 264 of 'Lesson Plan' where detailed information about the Lesson Plan being generated is provided. If the device setting is performed, an item 265 to which the setting is applied may be highlighted.

Figure 27:
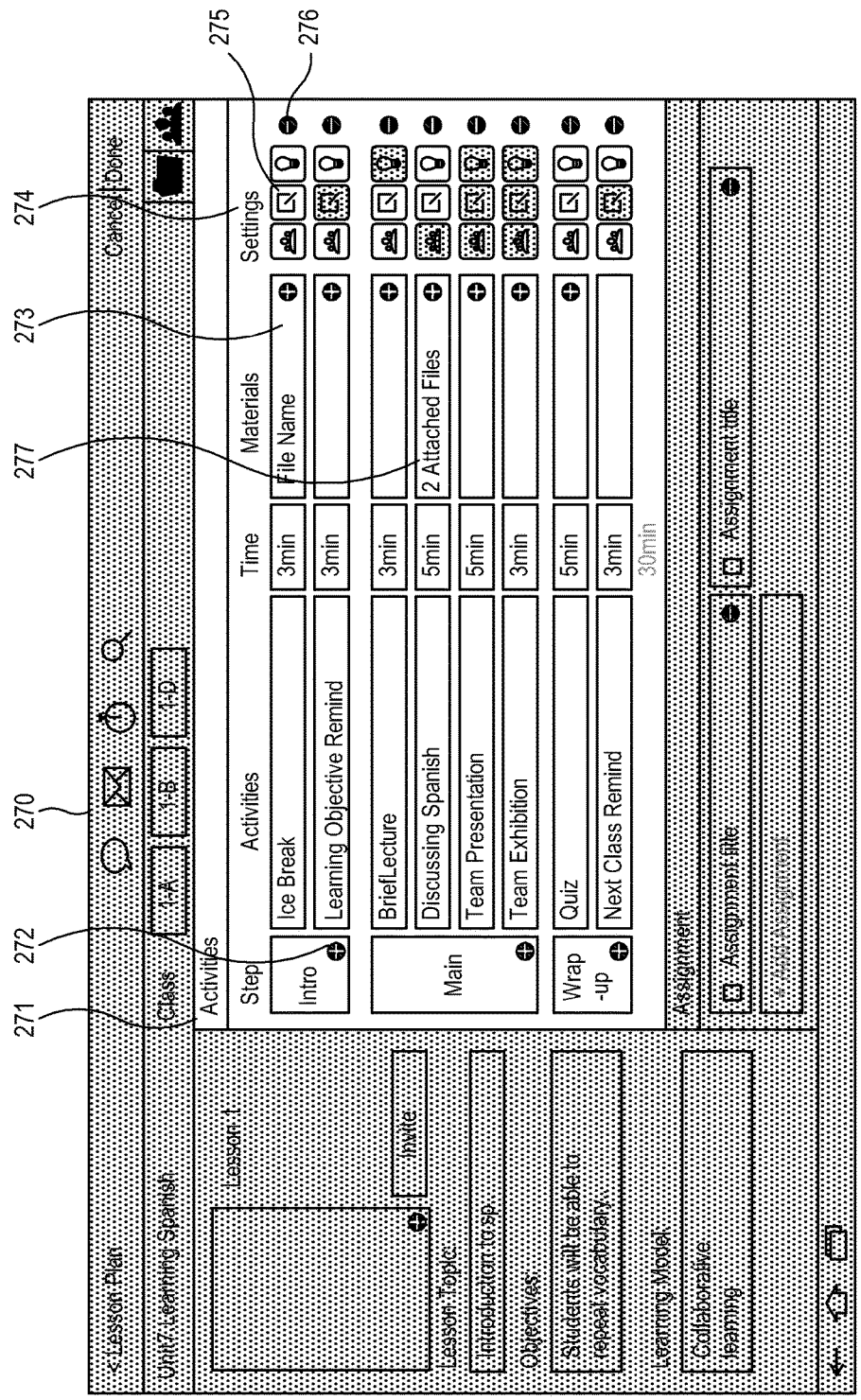

FIG. 27 shows another example of a GUI displayed by the user terminal 1 according to an exemplary embodiment. The GUI 270 illustrates a screen for generating a detailed lesson plan of a certain class course. The GUI 270 includes an activity information region 271 through which activities, time, materials, and settings are provided with respect to the lesson being generated. Also, the activity information region 271 of the GUI 270 may include an add-activity button 272 for adding a new activity to the corresponding course, and an add-material button 273 for attaching a file. The GUI 270 may further include a settings region 274 for the device setting. The settings region 274 may include buttons 275 allowing a user to set up a team, the peripheral device 6 or classroom environment according to activities. If the Team button is selected, Team Making Set_Make Teams Component is activated to thereby make it possible to organize the team. When a Device button is selected, Team Making Set_Device Settings Component is activated to thereby make it possible to set up the device according to modes. When an Environment button is selected, Team Making Set_Device Settings: Light, Blinder, Window Component is activated to thereby make it possible to set up the environment setting in the classroom. The activity information region 271 may include a Delete Activity Button 276 for deleting the corresponding activity. If a File Name 277 is selected, the material may be popped up in the form of a file. At this time, if the delete button is selected with regard to the popped-up GUI, the corresponding material is deleted, and if a thumbnail is selected, a previous mode for the corresponding material may be provided.

Figure 28:
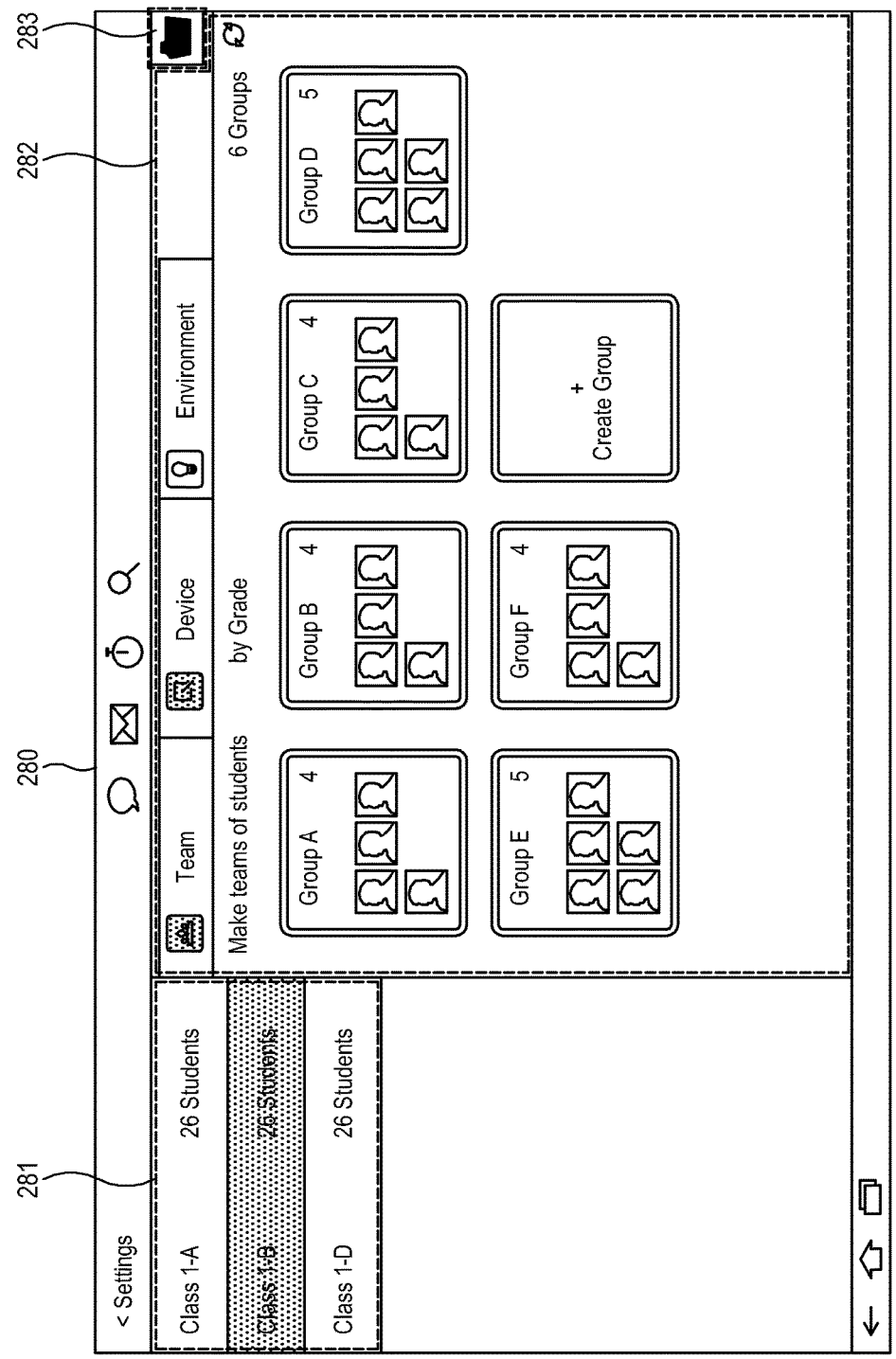

FIG. 28 shows another example of a GUI displayed by the user terminal 1 according to an exemplary embodiment. The GUI 280 shows a screen for setting up a team, a device and an environment according to classes where the corresponding lesson content will be used. The GUI 280 may include Class List 281 showing a list of classes and the number of persons per class; and Settings Tab 282 providing the settings needed for the lesson plan according to the class courses with respect to each category team, device and environments. A user may open My Library by selecting the item 283. In this case, the GUI 280 may be pushed out leftward and then Component of My Library may be provided.

Figure 29:
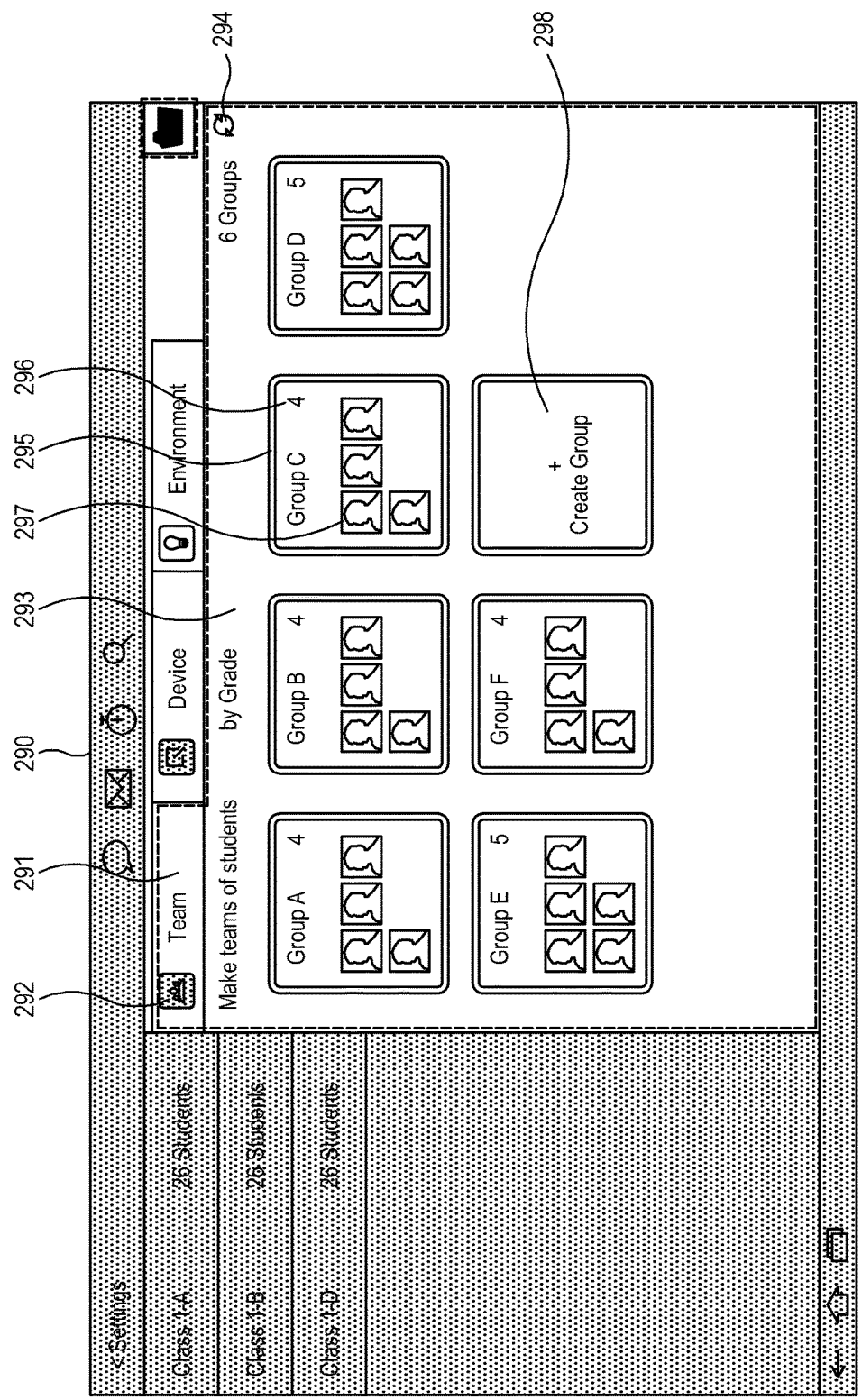

FIG. 29 shows another example of a GUI displayed on the user terminal 1 according to an exemplary embodiment. The GUI 290 shows a screen for automatically organizing students and teams in a lesson plan according to classes. The GUI 290 includes the region 291 for organizing a team of students in the corresponding class. The region 291 for organizing the team includes a Team Icon 292 activated or inactivated in accordance with whether the team is organized or not. Also, the region 291 for organizing the team may include a menu 293 for selecting a team making method (Grade/Name/Random/Manually), a refresh button 294 for rearranging members of the team, a group title 295, the number of persons per group 296, a thumbnail image 297 showing the figures of the members, and a create group item 298 for creating a new group and automatically rearranging team members.

Figure 30:
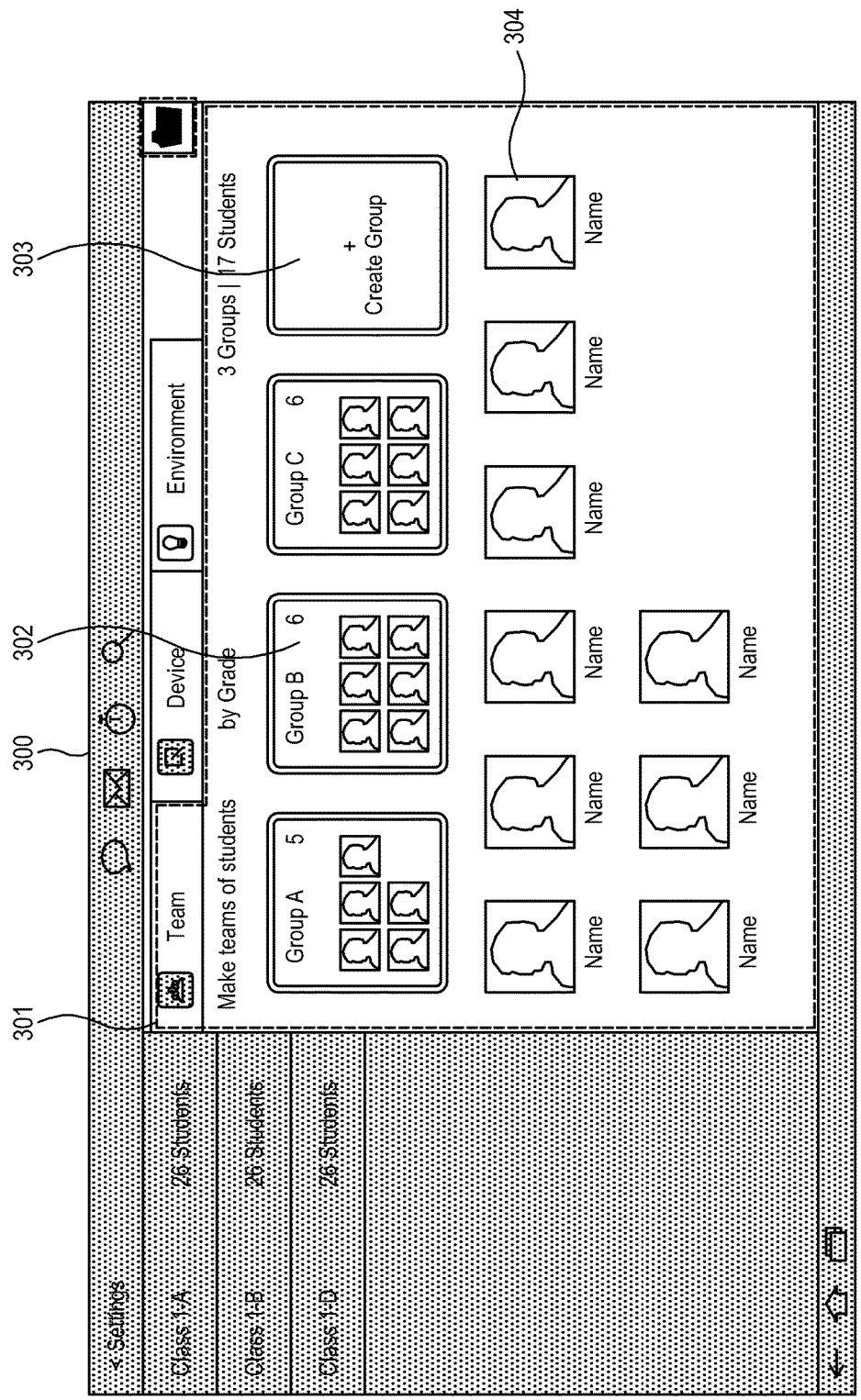

FIG. 30 shows another example of a GUI displayed on the user terminal 1 according to an exemplary embodiment. The GUI 300 shows a screen for manually organizing students and teams in a lesson plan according to classes. The GUI 300 includes a region 301 for organizing a team of students in the corresponding class. The region 301 includes thumbnail images 302 of students who have already been members of the team. A user may move the thumbnail image 302 of the student who has already belonged to the team, thereby transferring him/her to another team. A user may select the create group item 303 to create a new group. The region 301 for organizing the team may include a student list 304 showing students who have not been assigned to any team. A user may drag and drop the thumbnail images of the students from the student list 304 to an existing team or a new team. The student who is transferred to the team is deleted from the list 304.

Figure 31:
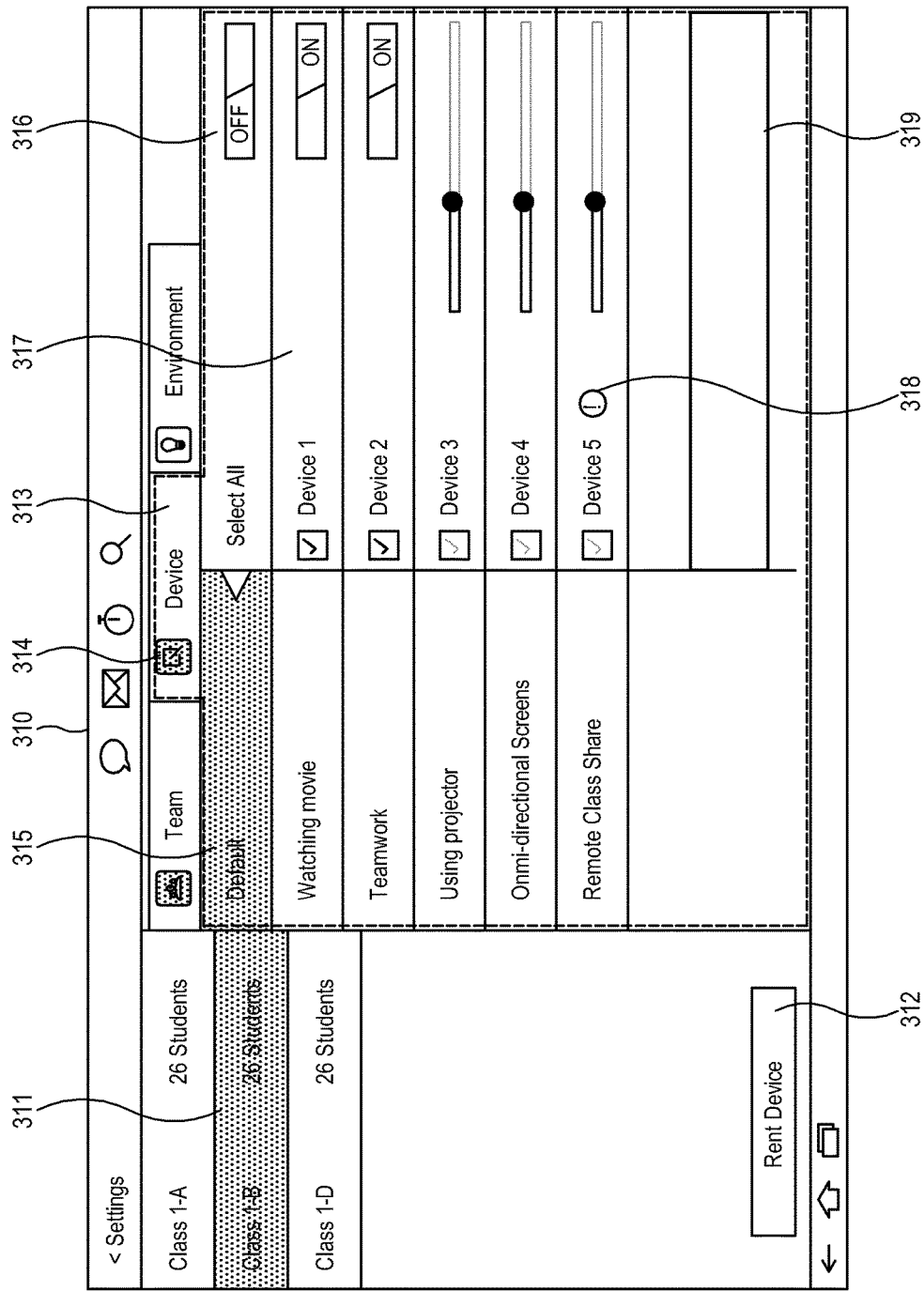

FIG. 31 illustrates another example of a GUI displayed on the user terminal 1 according to an exemplary embodiment. The GUI 310 shows a screen for setting up the peripheral device 6 needed for proceeding with the corresponding class. The GUI 310 includes a class list 311 of a corresponding course. The class list 311 may include a Rent Device button 312 for switching to a screen where rentable peripheral devices 6 are shown. The GUI 310 includes a Device Settings tab 313 for setting up the peripheral devices 6 in the corresponding course. The Device Settings tab 313 may include a Device icon 314 activated or inactivated in accordance with device settings; a preset list 315 in which a mode added in Environment Control Component of the class is provided; a Select All button 316 allowing all the peripheral device 6 to be available when 'ON' is selected; a check box 317 allowing the use of the corresponding peripheral device 6 to be set up in accordance with check/uncheck, and a breakdown icon 318 informing that the peripheral device 6 is abnormal. The GUI 310 may further include the region 319 where, if the device setting is different from that registered to the information about the activity for the shared lesson content, a peripheral device 6 which is the same as or similar to a device within the lesson place is automatically searched and displayed together with an icon in the list. As a content related to resetting is displayed in a lower portion of the GUI 310 is displayed, a user can set up the device with reference to this.

Figure 32:
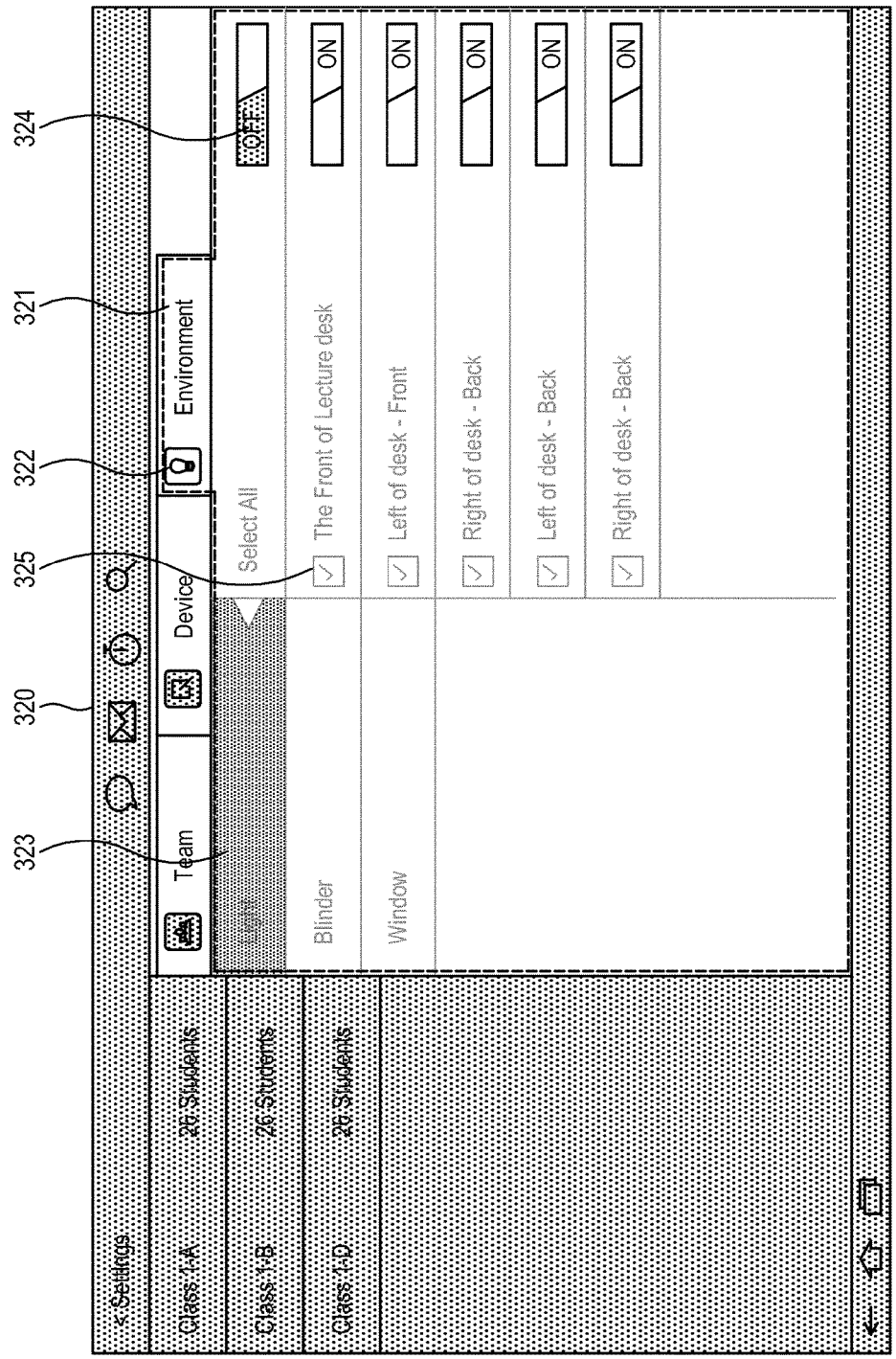

FIG. 32 shows another example of a GUI displayed on the user terminal 1 according to an exemplary embodiment. The GUI 320 shows a screen for setting up environments needed for proceeding with the corresponding class within a classroom. The GUI 320 includes an Environment tab 321 for setting up environments within the classroom while proceeding with the corresponding activity, The Environment tab 321 may include an Environment icon 322 activated or inactivated in accordance with the environment settings; a mode list 323 showing the peripheral devices 6 to which the environment setting is applicable; a Select All button 324 for selecting all the places to which the selected mode is applicable when selected; and a check box 325 allowing the corresponding place to undergo the environment setting in accordance with check/uncheck.

Figure 33:
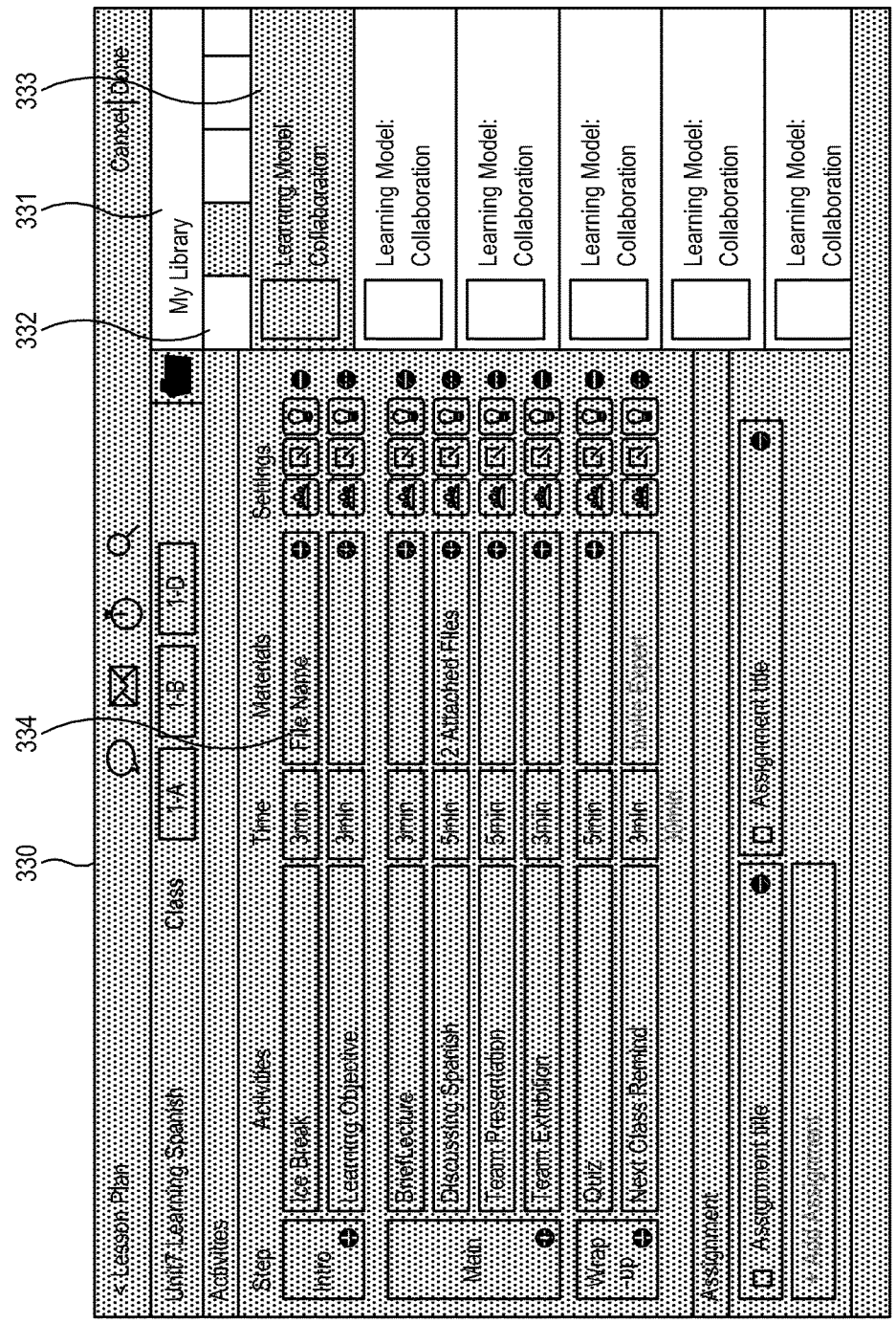

FIG. 33 shows another example of a GUI displayed on the user terminal 1 according to an exemplary embodiment. The GUI 330 shows a screen where "My Library" 331 is popped up. "My Library" 331 includes a category tab 332 by which contents generated by a teacher or separately stored in the form of a file are sorted into categories and provided. The category tab 332 may include a file list 333 where a file thumbnail, a file name, a file type, a name of a registered user, etc. The files of the respective categories may be input to the respective fields of the lesson plan 334 though a Drag & Drop operation. That is, a user may use "My Library" 331 to conveniently drag a necessary material and use it while preparing for the class.

Figure 34:
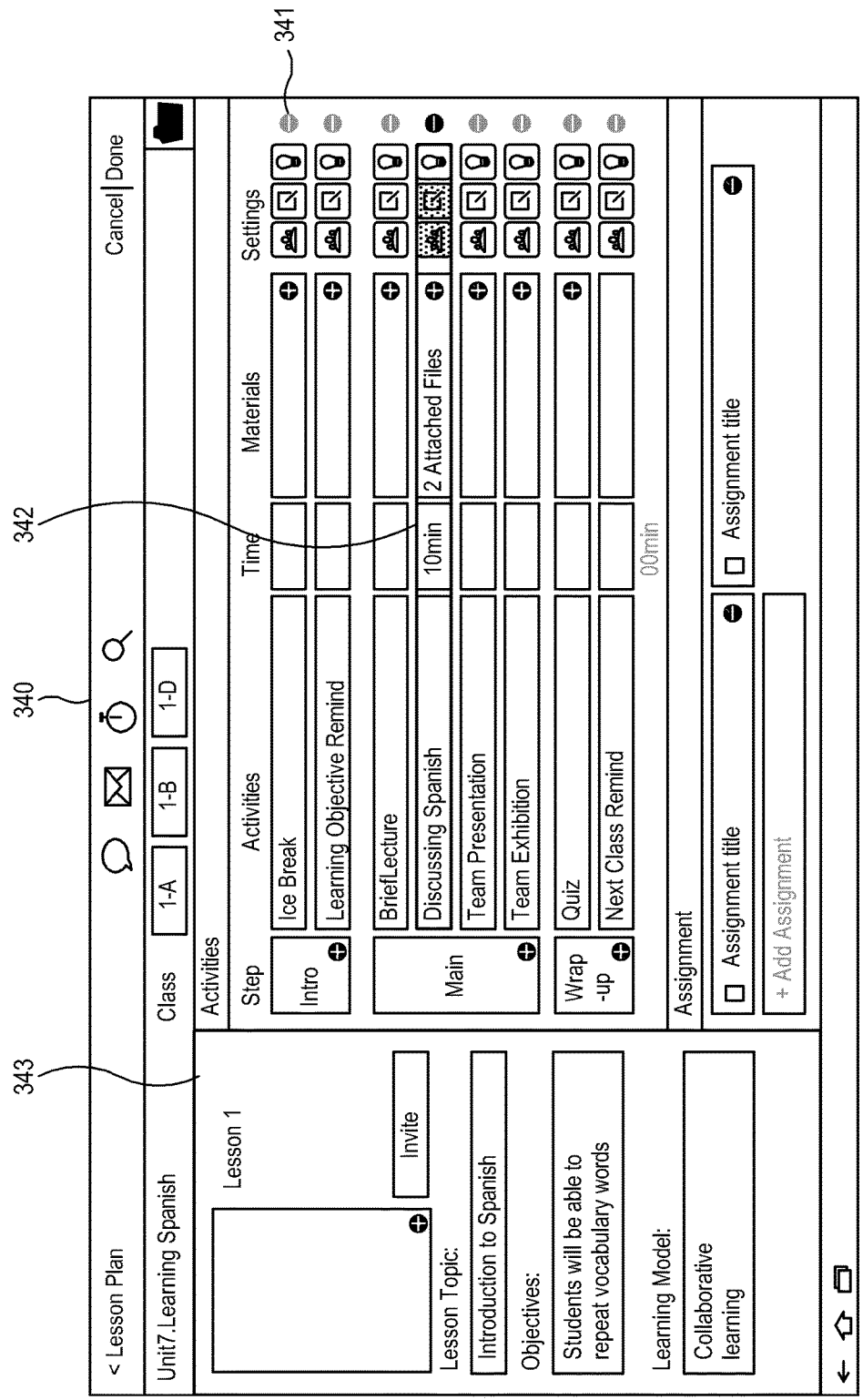

FIG. 34 shows another example of the GUI displayed on the user terminal 1 according to an exemplary embodiment. The GUI 340 shows a screen for creating and storing a lesson content. A user selects the item 341 provided at a right side in a basic template and deletes the activity lines except only one activity line 342. With regard to the activity line 342, a user inputs a name of the activity, designates a necessary material through "My Library", and completes the device setting, thereby creating and storing the lesson contents. The GUI 340 may include the region 343 for inputting basic lesson information.

Figure 35:
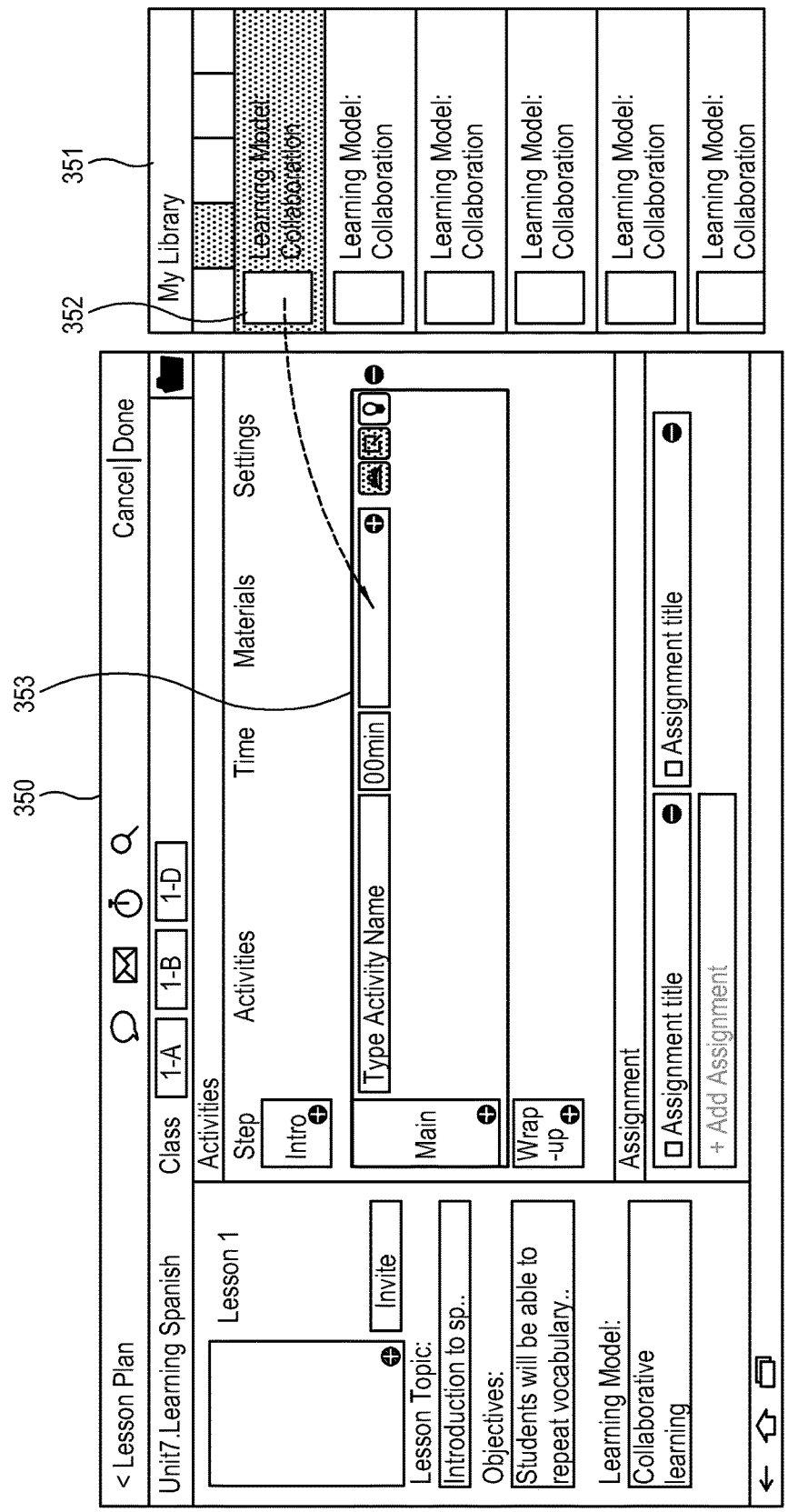

FIG. 35 illustrates another example of a GUI displayed on the user terminal 1 according to an exemplary embodiment. The GUI 350 shows another example of the screen for creating and storing the lesson content. A user opens "My Library" 351, drags a material 352 provided in "My Library" 351, and drops the material 352 to the region 353 of a desired class course or activity of the Lesson Plan. At this time, the others are deleted except only the selected class course or activity. Besides, the methods of creating and storing the lesson content are the same as those explained with reference to FIG. 34.

Figure 36:
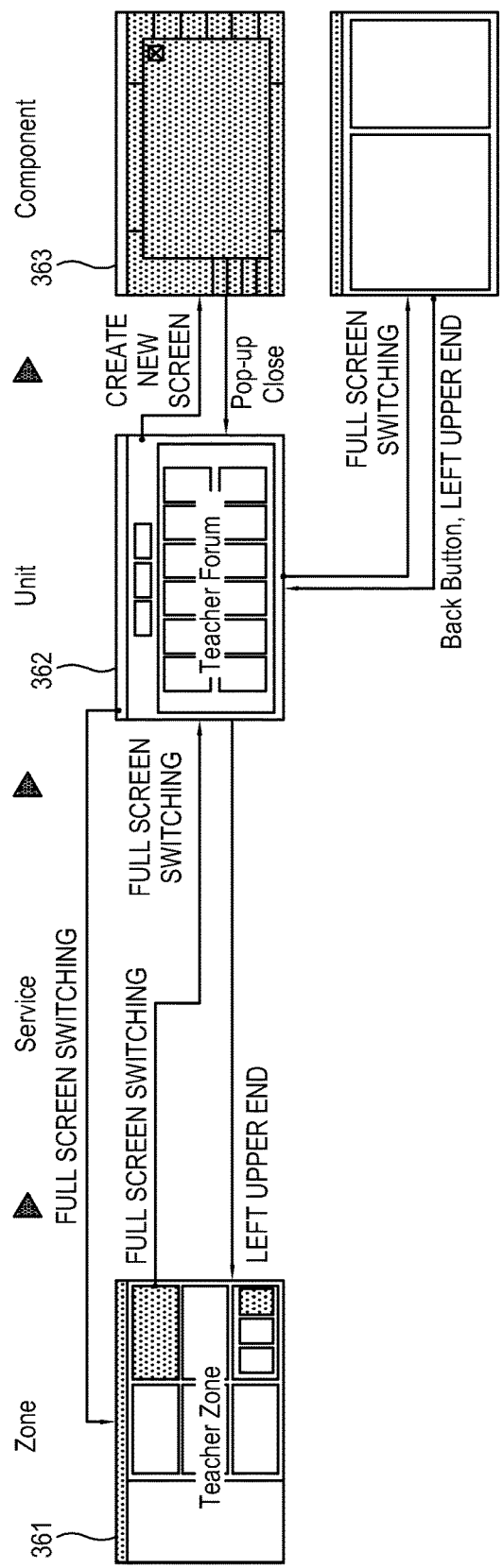
FIG. 36 shows another example of a switch between GUIs displayed on the user terminal according to an exemplary embodiment.

FIG. 36 illustrates another example of a switch between the GUIs displayed on the user terminal 1 according to an exemplary embodiment. As shown in FIG. 36, the user terminal 1 may stepwise display the GUIs 361 to 363. The user terminal 1 may switch between the GUI 361 of the 'Zone' stage and the GUI 362 of the 'Unit' stage, or create or eliminate the GUI 363 of the 'Component' stage in accordance with a user's input. For example, the GUI 361 of 'Teacher Zone' may be switched into the GUI 362 of 'Teacher Forum', and vice versa. Also, the GUI 363 of the 'Component' stage may be displayed as being popped up or may be eliminated in the GUI 362 of 'Teacher Forum.'

FIG. 37 illustrates another example of a GUI displayed on the user terminal 1 according to an exemplary embodiment. The GUI 370 shows an initial screen of 'Teacher Forum.' The GUI 370 may be displayed when Teacher Forum 218 of the GUI 210 shown in FIG. 21 is selected. The GUI 370 may include a content list 371 that is a list of contents registered by a teacher, and an Issue Discussion list 372 that is a list of discussions registered by a teacher. The content list 371 may provide Best/Recommended/New Banner and the latest contents according to categories. The content list 371 and the Issue Discussion list 372 may be scrolled up and down if the lists are long. Using the GUI 370 of 'Teacher Forum,' teachers can share lesson contents and knowledge to proceed with the class.

FIG. 38 illustrates another example of a GUI displayed on the user terminal 1 according to an exemplary embodiment. The GUI 380 shows a list of contents corresponding to 'Teacher Forum'. The GUI 380 may include a title bar 381, a banner 382 and a content list 383. The title bar 381 may include a "See All" tab 3811 for moving to a content full list, and an "Upload" button 3812 for invoking a content upload component. The banner 382 may include a page indicator 3821 showing a page; a content thumbnail 3822 for moving to content view—detail component; Best, Recommended & New Contents Badge 3823 displayed in accordance with states of the corresponding content; the number of contents 3824; the tile of contents 3825; star rating 3826 showing grades; and Best, Recommended & New tabs 3827 for selecting a category. The banner 382 may sort and display only the item corresponding to the categories of Best/Recommended/New. If a user selects each tab 3827, contents may be displayed from the corresponding category. The content list 383 may include See All 3831 for moving to a content full list of a corresponding category, a content thumbnail 3832 for moving content view—detail component, the number of contents 3833 and the title of contents 3834.

FIG. 39 shows another example of a GUI displayed on the user terminal 1 according to an exemplary embodiment. The GUI 390 shows a screen corresponding to All Content List of 'Teacher Forum.' The GUI 390 may include Title 391, Contents Category List 392 and All Contents List 393. The Title 391 may include an Upload button 3911 for designating a file to be uploaded and moving to Content Upload Component, when selected. The contents category list 392 may include All 3921 for selecting all categories, Lesson Plans 3922, Learning Activities 3923 displayed in accordance with states of the corresponding contents, Teaching Materials 3924, Classroom Settings 3925 and Templates 3926. All Contents List 393 shows a list of all contents corresponding to the selected category, which includes sort by 3931 for selecting a date, a grade, the number of hits, etc. as a sorting reference of the content list; a content thumbnail 3932 for moving to a detail view of the corresponding contents; Best, Recommended & New Contents Badge 3933 displayed in accordance with states of the corresponding content; the number of contents 3934; the tile of contents 3935; and star rating 3326 showing grades.

Figure 40:
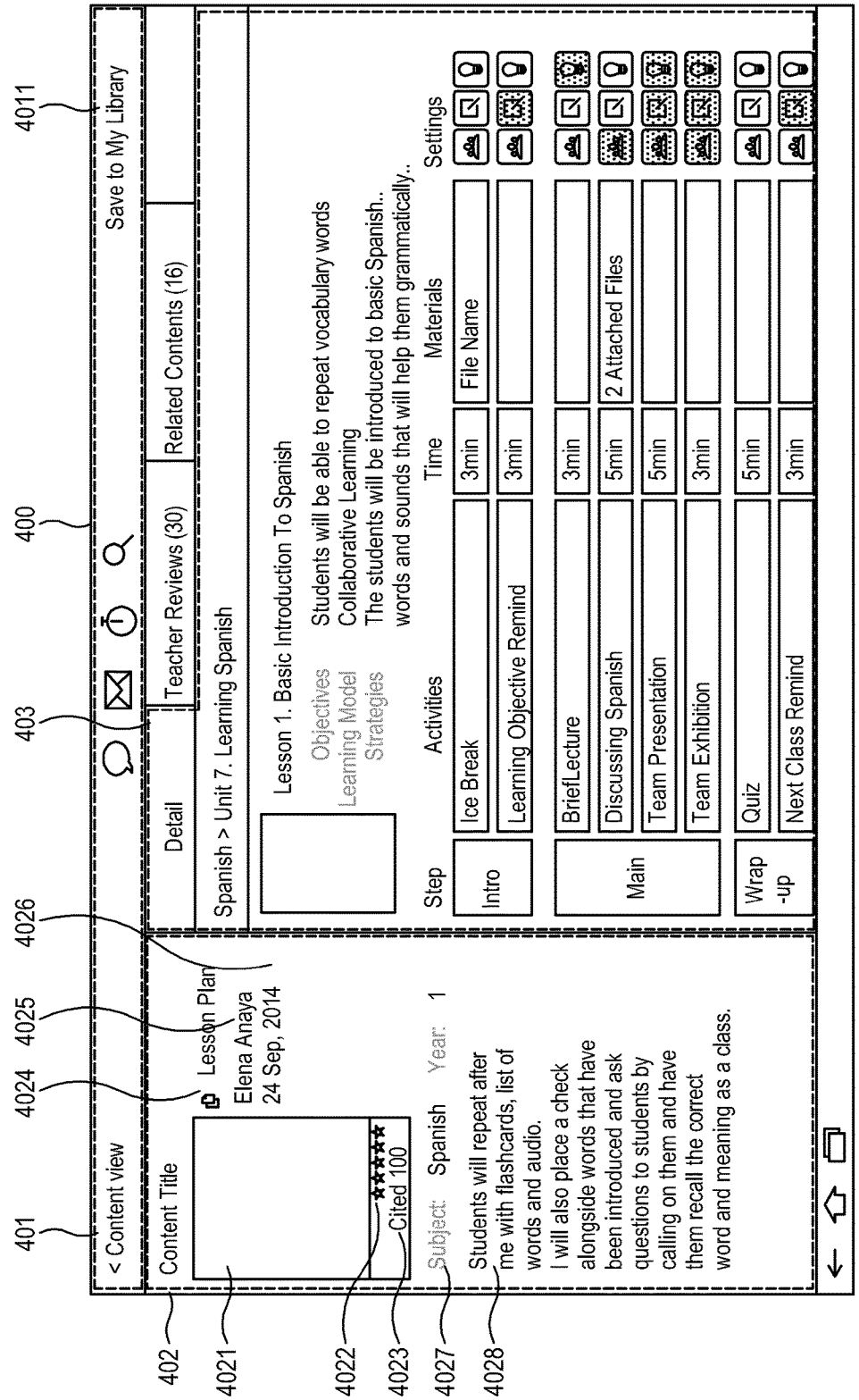

FIG. 40 shows another example of a GUI displayed on the user terminal 1 according to an exemplary embodiment. The GUI 400 shows detailed Content View of 'Teacher Forum.' The GUI 400 may include a title 401, contents-summary info 402 for providing basic information about contents, and a content detail view 403 for providing detailed information of contents. Title 401 may include Save to My Library 4011 for storing the corresponding contents in My Library. The information about the contents summary info 402 may include a contents thumbnail 4021, star rating 4022, the number of citations 4023 showing the number of citations, a content type 4024 showing the type of contents, a teacher name 4025 showing a teacher's name, a posting date 4026 showing a posting date, Subject Name & Year 4027 showing a topic name and a grade, and a description 4028 for other descriptions.

Figure 41:
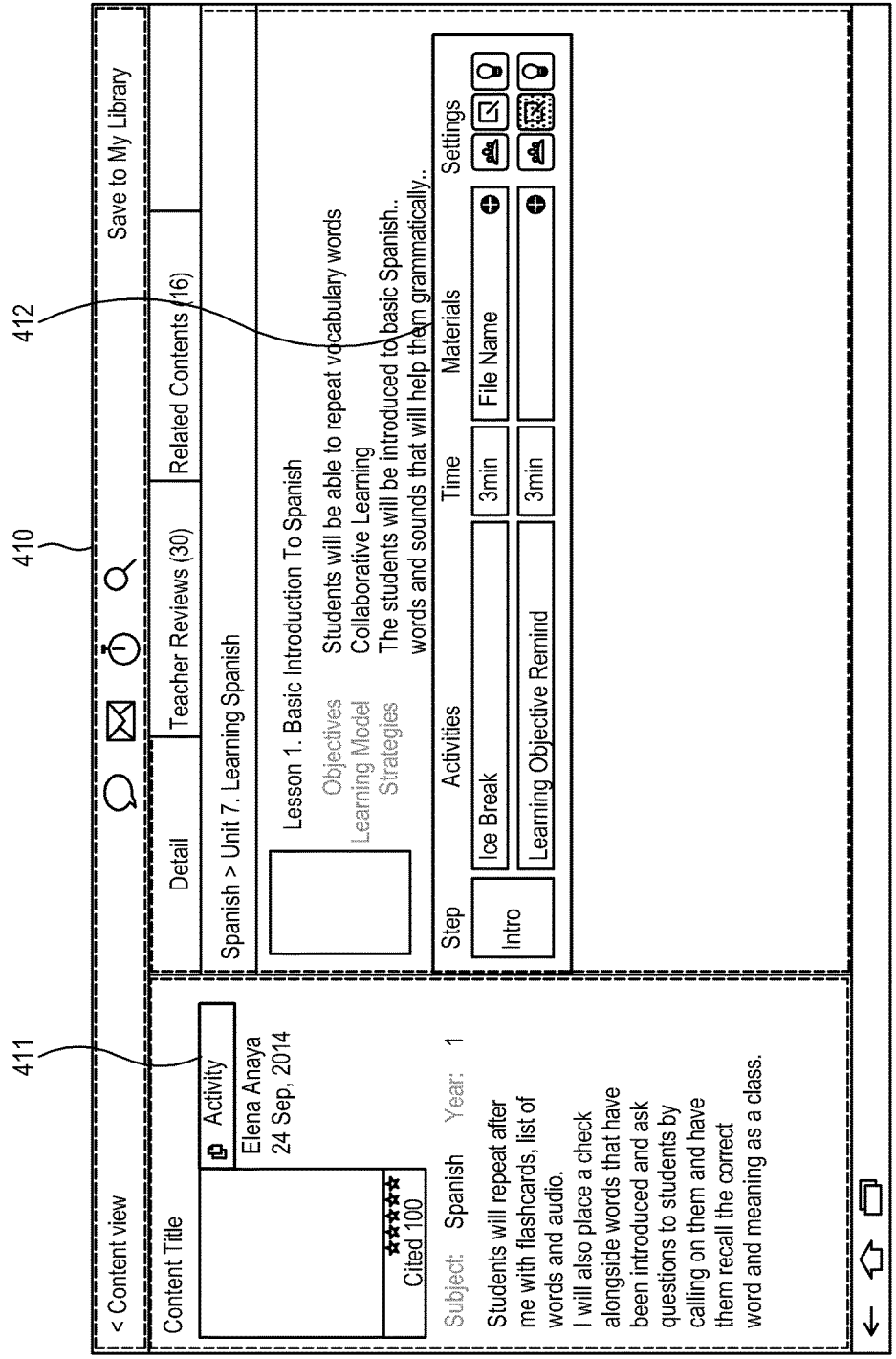

FIG. 41 shows another example of a GUI displayed on the user terminal 1 according to an exemplary embodiment. The GUI 410 shows a screen for detailed content view (activity) of 'Teacher Forum'. On the contrary to the lesson content according to the foregoing exemplary embodiment, the GUI 410 in this exemplary embodiment shows Activity 411 as a content type, and only one activity 412 in a detailed information region.

Figure 42:
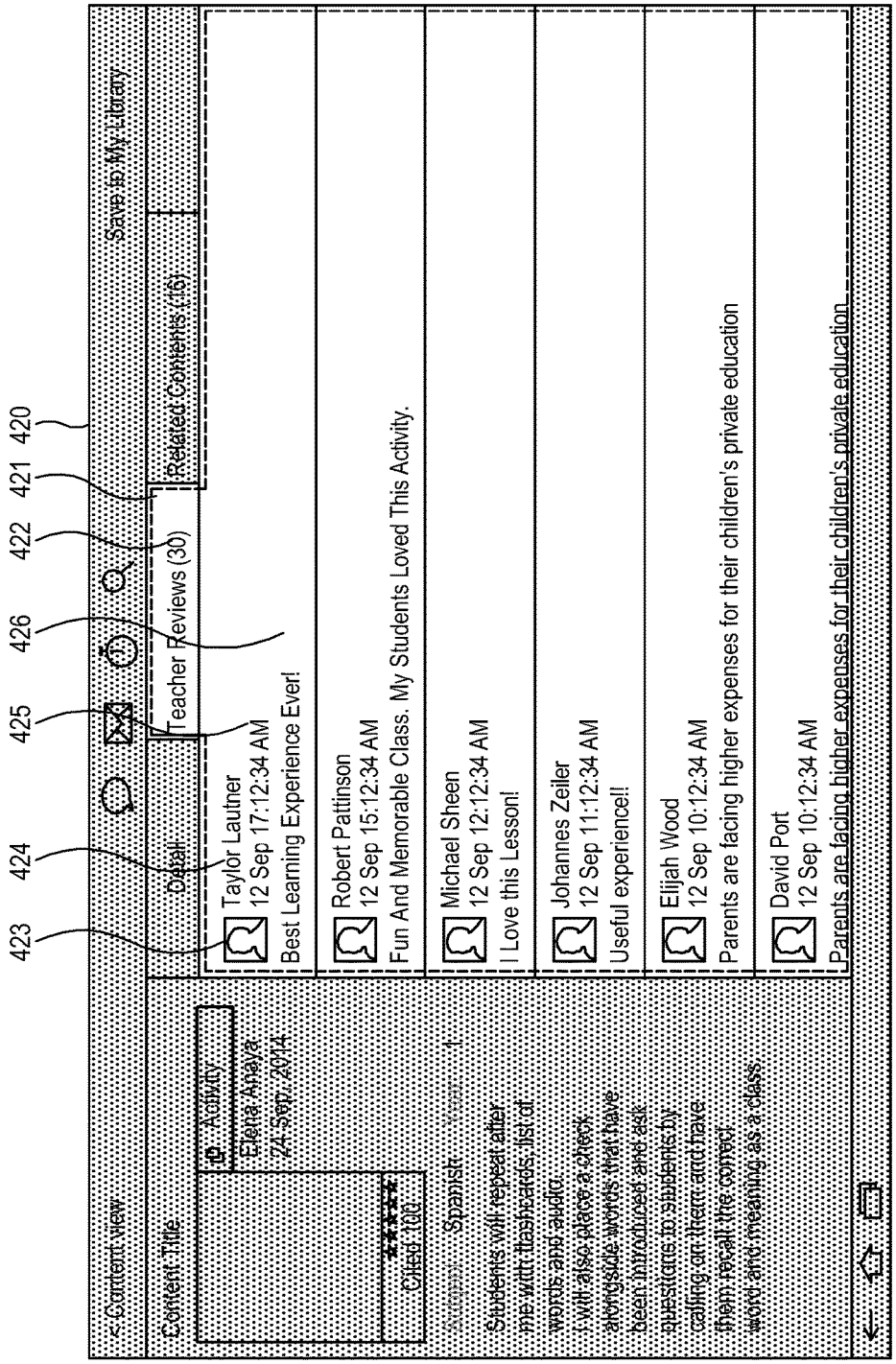

FIG. 42 shows another example of a GUI displayed on the user terminal 1 according to an exemplary embodiment. The GUI 420 shows a fellow teacher's reviews with regard to the contents of 'Teacher Forum'. The GUI 420 may include a Teacher Reviews list 421 showing a list of fellow teachers' reviews with regard to the contents of 'Teacher Forum.' The information about the Teacher Review list 421 may include the number of reviews 422 showing the number of reviews, a profile image 423 showing a figure of a teacher who posted a review, a user name 423 showing a name of a teacher who posted a review, a posting time 425 showing date and time when the review is posted, and a comment 426 showing contents of a review.

Figure 43:
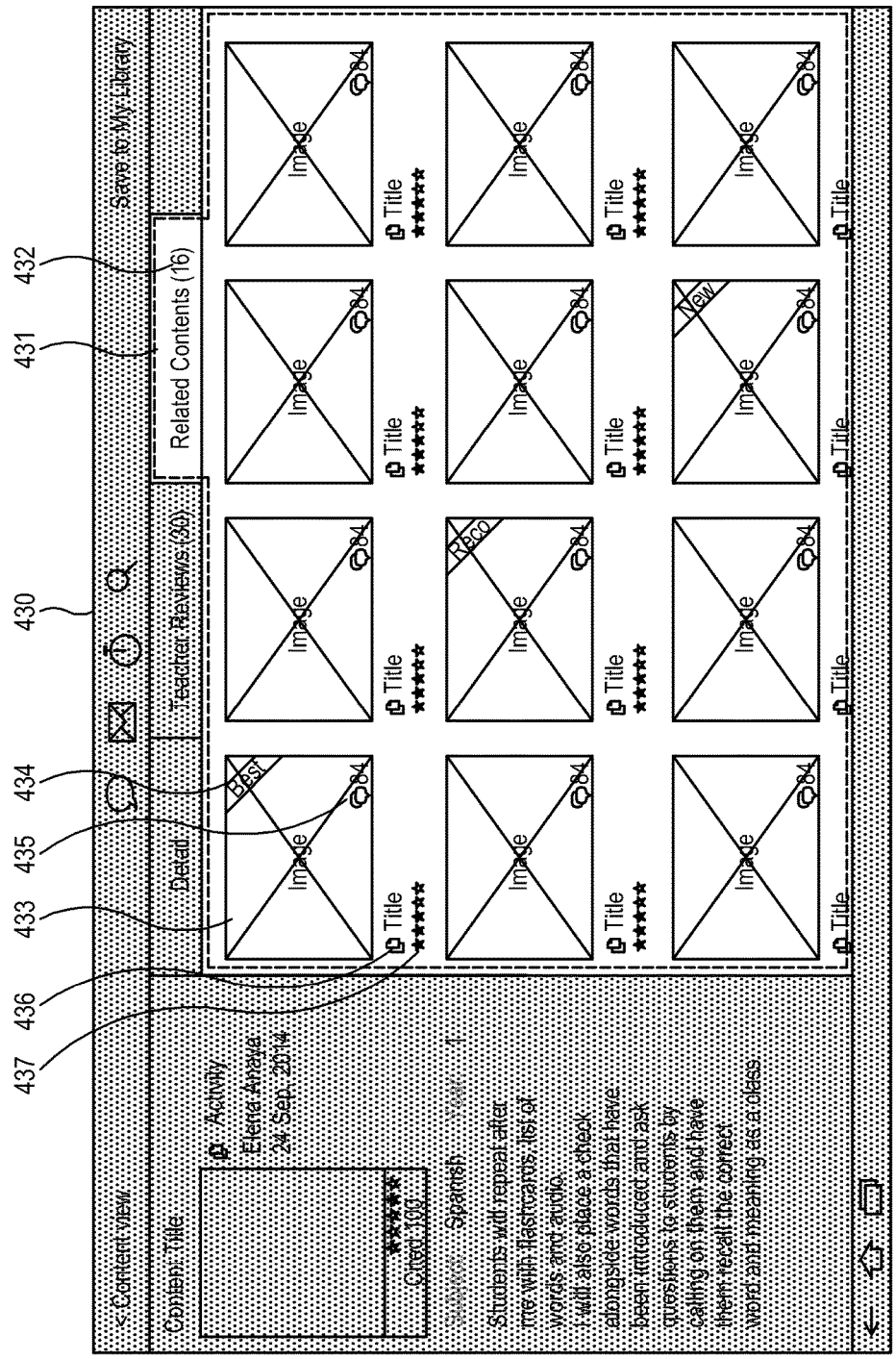

FIG. 43 shows another example of a GUI displayed on the user terminal 1 according to an exemplary embodiment. The GUI 430 shows a list of related contents with regard to contents of 'Teacher Forum.' The GUI 430 may include a Related Content list 431 showing the list of related contents 7 with regard to contents of 'Teacher Forum.' The information about the related Content list 431 may include the number of related contents 432; a content thumbnail 433 for moving to a detailed view of the corresponding content when selected; Best, Recommended & New Contents badge 434 displayed in accordance with states of the corresponding content; the number of comments 435 showing the number of reviews with regard to the corresponding content; a content title 436 showing the title of corresponding content; and a star rating 437 showing the grade of the corresponding content.

FIG. 44 shows another example of a GUI displayed on the user terminal 1 according to an exemplary embodiment. The GUI 440 shows a screen for uploading a content to 'Teacher Forum.' The GUI 440 includes a title 441, an upload category & title 442 showing basic information about the content to be uploaded, and a content detail 443 showing detailed information about the content to be uploaded. Title 441 may include a menu button 4411 including items of 'Cancel' and 'Done'. If the item of 'Cancel' is selected, the GUI returns to a previous screen without storing contents generated after entering this screen. On the other hand, if a user selects an item of 'Done,' the generated contents are registered to 'Teacher Forum.' An upload category & title 442 may include a select category 4421 for selecting a category of contents to be uploaded. The category of contents to be uploaded may be automatically set up in accordance with its file types. The upload category & title 442 may further include a title input field 4422 for inputting the title of the contents to be uploaded. Information about the content detail 443 may include a thumbnail image of contents to be uploaded, file info 4431 showing a file name, a detailed information field 4432 for inputting detailed information about contents to be uploaded. The detailed information field 4432 may be automatically input in accordance with contents to be uploaded, and modified by a user. The detailed information field 4432 may include information 4433 showing a teaching-learning method of contents to be uploaded. A user may select the teaching-learning method 4433 when the contents are uploaded.

As described above, according to an exemplary embodiment, it is more convenient and effective to generate the lesson content for the digital lesson.

Specifically, other users (teachers or students) can employ the shared information related to lesson preparation such as the lesson plan, the learning material, the device settings, etc. in generating the lesson plan, and edit the shared information.

Also, the material or time related to various learning activities is assigned according to the teaching stages of the class, in which the material may be set up according to individuals/groups of students.

Also, the environment settings may be easily performed with regard to not only the display in an actual classroom environment but also various devices such as an audio system, a camera, a lighting system, etc.

Although a few exemplary embodiments have been shown and described, it will be appreciated by those skilled in the art that changes may be made in these exemplary embodiments without departing from the principles and spirit of the inventive concept. Therefore, the foregoing has to be considered as illustrative only. The scope of the exemplary embodiments is defined in the appended claims and their equivalents. Accordingly, all suitable modification and equivalents may fall within the scope of the exemplary embodiments.

What is claimed is:

1. A method of controlling a user terminal, the method comprising:

displaying a graphic user interface (GUI) which comprises a plurality of tabs, a first region displaying first items indicating a plurality of activities, second items indicating a plurality of materials or third items corresponding to at least one of peripheral device settings or device environment settings to be designated according to at least one of class courses, the activities or the materials, respectively, the third items being classified into setting items indicating preset settings of a peripheral device and device items indicating peripheral devices according to locations, and a second region displaying fourth items corresponding to a plurality of class courses which are taught based on a lesson content and which are provided in a classroom;

in response to selection of a first tab corresponding to the plurality of activities, a second tab corresponding to the plurality of materials or a third tab corresponding to the at least one of the peripheral device settings or the device environment settings among the plurality of tabs, displaying the first items, the second items or the third items in the first region of the GUI while the plurality of tabs and the second region displaying the fourth items are displayed;

selecting one of the first items, one of the second items or one of the setting items among the third items displayed in the first region in accordance with an input of a first user while the plurality of tabs and the second region displaying the fourth items are displayed;

in response to selection of the one of the first items, the one of the second items or the one of the setting items among the third items displayed in the first region, designating an item of an activity selected from the plurality of activities, an item of a material selected from the plurality of materials or an item indicating a preset setting of the peripheral device selected from the setting items to a primary item, a secondary item or a thirdly item of the fourth items displayed in the second region while the plurality of tabs and the first region displaying the first items, the second items or the third items are displayed;

generating the lesson content by storing the primary item, the secondary item and the thirdly item of the fourth items and lesson plan configuration information corresponding to the selected activity, the selected material and the selected item indicating the preset setting of the peripheral device designated to a class course among the plurality of class courses; and transmitting information of the preset setting of the peripheral device to the peripheral device and controlling the peripheral device based on the information of the preset setting.

2. The method according to claim 1, wherein the primary, secondary and thirdly items of the fourth items correspond to regions on a table of the GUI.

3. The method according to claim 2, wherein the designating the item of the activity comprises moving the item of the selected activity to a class course region to be designated on the table, the designating the item of the material comprises moving the item of the selected material to another class course region to be designated on the table, and the designating the item indicating the preset setting of the peripheral device comprises moving the item indicating the preset setting of the peripheral device to another class course region to be designated on the table.

4. The method according to claim 1, further comprising:
selecting a topic of a lesson content in accordance with a second user input;
displaying items indicating a plurality of templates related to the selected topic; and
selecting one of the items indicating the plurality of templates in accordance with a third user input.

5. The method according to claim 4, further comprising receiving a template from at least one from among a server and another user terminal.

6. The method according to claim 1, further comprising selecting one of the third items in accordance with a user's input.

7. The method according to claim 6, further comprising setting up one from among the peripheral devices in accordance with settings of the selected item.

8. The method according to claim 1, further comprising
transmitting the lesson plan configuration information to a server, and receiving a different user's lesson plan configuration information regarding the lesson content from the server; and
informing the first user of contents generated or edited by the different user with regard to the lesson content based on the received lesson plan configuration information.

9. The method according to claim 1, wherein the displaying the GUI comprises activating an item of the plurality of class courses or activity for which a role is given to the user.

10. A user terminal comprising:
a storage configured to store information about a lesson content for a digital lesson;
a display configured to display a graphic user interface (GUI) which comprises a plurality of tabs, a first region displaying first items indicating a plurality of activities, second items indicating a plurality of materials or third items corresponding to at least one of peripheral device settings or device environment settings to be designated according to at least one of class courses, the activities or the materials, respectively, the third items being classified into setting items indicating preset setting of a peripheral device and device items indicating peripheral devices according to locations, and a second region displaying fourth items corresponding to a plurality of class courses which are taught based on a lesson content and which are provided in a classroom;
an input receiver configured to receive a user's input; and
a controller configured to, in response to selection of a first tab corresponding to the plurality of activities, a second tab corresponding to the plurality of materials or a third tab corresponding to the at least one of the peripheral device settings or the device environment settings among the plurality of tabs, control the display to display the first items, the second items or the third items in the first region of the GUI while the plurality of tabs and the second region displaying the fourth items are displayed, select one of the first items, one of the second items or one of the setting items among the third items displayed in the first region in accordance with a first user input while the plurality of tabs and the second region displaying the fourth items are displayed, in response to selection of the one of the first items, the one of the second items or the one of the setting items among the third items displayed in the first region, designate an item of an activity selected from the plurality of activities, an item of a material selected from the plurality of materials or an item indicating a preset setting of the peripheral device selected from the setting items to a primary item, a secondary item or a thirdly item of the fourth items displayed in the second region while the plurality of tabs and the first region displaying the first items, the second items or the third items are displayed, generate the lesson content by storing the primary item, the secondary item and the thirdly item of the fourth items and lesson plan configuration information corresponding to the selected activity, the selected material and the selected setting item indicating the preset setting of the peripheral device designated to a class course among the plurality of class courses, and transmit information of the preset setting of the peripheral device to the peripheral device to control the peripheral device based on the information of the preset setting.

11. The user terminal according to claim 10, wherein the primary, secondary and thirdly items of the fourth items correspond to regions on a table of the GUI.

12. The user terminal according to claim 11, wherein the controller moves the item of the selected activity to a class course region to be designated on the table, moves the item of the selected material to another class course region to be designated on the table, and moves the item of the selected setting item indicating the preset setting of the peripheral device to another class course region to be designated on the table.

13. The user terminal according to claim 10, wherein the controller selects a topic of a lesson content in accordance with a second user input, displays items indicating a plurality of templates related to the selected topic, and selects one of the items indicating the plurality of templates in accordance with a third user input.

14. The user terminal according to claim 13, further comprising a communicator configured to communicate with at least one from among a server and another user terminal and receive a template.

15. The user terminal according to claim 10, wherein the controller selects one of the third items in accordance with a second user input.

16. The user terminal according to claim 15, wherein the controller sets up the peripheral device in accordance with settings of the selected one of the third items.

17. A server comprising:
- a communicator configured to communicate with a plurality of user terminals;
- a storage configured to store information about a plurality of users and information about a lesson content shared among the plurality of users; and
- a controller configured to receive lesson plan configuration information corresponding to an activity or a material designated to a class course of the lesson content and including a setting related to a plurality of peripheral devices or device environments of a classroom with regard to the class course from a first user terminal of a first user among the plurality of user terminals, the class course being provided in the classroom and the setting comprising a peripheral device setting or a device environment setting designated according to at least one of the class course, the activity or the material, from at least one of peripheral device settings or device environment settings classified into preset settings of a peripheral device and settings of the plurality of peripheral devices according to locations, transmit the received lesson plan configuration information to a second user terminal of a second user among the plurality of user terminals, receive modified lesson plan configuration information from the second user terminal of the second user and store the modified lesson plan configuration information in the storage, the modified lesson plan configuration information corresponding to the received lesson plan configuration information having been modified by the second user via the second user terminal of the second user,
- wherein the plurality of peripheral devices of the classroom are set according to settings in response to the class course being provided in the classroom,
- wherein the controller transmits, to the first user terminal, information about a role given to the first user for activities among a plurality of activities corresponding to a plurality of items displayed on a graphic user interface (GUI) of the first user terminal, and
- wherein only items of the activities of the plurality of activities among the plurality of items displayed on the GUI are activated by the first user terminal.

18. The server according to claim 17, wherein the controller transmits information about a peripheral device or device environment setting to the second user terminal of the second user.

19. The server according to claim 18, wherein, upon a condition that the peripheral device or the device environment setting does not correspond to the second user terminal of the second user, the controller recommends a second peripheral device or second device environment setting corresponding to the second user terminal of the second user.

20. The server according to claim 17, wherein the controller controls a peripheral device or performs a device environment setting in accordance with requests from the first user terminal of the first user.

21. A system providing a digital lesson service based on a lesson content, the system comprising:
- a server configured to store and manage information about a plurality of users, and information about a lesson content shared among the plurality of users; and
- a plurality of user terminals for the plurality of users configured to communicate with the server and enable a user to generate the lesson content,
- wherein a first user terminal of a first user among the plurality of user terminals transmits lesson plan configuration information corresponding to an activity or a material designated to a class course of a lesson content of the first user to the server and including a setting related to a plurality of peripheral devices or device environments of a classroom with regard to the class course, the class course being provided in a classroom and the setting comprising a peripheral device setting or a device environment setting designated according to at least one of the class course, the activity or the material, from at least one of peripheral device settings or device environment settings classified into preset settings of a peripheral device and settings of the plurality of peripheral devices according to locations,
- the server transmits the lesson plan configuration information received from the first user terminal of the first user to a second user terminal of a second user among the plurality of user terminals, receives modified lesson plan configuration information from the second user terminal of the second user and stores the modified lesson plan configuration information, the modified lesson plan configuration information corresponding to the received lesson plan configuration information having been modified by the second user via the second user terminal of the second user, and
- the second user terminal of the second user generates the lesson content of the second user based on the lesson plan configuration information of the first user received from the server,
- wherein the server transmits, to the first user terminal, information about a role given to the first user for activities among a plurality of activities corresponding to a plurality of items displayed on a graphic user interface (GUI) of the first user terminal, and
- wherein only items of the activities of the plurality of activities among the plurality of items displayed on the GUI are activated by the first user terminal.

22. The system according to claim 21, further comprising at least one peripheral device,
- wherein the first user terminal of the first user requests the server to control the at least one peripheral device or perform a device environment setting, and
- wherein the server controls the peripheral device or performs the device environment setting in accordance with requests from the first user terminal of the first user.

23. The system according to claim 22, wherein, upon a condition that the at least one peripheral device or the device environment setting does not correspond to the second user terminal of the second user, the server recommends a second peripheral device or second device environment setting corresponding to the second user terminal of the second user.

24. A non-transitory computer readable recording medium storing a code readable and executable by a computer, the code comprising a method including:
- displaying a graphic user interface (GUI) which comprises a plurality of tabs, a first region displaying first items indicating a plurality of activities, second items indicating a plurality of materials or third items corresponding to at least one of peripheral device settings or device environment settings to be designated according to at least one of class courses, the activities or the materials, respectively, the third items being classified into setting items indicating preset settings of a peripheral device and device items indicating peripheral devices according to locations, and a second region displaying fourth items corresponding to a plurality of class courses which are taught based on a lesson content and which are provided in a classroom;

in response to selection of a first tab corresponding to the plurality of activities, a second tab corresponding to the plurality of materials, or a third tab corresponding to the at least one of the peripheral device settings or the device environment settings among the plurality of tabs, displaying the first items, the second items or the third items in the first region of the GUI while the plurality of tabs and the second region displaying the fourth items are displayed;

selecting one of the first items, one of the second items, or one of the setting items among the third items displayed in the first region in accordance with a user's input while the plurality of tabs and the second region displaying the fourth items are displayed;

in response to selection of the one of the first items, the one of the second items, or the one of the setting items among the third items displayed in the first region, designating an item of an activity selected from the plurality of activities, an item of a material selected from the plurality of materials or an item indicating a preset setting of the peripheral device selected from the setting items to a primary item, a secondary item or a thirdly item of the fourth items displayed in the second region while the plurality of tabs and the first region displaying the first items, the second items or the third items are displayed;

generating the lesson content by storing the primary item, the secondary item and the thirdly item of the fourth items and lesson plan configuration information corresponding to the selected activity, the selected material and the selected item indicating the preset setting of the peripheral device designated to a class course among the plurality of class courses; and transmitting information of the preset setting of the peripheral device to the peripheral device to control the peripheral device based on the information of the preset setting.

25. A user terminal comprising:

a display configured to display a graphic user interface (GUI) which comprises a plurality of tabs, a first region displaying first items indicating a plurality of activities or second items indicating a plurality of materials or third items corresponding to at least one of peripheral device settings or device environment settings to be designated according to at least one of class courses, the activities or the materials, respectively, the third items being classified into setting items indicating preset setting of a peripheral device and device items indicating peripheral devices according to locations, and a second region displaying fourth items corresponding to a plurality of class courses which are taught based on a lesson content and which are provided in a classroom;

an input receiver configured to receive a user's input; and a controller configured to, in response to selection of a first tab corresponding to the plurality of activities or a second tab corresponding to the plurality of materials or a third tab corresponding to the at least one of the peripheral device settings or the device environment settings among the plurality of tabs, control the display to display the first items, the second items or the third items in the first region of the GUI while the plurality of tabs and the second region displaying the fourth items are displayed, select one of the first items, one of the second items or one of the setting items among the third items displayed in the first region in accordance with a first user input while the plurality of tabs and the second region displaying the fourth items are displayed, in response to selection of the one of the first items, the one of the second items or the one of the setting items among the third items displayed in the first region, designate an item of an activity selected from the plurality of activities, an item of a material selected from the plurality of materials or an item indicating a preset setting of the peripheral device selected from the setting items to a primary item, a secondary item or a thirdly item of the fourth items displayed in the second region while the plurality of tabs and the first region displaying the first items, the second items or the third items are displayed, generate the lesson content by storing the primary, secondary and thirdly items of the fourth items and lesson plan configuration information corresponding to the selected activity, the selected material and the selected item indicating the preset setting of the peripheral device designated to a class course among the plurality of class courses, and transmit information of the preset setting of the peripheral device to the peripheral device to control the peripheral device based on the information of the preset setting.

* * * * *